(12) United States Patent
Washington et al.

(10) Patent No.: US 10,909,809 B2
(45) Date of Patent: *Feb. 2, 2021

(54) GRAPHICAL USER INTERFACE AND COMPUTER PROCESSING TECHNIQUES FOR FACILITATING USER INTERACTION WITH ELECTRONIC GAMING DEVICES

(71) Applicant: SYNERGY BLUE, LLC, Las Vegas, NV (US)

(72) Inventors: Georg Washington, Rancho Mirage, CA (US); Joe Serra, Bermuda Dunes, CA (US)

(73) Assignee: SYNERGY BLUE LLC, Las Vegas, NV (US)

( * ) Notice: Subject to any disclaimer, the term of this patent is extended or adjusted under 35 U.S.C. 154(b) by 134 days.

This patent is subject to a terminal disclaimer.

(21) Appl. No.: 16/391,218

(22) Filed: Apr. 22, 2019

(65) Prior Publication Data
US 2019/0272707 A1   Sep. 5, 2019

Related U.S. Application Data

(63) Continuation of application No. 15/344,488, filed on Nov. 4, 2016, now Pat. No. 10,269,214, which is a
(Continued)

(51) Int. Cl.
*G07F 17/32* (2006.01)
*A63F 13/822* (2014.01)
(Continued)

(52) U.S. Cl.
CPC ........ *G07F 17/3248* (2013.01); *A63F 13/352* (2014.09); *A63F 13/69* (2014.09);
(Continued)

(58) Field of Classification Search
CPC ...................................................... G07F 17/34
See application file for complete search history.

(56) References Cited

U.S. PATENT DOCUMENTS

| 4,582,324 A | 4/1986 | Koza et al. |
| 6,264,561 B1 | 7/2001 | Saffari et al. |
| (Continued) | | |

FOREIGN PATENT DOCUMENTS

| JP | 2007535374 A | 12/2007 |
| JP | 2008119469 A | 5/2008 |
| (Continued) | | |

OTHER PUBLICATIONS

U.S. Appl. No. 14/831,823, filed Jun. 16, 2016, Washington et al.
(Continued)

*Primary Examiner* — Robert T Clarke, Jr.
(74) *Attorney, Agent, or Firm* — Young Law Firm, P.C.

(57) ABSTRACT

Various aspects described for implementing skill-based, wager-based gaming techniques via computer networks, including one or more casino gaming networks. The skill-based, wager-based game may include a non-wager based gaming portion and a wager-based gaming portion. One or more players are able to concurrently engage in continuous game play of the non-wager based gaming portion during execution of wager-based gaming events which are automatically triggered based on events which occur during play of the non-wager based gaming portion. Payouts for a given wager-based game event outcome may include both monetary payouts and non-monetary payouts.

16 Claims, 19 Drawing Sheets

Related U.S. Application Data continuation-in-part of application No. 14/831,823, filed on Aug. 20, 2015, now Pat. No. 10,311,679, and a continuation-in-part of application No. 14/865,538, filed on Sep. 25, 2015, now Pat. No. 9,542,799.

(60) Provisional application No. 62/250,946, filed on Nov. 4, 2015, provisional application No. 62/091,451, filed on Dec. 12, 2014, provisional application No. 62/127,821, filed on Mar. 3, 2015.

(51) Int. Cl.
  A63F 13/837 (2014.01)
  A63F 13/69 (2014.01)
  A63F 13/352 (2014.01)

(52) U.S. Cl.
  CPC .......... *A63F 13/822* (2014.09); *A63F 13/837* (2014.09); *G07F 17/3211* (2013.01); *G07F 17/3223* (2013.01); *G07F 17/3227* (2013.01); *G07F 17/3241* (2013.01); *G07F 17/3244* (2013.01); *G07F 17/3267* (2013.01); *G07F 17/3269* (2013.01); *G07F 17/3286* (2013.01); *G07F 17/3288* (2013.01)

(56) References Cited

U.S. PATENT DOCUMENTS

| | | |
|---|---|---|
| 6,620,047 B1 | 9/2003 | Alcorn et al. |
| 6,645,077 B2 | 11/2003 | Rowe |
| 6,761,632 B2 | 7/2004 | Bansemer et al. |
| 6,811,482 B2 | 11/2004 | Letovsky |
| 6,991,539 B2 | 1/2006 | Pacey |
| 7,326,115 B2 | 2/2008 | Baerlocher |
| 7,361,091 B2 | 4/2008 | Letovsky |
| 7,682,239 B2 | 3/2010 | Friedman et al. |
| 7,931,531 B2 | 4/2011 | Oberberger |
| 7,950,993 B2 | 5/2011 | Oberberger |
| 7,967,674 B2 | 6/2011 | Baerlocher |
| 8,162,742 B2 | 4/2012 | Oberberger |
| 8,267,765 B2 | 9/2012 | Baerlocher |
| 8,277,312 B2 | 10/2012 | Matthews et al. |
| 8,430,735 B2 | 4/2013 | Oberberger et al. |
| 8,475,266 B2 | 7/2013 | Arnone et al. |
| 8,529,351 B2 | 9/2013 | Kane |
| 8,562,445 B2 | 10/2013 | Arnone et al. |
| 8,602,881 B2 | 12/2013 | Arnone et al. |
| 8,632,395 B2 | 1/2014 | Arnone et al. |
| 8,636,577 B2 | 1/2014 | Arnone et al. |
| 8,657,660 B2 | 2/2014 | Arnone et al. |
| 8,657,675 B1 | 2/2014 | Meyerhofer et al. |
| 8,668,581 B2 | 3/2014 | Arnone et al. |
| 8,672,748 B2 | 3/2014 | Arnone et al. |
| 8,684,813 B2 | 4/2014 | Arnone et al. |
| 8,684,829 B2 | 4/2014 | Arnone et al. |
| 8,708,795 B2 | 4/2014 | Napolitano |
| 8,708,808 B2 | 4/2014 | Arnone et al. |
| 8,715,068 B2 | 5/2014 | Arnone et al. |
| 8,715,069 B2 | 5/2014 | Arnone et al. |
| 8,734,238 B2 | 5/2014 | Arnone et al. |
| 8,740,690 B2 | 6/2014 | Arnone et al. |
| 8,753,212 B2 | 6/2014 | Arnone et al. |
| 8,758,122 B2 | 6/2014 | Arnone et al. |
| 8,790,170 B2 | 7/2014 | Arnone et al. |
| 8,808,086 B2 | 8/2014 | Arnone et al. |
| 8,821,264 B2 | 9/2014 | Arnone et al. |
| 8,821,270 B2 | 9/2014 | Arnone et al. |
| 8,834,263 B2 | 9/2014 | Arnone et al. |
| 8,845,408 B2 | 9/2014 | Arnone et al. |
| 8,845,419 B2 | 9/2014 | Meyerhofer et al. |
| 8,845,420 B2 | 9/2014 | Arnone et al. |
| 8,851,967 B2 | 10/2014 | Arnone et al. |
| 8,864,564 B2 | 10/2014 | Oberberger |
| 8,882,586 B2 | 11/2014 | Arnone et al. |
| 8,905,840 B2 | 12/2014 | Arnone et al. |
| 8,998,707 B2 | 4/2015 | Arnone et al. |
| 9,047,735 B2 | 6/2015 | Arnone et al. |
| 9,058,723 B2 | 6/2015 | Arnone et al. |
| 9,218,714 B2 | 12/2015 | Arnone et al. |
| 9,251,666 B2 | 2/2016 | Oberberger |
| 9,302,175 B2 | 4/2016 | Arnone et al. |
| 9,336,656 B2 | 5/2016 | Arnone et al. |
| 2002/0016200 A1 | 2/2002 | Baerlocher et al. |
| 2002/0147042 A1 | 10/2002 | Vuong et al. |
| 2003/0119581 A1 | 6/2003 | Cannon et al. |
| 2003/0125103 A1 | 7/2003 | Tessmer et al. |
| 2003/0125107 A1 | 7/2003 | Cannon |
| 2003/0203756 A1 | 10/2003 | Jackson et al. |
| 2004/0121839 A1 | 6/2004 | Webb |
| 2005/0192087 A1 | 9/2005 | Friedman et al. |
| 2005/0208993 A1 | 9/2005 | Yoshizawa et al. |
| 2006/0040735 A1 | 2/2006 | Baerlocher |
| 2006/0189371 A1 | 8/2006 | Walker et al. |
| 2007/0077994 A1 | 4/2007 | Betteridge et al. |
| 2008/0032801 A1 | 2/2008 | Courssou et al. |
| 2008/0108425 A1 | 5/2008 | Oberberger |
| 2008/0119261 A1 | 5/2008 | Heymann |
| 2008/0119283 A1 | 5/2008 | Baerlocher |
| 2009/0117983 A1 | 5/2009 | Visser |
| 2009/0131158 A1 | 5/2009 | Brunet De et al. |
| 2009/0280891 A1 | 11/2009 | Filipour et al. |
| 2010/0075746 A1 | 3/2010 | Anderson et al. |
| 2010/0120502 A1 | 5/2010 | Oberberger |
| 2011/0034237 A1 | 2/2011 | Schuhof et al. |
| 2011/0053676 A1 | 3/2011 | Wolf et al. |
| 2011/0065495 A1 | 3/2011 | Hornik et al. |
| 2011/0212766 A1 | 9/2011 | Bowers et al. |
| 2011/0218024 A1 | 9/2011 | Baerlocher |
| 2011/0218028 A1 | 9/2011 | Acres |
| 2011/0218035 A1 | 9/2011 | Thomas |
| 2012/0004026 A1 | 1/2012 | Vann |
| 2012/0208628 A1 | 8/2012 | Oberberger |
| 2013/0053118 A1 | 2/2013 | Schueller et al. |
| 2013/0123470 A1 | 5/2013 | Shimaoka et al. |
| 2013/0131848 A1 | 5/2013 | Arnone et al. |
| 2013/0237326 A1 | 9/2013 | Arnone et al. |
| 2013/0244764 A1 | 9/2013 | Arnone et al. |
| 2013/0244765 A1 | 9/2013 | Arnone et al. |
| 2013/0252687 A1 | 9/2013 | Arnone et al. |
| 2013/0252693 A1 | 9/2013 | Arnone et al. |
| 2013/0252718 A1 | 9/2013 | Arnone et al. |
| 2013/0260871 A1 | 10/2013 | Arnone et al. |
| 2013/0273986 A1 | 10/2013 | Arnone et al. |
| 2013/0281192 A1 | 10/2013 | Arnone et al. |
| 2013/0281193 A1 | 10/2013 | Arnone et al. |
| 2013/0288785 A1 | 10/2013 | Arnone et al. |
| 2013/0296021 A1 | 11/2013 | Arnone et al. |
| 2013/0296030 A1 | 11/2013 | Arnone et al. |
| 2013/0296031 A1 | 11/2013 | Arnone et al. |
| 2013/0316798 A1 | 11/2013 | Arnone et al. |
| 2013/0324227 A1 | 12/2013 | Arnone et al. |
| 2013/0324229 A1 | 12/2013 | Arnone et al. |
| 2013/0331177 A1 | 12/2013 | Arnone et al. |
| 2014/0004931 A1 | 1/2014 | Arnone et al. |
| 2014/0011567 A1 | 1/2014 | Penacho et al. |
| 2014/0011579 A1 | 1/2014 | Arnone et al. |
| 2014/0018160 A1 | 1/2014 | Arnone et al. |
| 2014/0031133 A1 | 1/2014 | Arnone et al. |
| 2014/0073405 A1 | 3/2014 | Arnone et al. |
| 2014/0073414 A1 | 3/2014 | Arnone et al. |
| 2014/0080562 A1 | 3/2014 | Johnson |
| 2014/0080580 A1 | 3/2014 | Arnone et al. |
| 2014/0087842 A1 | 3/2014 | Betts et al. |
| 2014/0087848 A1 | 3/2014 | Kosta et al. |
| 2014/0100023 A1 | 4/2014 | Arnone et al. |
| 2014/0121004 A1 | 5/2014 | Arnone et al. |
| 2014/0126942 A1 | 5/2014 | Kojima et al. |
| 2014/0128152 A1 | 5/2014 | Arnone et al. |
| 2014/0135103 A1 | 5/2014 | Arnone et al. |
| 2014/0135114 A1 | 5/2014 | Meyerhofer et al. |
| 2014/0141863 A1 | 5/2014 | Arnone et al. |
| 2014/0155144 A1 | 6/2014 | Arnone et al. |
| 2014/0155146 A1 | 6/2014 | Arnone |

(56) References Cited

U.S. PATENT DOCUMENTS

| | | |
|---|---|---|
| 2014/0155147 A1 | 6/2014 | Arnone et al. |
| 2014/0155151 A1 | 6/2014 | Arnone et al. |
| 2014/0162759 A1 | 6/2014 | Arnone et al. |
| 2014/0162767 A1 | 6/2014 | Arnone et al. |
| 2014/0171186 A1 | 6/2014 | Arnone et al. |
| 2014/0179416 A1 | 6/2014 | Arnone et al. |
| 2014/0187313 A1 | 7/2014 | Arnone et al. |
| 2014/0194179 A1 | 7/2014 | Arnone et al. |
| 2014/0194188 A1 | 7/2014 | Kosta et al. |
| 2014/0194191 A1 | 7/2014 | Arnone et al. |
| 2014/0200074 A1 | 7/2014 | Arnone et al. |
| 2014/0206437 A1* | 7/2014 | Arnone ............. G07F 17/32 463/25 |
| 2014/0222881 A1 | 8/2014 | Pirvu et al. |
| 2014/0228083 A1 | 8/2014 | Arnone et al. |
| 2014/0228084 A1 | 8/2014 | Arnone |
| 2014/0228102 A1 | 8/2014 | Arnone et al. |
| 2014/0235330 A1 | 8/2014 | Arnone et al. |
| 2014/0243059 A1 | 8/2014 | Arnone et al. |
| 2014/0243076 A1 | 8/2014 | Arnone et al. |
| 2014/0274345 A1 | 9/2014 | Arnone et al. |
| 2014/0295967 A1 | 10/2014 | Arnone et al. |
| 2014/0302916 A1 | 10/2014 | Arnone et al. |
| 2014/0323211 A1 | 10/2014 | Arnone et al. |
| 2014/0335924 A1 | 11/2014 | Arnone et al. |
| 2014/0357347 A1 | 12/2014 | Arnone et al. |
| 2014/0357348 A1 | 12/2014 | Arnone et al. |
| 2014/0357349 A1 | 12/2014 | Arnone et al. |
| 2014/0370977 A1 | 12/2014 | Arnone et al. |
| 2014/0378219 A1 | 12/2014 | Arnone et al. |
| 2015/0005057 A1 | 1/2015 | Arnone et al. |
| 2015/0024829 A1 | 1/2015 | Arnone et al. |
| 2015/0031435 A1 | 1/2015 | Colvin et al. |
| 2015/0072772 A1 | 3/2015 | Arnone et al. |
| 2015/0072773 A1 | 3/2015 | Arnone et al. |
| 2015/0080074 A1 | 3/2015 | Arnone et al. |
| 2015/0094137 A1 | 4/2015 | Arnone et al. |
| 2015/0094138 A1 | 4/2015 | Meyerhofer et al. |
| 2015/0099578 A1 | 4/2015 | Arnone et al. |
| 2015/0111637 A1 | 4/2015 | Arnone et al. |
| 2015/0111638 A1 | 4/2015 | Arnone et al. |
| 2015/0111639 A1 | 4/2015 | Arnone et al. |
| 2015/0119127 A1 | 4/2015 | Arnone et al. |
| 2015/0126275 A1 | 5/2015 | Arnone et al. |
| 2015/0141122 A1 | 5/2015 | Arnone et al. |
| 2015/0141127 A1 | 5/2015 | Arnone et al. |
| 2015/0141128 A1 | 5/2015 | Arnone et al. |
| 2015/0141130 A1 | 5/2015 | Arnone et al. |
| 2015/0148118 A1 | 5/2015 | Arnone et al. |
| 2015/0148119 A1 | 5/2015 | Arnone et al. |
| 2015/0148122 A1 | 5/2015 | Arnone et al. |
| 2015/0154827 A1 | 6/2015 | Arnone et al. |
| 2015/0154831 A1 | 6/2015 | Arnone et al. |
| 2015/0154832 A1 | 6/2015 | Arnone et al. |
| 2015/0161847 A1 | 6/2015 | Arnone et al. |
| 2015/0170468 A1 | 6/2015 | Arnone et al. |
| 2015/0170469 A1 | 6/2015 | Arnone et al. |
| 2015/0187170 A1 | 7/2015 | Arnone et al. |
| 2015/0194010 A1 | 7/2015 | Arnone et al. |
| 2015/0194015 A1 | 7/2015 | Arnone et al. |
| 2015/0194016 A1 | 7/2015 | Arnone et al. |
| 2015/0199874 A1 | 7/2015 | Arnone et al. |
| 2015/0206388 A1 | 7/2015 | Arnone et al. |
| 2015/0213670 A1 | 7/2015 | Arnone et al. |
| 2015/0213681 A1 | 7/2015 | Arnone et al. |
| 2015/0213682 A1 | 7/2015 | Arnone et al. |
| 2015/0213686 A1 | 7/2015 | Arnone et al. |
| 2015/0221178 A1 | 8/2015 | Arnone et al. |
| 2015/0235513 A1 | 8/2015 | Arnone et al. |
| 2015/0235520 A1 | 8/2015 | Arnone et al. |
| 2015/0238873 A1 | 8/2015 | Arnone et al. |
| 2015/0243127 A1 | 8/2015 | Arnone et al. |
| 2015/0243129 A1 | 8/2015 | Arnone et al. |
| 2015/0243130 A1 | 8/2015 | Arnone et al. |
| 2015/0243138 A1 | 8/2015 | Arnone et al. |
| 2015/0254927 A1 | 9/2015 | Arnone et al. |
| 2015/0254928 A1 | 9/2015 | Arnone et al. |
| 2015/0254929 A1 | 9/2015 | Arnone et al. |
| 2015/0254931 A1 | 9/2015 | Arnone et al. |
| 2015/0262453 A1 | 9/2015 | Arnone et al. |
| 2015/0269811 A1 | 9/2015 | Arnone et al. |
| 2015/0269814 A1 | 9/2015 | Arnone et al. |
| 2015/0287277 A1 | 10/2015 | Arnone et al. |
| 2015/0294530 A1 | 10/2015 | Arnone et al. |
| 2015/0294531 A1 | 10/2015 | Arnone et al. |
| 2015/0294536 A1 | 10/2015 | Arnone et al. |
| 2015/0302691 A1 | 10/2015 | Arnone et al. |
| 2015/0310700 A1 | 10/2015 | Arnone et al. |
| 2015/0310702 A1 | 10/2015 | Arnone et al. |
| 2015/0317874 A1 | 11/2015 | Arnone |
| 2015/0317880 A1 | 11/2015 | Arnone et al. |
| 2015/0317881 A1 | 11/2015 | Arnone et al. |
| 2015/0325078 A1 | 11/2015 | Alsip |
| 2015/0325084 A1 | 11/2015 | Arnone et al. |
| 2016/0171827 A1 | 6/2016 | Washington et al. |
| 2016/0171835 A1 | 6/2016 | Washington et al. |

FOREIGN PATENT DOCUMENTS

| | | |
|---|---|---|
| JP | 2014524768 A | 12/2012 |
| JP | 2015515286 A | 7/2013 |
| JP | 201433876 A | 2/2014 |
| WO | 2005115570 A2 | 12/2005 |
| WO | 2011120592 A2 | 10/2011 |
| WO | 2013020124 A1 | 2/2013 |
| WO | 2013059308 A2 | 4/2013 |
| WO | 2013059372 A3 | 6/2013 |
| WO | 2013082052 A1 | 6/2013 |
| WO | 2013082546 A1 | 6/2013 |
| WO | 2013082552 A1 | 6/2013 |
| WO | 2013086491 A1 | 6/2013 |
| WO | 2013096514 A1 | 6/2013 |
| WO | 2013071261 | 7/2013 |
| WO | 2013103940 A1 | 7/2013 |
| WO | 2013109658 A1 | 7/2013 |
| WO | 2013109790 A1 | 7/2013 |
| WO | 2013123470 A1 | 8/2013 |
| WO | 2013123527 A1 | 8/2013 |
| WO | 2013126445 A1 | 8/2013 |
| WO | 2013138321 A1 | 9/2013 |
| WO | 2013163330 A1 | 10/2013 |
| WO | 2013163480 A1 | 10/2013 |
| WO | 2013163481 A1 | 10/2013 |
| WO | 2013163486 A1 | 10/2013 |
| WO | 2013181293 A1 | 12/2013 |
| WO | 2014005115 A2 | 1/2014 |
| WO | 2014005157 A2 | 1/2014 |
| WO | 2014025943 A1 | 2/2014 |
| WO | 2014005158 A3 | 3/2014 |
| WO | 2013049745 A3 | 5/2014 |
| WO | 2014071418 A1 | 5/2014 |
| WO | 2014074271 A1 | 5/2014 |
| WO | 2014074339 A1 | 5/2014 |
| WO | 2014074353 A1 | 5/2014 |
| WO | 2014074392 A1 | 5/2014 |
| WO | 2014074751 A1 | 5/2014 |
| WO | 2014100056 A1 | 6/2014 |
| WO | 2014107228 A1 | 7/2014 |
| WO | 2014107259 A1 | 7/2014 |
| WO | 2014109837 A1 | 7/2014 |
| WO | 2014121056 A1 | 8/2014 |
| WO | 2014123625 A1 | 8/2014 |
| WO | 2014133906 A1 | 9/2014 |
| WO | 2014134581 A1 | 9/2014 |
| WO | 2014134628 A1 | 9/2014 |
| WO | 2014134629 A1 | 9/2014 |
| WO | 2014126942 A3 | 10/2014 |
| WO | 2014159135 A1 | 10/2014 |
| WO | 2014160615 A1 | 10/2014 |
| WO | 2014160896 A1 | 10/2014 |
| WO | 2014161006 A3 | 11/2014 |
| WO | 2014179284 A1 | 11/2014 |
| WO | 2014186340 A1 | 11/2014 |
| WO | 2014186342 A1 | 11/2014 |

(56) References Cited

FOREIGN PATENT DOCUMENTS

| WO | 2014194142 A1 | 12/2014 |
| WO | 2014194143 A2 | 12/2014 |
| WO | 2014201054 A1 | 12/2014 |
| WO | 2014205409 A1 | 12/2014 |
| WO | 2014210080 A1 | 12/2014 |
| WO | 2014210224 A1 | 12/2014 |
| WO | 2015002907 A1 | 1/2015 |
| WO | 2015017288 A1 | 2/2015 |
| WO | 2014205417 A3 | 3/2015 |
| WO | 2015034959 A1 | 3/2015 |
| WO | 2015042327 A1 | 3/2015 |
| WO | 2015054309 A1 | 4/2015 |
| WO | 2015057977 A1 | 4/2015 |
| WO | 2015066478 A1 | 5/2015 |
| WO | 2015073902 A1 | 5/2015 |
| WO | 2013181294 A3 | 7/2015 |
| WO | 2014025940 A3 | 7/2015 |
| WO | 2015139004 A1 | 9/2015 |
| WO | 2015157724 A2 | 10/2015 |
| WO | 2015171968 A1 | 11/2015 |
| WO | 2016093923 A1 | 6/2016 |
| WO | 2017079701 A1 | 5/2017 |
| WO | 2017079706 A1 | 5/2017 |
| WO | 2018005547 A1 | 1/2018 |
| WO | 2018017149 A2 | 1/2018 |
| WO | 2018093416 A1 | 5/2018 |

OTHER PUBLICATIONS

U.S. Appl. No. 14/865,538, filed Jan. 10, 2017, Washington et al.
U.S. Appl. No. 15/344,488, filed Mar. 16, 2017, Washington et al.
U.S. Appl. No. 15/344,503, filed Mar. 16, 2017, Washington et al.
U.S. Appl. No. 15/358,127, filed May 4, 2017, Washington et al.
U.S. Appl. No. 15/597,099, filed Nov. 9, 2017, Washington et al.
Battle Slots: GeForce 8600M GT Screenshot printed from https://www.youtube.com/watch?v=ckSes5XkWtY on Dec. 9, 2015.
PCT International Search Report PCT/2015/052401, International Filing Date Sep. 25, 2015, dated Nov. 19, 2015. 3 pages.
PCT International Search Report PCT/US2016/060732, International Filing Date Nov. 4, 2016, dated Jan. 25, 2017, 3 pages.
PCT International Search Report PCT/US2016/063210, International filing Date Jan. 5, 2017, dated May 31, 2018, 3 pages.
PCT International Search Report, PCT/US/2015/052401, International Filing Date Sep. 25, 2015, dated Nov. 19, 2015. 3 pages.
PCT International Search Report, PCT/US2016/060737, International filing Date Nov. 4, 2016, dated Jan. 25, 2017, 3 pages.
PCT International Search Report, PCT/US2017/033114, International Filing Date May 17, 2017, dated Jul. 27, 2017. 3 pages.
PCT International Search Report, PCT/US2017/039581, International filing Date Jun. 28, 2017, dated Jan. 1, 2019, 3 pages.
Intellectual Property Office of Singapore Search Report in SG Appln 11201803973Q, dated Aug. 16, 2019.
Intellectual Property Office of Singapore Written Opinion in SG Appln 11201803973Q, dated Aug. 16, 2019.
JPO Office Action of Sep. 2, 2020 in JP Application No. 2018-543072.
Office Action dated Jul. 30, 2020 is SG application 11201803973Q.

* cited by examiner

GRAPHICAL USER INTERFACE AND COMPUTER PROCESSING TECHNIQUES FOR FACILITATING USER INTERACTION WITH ELECTRONIC GAMING DEVICES

RELATED APPLICATION DATA

This application is a continuation application, pursuant to the provisions of 35 U.S.C. § 120, of prior U.S. patent application Ser. No. 15/344,488 titled "HYBRID ARCADE/ WAGER-BASED GAMING ASPECTS RELATING TO ENTERTAINMENT AND WAGERING GAMING ACTIVITIES" by Washington et al., filed on 4 Nov. 2016, the entirety of which is incorporated herein by reference for all purposes.

U.S. patent application Ser. No. 15/344,488 claims benefit, pursuant to the provisions of 35 U.S.C. § 119, of U.S. Provisional Application Ser. No. 62/250,946, titled "HYBRID ARCADE/WAGER-BASED GAMING ASPECTS RELATING TO ENTERTAINMENT AND WAGERING GAMING ACTIVITIES", naming Washington et al. as inventors, and filed 4 Nov. 2015, the entirety of which is incorporated herein by reference for all purposes.

U.S. patent application Ser. No. 15/344,488 claims benefit, pursuant to the provisions of 35 U.S.C. § 119, of U.S. Provisional Application Ser. No. 62/091,451, titled "HYBRID ARCADE-TYPE, WAGER-BASED GAMING TECHNIQUES", naming Washington et al. as inventors, and filed 12 Dec. 2014, the entirety of which is incorporated herein by reference for all purposes.

U.S. patent application Ser. No. 15/344,488 also claims benefit, pursuant to the provisions of 35 U.S.C. § 119, of U.S. Provisional Application Ser. No. 62/127,821, titled "RPG AND SPORTS THEMED HYBRID ARCADE-TYPE, WAGER-BASED GAMING TECHNIQUES", naming Washington et al. as inventors, and filed 3 Mar. 2015, the entirety of which is incorporated herein by reference for all purposes.

U.S. patent application Ser. No. 15/344,488 is a continuation-in-part (CIP) application, pursuant to the provisions of 35 U.S.C. § 120, of prior U.S. patent application Ser. No. 14/831,823 titled "FIRST PERSON SHOOTER, RPG AND SPORTS THEMED HYBRID ARCADE-TYPE, WAGER-BASED GAMING TECHNIQUES" by Washington et al., filed on 20 Aug. 2015, the entirety of which is incorporated herein by reference for all purposes.

U.S. patent application Ser. No. 15/344,488 is a continuation-in-part (CIP) application, pursuant to the provisions of 35 U.S.C. § 120, of prior U.S. patent application Ser. No. 14/865,538 titled "HYBRID ARCADE-TYPE, WAGER-BASED GAMING TECHNIQUES AND PREDETERMINED RNG OUTCOME BATCH RETRIEVAL TECHNIQUES" by Washington et al., filed on 25 Sep. 2015, the entirety of which is incorporated herein by reference for all purposes.

BACKGROUND

Traditionally, when conducting wager-based gaming events in a wager-based game, a player places a wager (representing some amount of monetary value) on a specific wager-based game event, and the wager-based game event is then initiated and wager-based game event outcome is determined. If the wager-based game event outcome corresponds to a "win" for the player, a monetary payout is distributed to the player, typically in the form of tokens, cash, and/or credit.

Many of today's wager-based games are typically designed based on long-standing conventional wisdom that the primary motivation for players to engage and participate in wager-based games relates to the player's expectation of receiving a net positive financial gain. For example, a player may be motivated to bet one dollar on a video slot game because there is a possibility of the player winning a payout which exceeds $1.

Taking into account such conventional wisdom, most wager-based games are configured or designed to primarily offer monetary-type payouts for wager-based game event outcomes. Additionally, such monetary-type payouts are typically unrelated to, and have no effect or influence on, the gameplay portion of the wager-based game. The same is also true for skill-based, wager-based games. For example, in skill-based, wager-based games which include an entertainment (e.g., arcade-type) game portion and wager-based game portion, the monetary-type payouts associated with the wager-based game portion are typically unrelated to, and have no affect or influence on, the gameplay of the entertainment (e.g., arcade-type) game portion of the skill-based, wager-based game.

DETAILED DESCRIPTION OF EXAMPLE EMBODIMENTS

Overview

Figure 1:
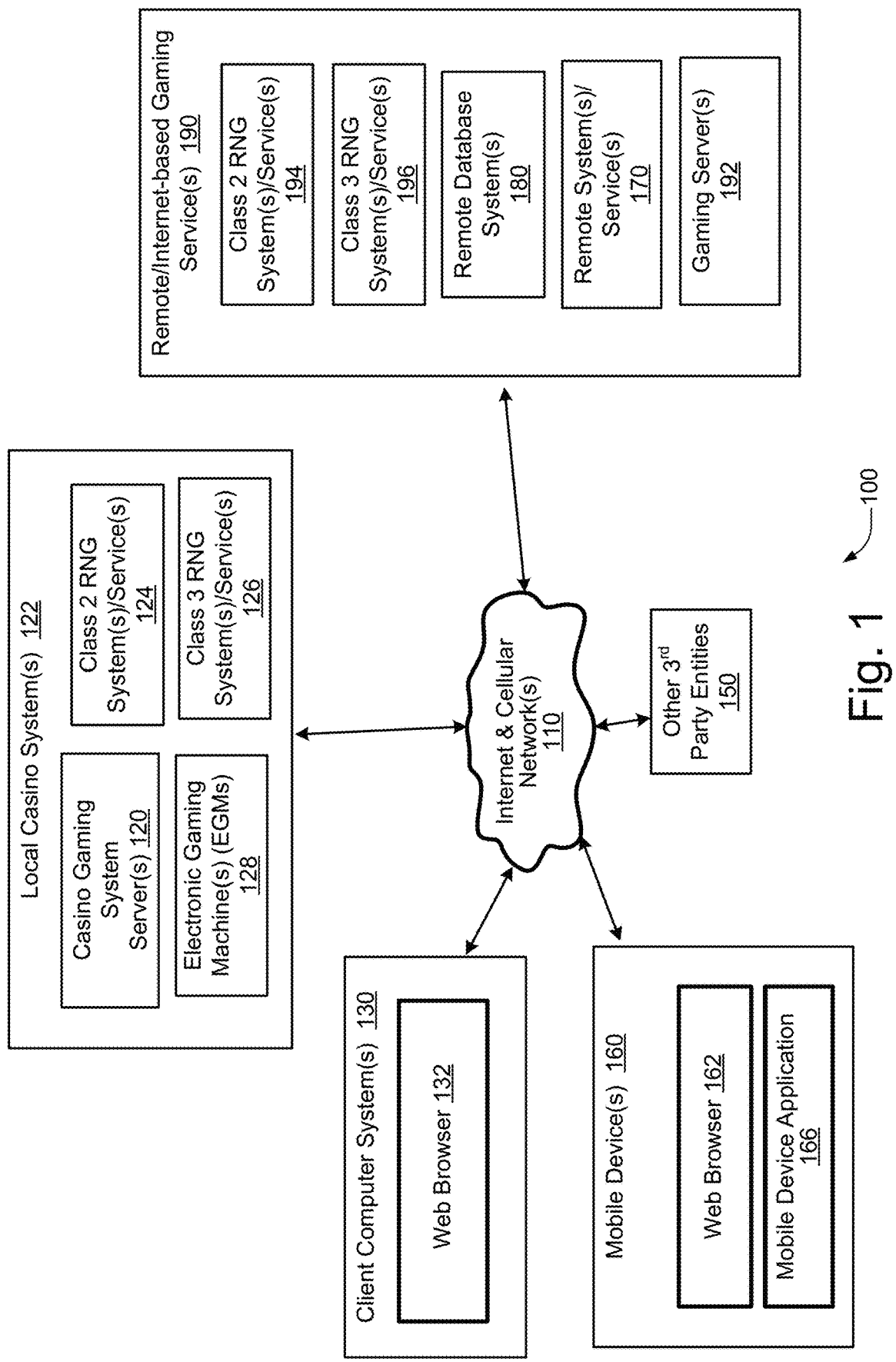
FIG. 1 illustrates a simplified block diagram of a specific example embodiment of a gaming Network 100 which may be configured or designed to implement various skill-based, wager-based gaming techniques described and/or referenced herein.

Various aspects described or referenced herein are directed to different methods, systems, and computer program products for implementing various skill-based, wager-based gaming ("HAWG") techniques via computer networks, including one or more casino gaming networks. Additionally, various aspects disclosed herein are directed to techniques for implementing wager-based game event "payouts" which may be utilized by a player to affect and/or influence gameplay of the non-wager-based game portion and/or wager-based game portion of a skill-based, wager-based game.

In at least one embodiment, various method(s), system(s) and/or computer program product(s) may be operable to cause at least one processor to execute a plurality of instructions to: display, at a first display of a first electronic gaming device, a first game graphical user interface representing a virtual game world of a skill-based, wager-based game, the first game graphical user interface including a first skill-based game graphical user interface portion configured to enable the first player to engage in skill-based game play activities relating to the skill-based, wager-based game via interaction with the first skill-based game graphical user interface portion, the first game graphical user interface further including a first wager-based game graphical user interface portion configured to display content relating to wager-based gaming activities associated with the skill-based, wager-based game; receive a first set of game-play input generated from the first player's interactions with the first skill-based game graphical user interface portion; detect an occurrence of a first wager-based triggering event in the virtual game world; automatically initiate, in response to the occurrence of the first wager-based triggering event, a first wager-based game event at the first wager-based game graphical user interface portion; enable the first player to concurrently engage in a first portion of skill-based game play activities of the skill-based, wager-based game via interaction with the first skill-based game graphical user interface portion during execution of the first wager-based game event; identify a first wager-based game event outcome representing an outcome of the first wager-based game event; display a representation of the outcome of the first wager-based game event at the first wager-based game graphical user interface portion while the first player is engaged in the first portion of skill-based game play activities via interaction with the first skill-based game graphical user interface portion; determine if a monetary payout is to be distributed to the first player based on the first wager-based event outcome; if it is determined that a monetary payout is to be distributed to the first player, automatically distribute the monetary payout; determine if a non-monetary payout is to be distributed or awarded to the first player based on the first wager-based event outcome, wherein the non-monetary payout includes at least one in-game resource or attribute relating to a skill-based game portion of the virtual game world; and if it is determined that a non-monetary payout is to be distributed or awarded to the first player, automatically distribute the first non-monetary pay-out by modifying the at least one in-game resource or attribute relating to the skill-based game portion of the virtual game world. In at least one embodiment, the first wager-based game event corresponds to a wager-based game of chance event, and the outcome of the first wager-based game event is predetermined using a random number generator (RNG). In at least one embodiment, the outcome of the first wager-based game event results in distribution of the monetary payout and the non-monetary payout.

In at least one embodiment, the first electronic gaming device includes a first bill or ticket acceptor, and additional method(s), system(s) and/or computer program product(s) may be further operable to cause at least one processor to execute additional instructions to automatically fund a first amount wagered on the first wager-based game event using funds from a first account balance associated with the first player.

Additional method(s), system(s) and/or computer program product(s) may be further operable to cause at least one processor to execute additional instructions to: determine the first wager-based event outcome using the at least one random number generator engine; create a link or association between the first wager-based event outcome and the first wager-based triggering event; and reveal, after execution of the first wager-based game event, the first wager-based event outcome.

Additional method(s), system(s) and/or computer program product(s) may be further operable to cause at least one processor to execute additional instructions to: predetermine the first wager-based game event outcome of the first wager-based game event before the initiation of the first wager-based game event; predetermine, before the initiation of the first wager-based game event, if any monetary payout is to be distributed to the first player based on the predetermined first wager-based game event outcome of the first wager-based game event; and predetermine, before the initiation of the first wager-based game event, if any non-monetary payout is to be distributed to the first player based on the predetermined outcome of the first wager-based game event.

Additional method(s), system(s) and/or computer program product(s) may be further operable to cause at least one processor to execute additional instructions to: analyze the first wager-based game event outcome to determine whether or not to automatically modify an availability of at least one resource or attribute relating to the skill-based game portion of the virtual game world; if the first wager-based game event outcome satisfies a first set of conditions, automatically modify the availability of the at least one resource or attribute relating to the skill-based game portion of the virtual game world; and if the first wager-based game event outcome does not satisfy the first set of criteria, prevent modification of the at least one resource or attribute relating to the skill-based game portion of the virtual game world in response to the first wager-based game event outcome.

In at least one embodiment, the first wager-based game event corresponds to a wager-based game of chance event; and the first wager-based event outcome is determined using the at least one random number generator engine.

In other embodiments, various method(s), system(s) and/or computer program product(s) may be operable to cause at least one processor to execute instructions to: display, at a first display of a first electronic gaming device, a first game graphical user interface representing a virtual game world of a skill-based, wager-based game, the first game graphical user interface including a first skill-based game graphical user interface portion configured to enable the first player to engage in skill-based game play activities relating to the skill-based, wager-based game via interaction with the first skill-based game graphical user interface portion, the first game graphical user interface further including a first wager-based game graphical user interface portion configured to display content relating to wager-based gaming activities associated with the skill-based, wager-based game; receive a first set of game-play input generated from the first player's interactions with the first skill-based game graphical user interface portion; detect an occurrence of a first wager-based triggering event in the virtual game world; automatically initiate, in response to the occurrence of the first wager-based triggering event, a first wager-based game event at the first wager-based game graphical user interface portion; enable the first player to concurrently engage in a first portion of skill-based game play activities of the skill-based, wager-based game via interaction with the first skill-based game graphical user interface portion during execution of the first wager-based game event; display a representation of the first wager-based game event at the first wager-based game graphical user interface portion; identify a first wager-based event outcome representing an outcome of the first wager-based game event; determine the first wager-based game event outcome of the first wager-based game event before the initiation of the first wager-based game event outcome; determine, before the initiation of the first wager-based game event, if any monetary payout is to be distributed to the first player based on the predetermined first wager-based game event outcome of the first wager-based game event; if it is determined that a monetary payout is to be distributed to the first player, automatically distribute the monetary payout; determine, before the initiation of the first wager-based game event, if any non-monetary payout is to be distributed to the first player based on the predetermined outcome of the first wager-based game event, wherein the non-monetary payout includes at least one in-game resource or attribute relating to a skill-based game portion of the virtual game world; and if it is determined that a non-monetary payout is to be distributed or awarded to the first player, automatically distribute the first non-monetary payout by modifying the at least one in-game resource or attribute relating to the skill-based game portion of the virtual game world. In at least some embodiments, the outcome of the first wager-based game event results in distribution of the monetary payout and the non-monetary payout.

Additional method(s), system(s) and/or computer program product(s) may be further operable to cause at least one processor to execute additional instructions to: determine the first wager-based event outcome using the at least one random number generator engine; create a link or association between the first wager-based event outcome and the first wager-based triggering event; and reveal, after execution of the first wager-based game event, the first wager-based event outcome.

Various objects, features and advantages of the various aspects described or referenced herein will become apparent from the following descriptions of its example embodiments, which descriptions should be taken in conjunction with the accompanying drawings.

Specific Example Embodiments

Various techniques will now be described in detail with reference to a few example embodiments thereof as illustrated in the accompanying drawings. In the following description, numerous specific details are set forth in order to provide a thorough understanding of one or more aspects and/or features described or reference herein. It will be apparent, however, to one skilled in the art, that one or more aspects and/or features described or reference herein may be practiced without some or all of these specific details. In other instances, well known process steps and/or structures have not been described in detail in order to not obscure some of the aspects and/or features described or reference herein.

One or more different inventions may be described in the present application. Further, for one or more of the invention(s) described herein, numerous embodiments may be described in this patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical and other changes may be made without departing from the scope of the one or more of the invention(s). Accordingly, those skilled in the art will recognize that the one or more of the invention(s) may be practiced with various modifications and alterations. Particular features of one or more of the invention(s) may be described with reference to one or more particular embodiments or figures that form a part of the present disclosure, and in which are shown, by way of illustration, specific embodiments of one or more of the invention(s). It should be understood, however, that such features are not limited to usage in the one or more particular embodiments or figures with reference to which they are described. The present disclosure is neither a literal description of all embodiments of one or more of the invention(s) nor a listing of features of one or more of the invention(s) that must be present in all embodiments.

Headings of sections provided in this patent application and the title of this patent application are for convenience only, and are not to be taken as limiting the disclosure in any way. Devices that are in communication with each other need not be in continuous communication with each other, unless expressly specified otherwise. In addition, devices that are in communication with each other may communicate directly or indirectly through one or more intermediaries. A description of an embodiment with several components in communication with each other does not imply that all such components are required. To the contrary, a variety of optional components are described to illustrate the wide variety of possible embodiments of one or more of the invention(s).

Further, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/article (e.g., whether or not they cooperate) may be used in place of a single device/article. Similarly, where more than one device or article is described (e.g., whether or not they cooperate), it will be readily apparent that a single device/article may be used in place of the more than one device or article.

The functionality and/or the features of a device may be alternatively embodied by one or more other devices that are not explicitly described as having such functionality/features. Thus, other embodiments of one or more of the invention(s) need not include the device itself. Techniques and mechanisms described or reference herein will sometimes be described in singular form for clarity. However, it should be noted that particular embodiments include multiple iterations of a technique or multiple instantiations of a mechanism unless noted otherwise.

Currently existing slot machine technology is dated and lacking younger demographics due to the same format of gambling gameplay element displays. Problems with existing slot machine and video-based casino gaming technology include: the gambling gameplay display method, and the player interaction method with the gambling game elements using a slot machine.

Veteran gamblers (e.g., older gambler demographic age 50+) have been accustomed to a standard set of video gaming symbols (e.g., A, J, K, Q) which, for example, may be accompanied with a multitude of additional themed symbols (e.g., animals, fantasy creatures, media personas, etc.) presented on a series of wheels or drums. Newer technology has made possible the use of digital display screens that present the reels and symbols in a digital format. Younger generations of gamblers (e.g., herein referred to as "gamers"), on the other hand, have been accustomed to increasingly intense and graphically glorified 2D & 3D world environments where an untold amount of possibilities may arise. These gamers, who are used to fast paced, energetic, and visually stunning games, feel that the display method of the traditional slot machines are "boring." As for the veteran gamblers, they feel that the fast paced, new aged action, is "too much."

Veteran gamblers have experienced player interaction in a few different ways: (1) a pull lever (2) a spin button (3) interact with a touch screen. gamers have experienced player interaction in dozens of different ways, such as, for example:
  gaming controllers (e.g., Nintendo, PlayStation, XBOX, Wii)
  PC HIDs (e.g., mouse, trackball, keyboard)
  joysticks
  shooting apparatuses
  head & body gear (e.g., Victormaxx, Power Glove)
  etc.

Much like the comparison between gamers and gamblers in regards to gambling gameplay display methods, the results are similar. The younger players are "bored" whereas the older players feel "intimidated."

In many existing casino venues, standard classic slot machines are deployed which include an electromagnetic mechanism with a "lever" interface device. Slot machines have also evolved using video screens and electronic push button interfaces, which are typically referred to as "Hybrid Machines" that use a combination of both the mechanical portion and video elements of both designs.

In light of the above, it may be desirable to create and/or implement "skill-based, wager-based games" or "Gambling Arcade games" which provide hybrid skill-based, wager-based gaming techniques which may more suitably appeal to the Casino gamer demographic. However, one significant obstacle regarding such hybrid skill-based, wager-based gaming techniques is that they are often comprised of new/different and complex back end solutions that may require lengthy and costly processes of regulatory review and approvals in many different gaming jurisdictions.

One possible workaround to this significant obstacle is to configure/design a hybrid skill-based, wager-based game such that it is compliant with currently approved wager-based gaming regulatory standards such as, for example, the well-known GLI standards, which have already been approved in various gaming jurisdictions. One example of a GLI standard is the GLI-11 standard version 2.1, Published Aug. 25, 2011 by gaming Laboratories International, LLC, the entirety of which is herein incorporated by reference for all purposes.

For example, in one embodiment, a hybrid skill-based, wager-based game may be configured or designed to provide an arcade-style gaming interface which enables a player to participate in an arcade-style game at the wager-based gaming machine. One or more events and/or activities performed by the player (e.g., during play of the arcade-style game) may automatically trigger an RNG wager-based event such as, for example, one or more of the following (or combinations thereof):
  the spinning of a virtual wager-based slot machine reel (e.g., which has been configured or designed to be compliant with the GLI standard(s));
  the spinning of a virtual wheel such as a roulette wheel or "Wheel-of-Fortune"™ wheel;
  the throwing/rolling of one or more dice;
  the dealing of one or more card(s);
  and/or other types of RNG-based video games of chance (preferably which have been configured or designed to be compliant gaming standards, rules and regulations).

Because the wager-based activities of the hybrid skill-based, wager-based game comply with currently existing GLI standard(s) (and/or other national, regional, local gaming rules and regulations), such hybrid skill-based, wager-based games may not require additional regulatory approval for deployment in Casino venues.

Some benefits and advantages of the skill-based, wager-based gaming techniques described herein may include, but are not limited to, one or more of the following (e.g., or combinations thereof):
  Enabling the utilization of the same (e.g., proven/GLI approved) slot machine back end and RNG for gambling functionality.
  Enables new and unique ways to display a slot machine gambling game to specific demographics based on gameplay type and/or theme.
  May increase overall house gambling demographics, revealing untapped markets, more profits, more coin-ins & more "butts in seats."
  Hybrid arcade-style, wager-based games may be purposefully configured or designed to avoid (or to not require) any additional regulatory approval for deployment in Casino venues.
  Provides mechanisms to Casinos/gaming establishments for facilitating achievement of desired minimum wagering goals (e.g., over time), such as those established by Casinos (e.g., Casino desires at least one wager-based reel spin by a given player every 10 seconds).
  Etc.

In one embodiment, a hybrid skill-based, wager-based game may be created by combining a new and different visual game representation with a new and different method of player interaction on a slot machine. The hybrid skill-based, wager-based game may be configured or designed to provide the assemblage of graphical elements and gameplay features for portraying a visually different experience while also providing the enhanced method of player interaction via a particular Human Interface Device (e.g., HID), which is based on the theme/style of the visually enhanced gambling game. For example, the game "Duck Hunt" uses a gun controller where as "Super Mario Bros." utilizes a D-pad multi-button controller as the HID. According to different embodiments, either (or both) of these arcade-style video games may be adapted (e.g., using the skill-based, wager-based gaming techniques described and/or referenced herein) to function as skill-based, wager-based games. According to different embodiments, one or more skill-based, wager-based game(s) may also be configured or designed to include one or more of the following (or combinations thereof): graphical elements (e.g., 2D and/or 3D) animations, sound effects, programming, etc.

In some embodiments, the format of the hybrid skill-based, wager-based game may focus on "first person shooter" type, arcade-style games such as, for example, "House of the Dead," "Area 51", "Lethal Enforcers", etc. At least a portion of such games may feature a player character that automatically moves on a "rail" system (e.g., automatically moving the player's character through different scenes of the game, without requiring the player to provide input for moving his/her game character), which allows the player to concentrate his/her focus on shooting the targets which appear throughout gameplay.

The format of the hybrid skill-based, wager-based game may also focus on other types of video and/or arcade-style games such as, for example, one or more of the following (e.g., or combinations thereof):

"non-linear" (e.g., open world) type video and/or arcade-style games such as, for example, Grand Theft Auto "linear" type video and/or arcade-style games such as, for example, Half-Life Massively multiplayer online "MMO" type video and/or arcade-style games such as, for example, World of Warcraft Role-playing game "RPG" type video and/or arcade-style games such as, for example, Final Fantasy.

Such games may feature a player character that may be moved through the game world via player input, (e.g., HID), which allows for an increased sense of excitement through gameplay by providing a multitude of player-choice possibilities through a wide-array of path directions.

In some embodiments, the format of the hybrid skill-based, wager-based game may facilitate a gameplay environment in which multiplayer functionality takes place. The multiplayer gameplay may have multiple "enrollment" aspects in which one, for example, particular player could be on location at a casino playing a skill-based, wager-based game, while another (e.g., different) player could be at a different location (e.g., at a different location in the casino, at a different casino, at a different establishment such as a home or office, etc.), concurrently participating in the same skill-based, wager-based game, but without participating in any wagering aspect/portions of skill-based, wager-based game. A non-wagering game such as this is commonly known as a "free to play" game, in which the player is allowed to download and install said game on their own devices, which then allows the player progress through the game (e.g., which is no different than the wager based counter-part) without taking place in wager based events. Examples of some popular "free to play" games are, "TERA", "Marvel Puzzle Quest", "Planetside 2", etc. gaming situations such as these may promote a "clicks to bricks" outcome where a casino property could promote at home users to "login over the weekend to play Super Zombie Bash! Free! Come down to the casino and play Super Zombie Bash for a chance to win big!" Such property advertisement may entice more patrons to visit the casino in order to "win big" on their favorite skill-based, wager-based game.

In some embodiments, different players concurrently participating in the same skill-based, wager-based game may each separately configure his/her respective wagering parameters/amounts, which may be different from the wagering parameters/amounts configured by other game player-participants.

The various skill-based, wager-based gaming techniques described herein may be used to improve the visual relationship between player and machine to increase player immersion and facilitate longer more exciting gambling durations without providing a completely new back-end delivery structure. It also improves the player method of interaction with the gambling game by allowing for a plethora of new age interface devices to be coupled with specific themed games (e.g., guns, joysticks, controllers, etc.). Existing technology and gameplay, although proven, is becoming dated and "not as fun" to younger players. The skill-based, wager-based gaming techniques described herein may satisfy the younger demographics gameplay needs while still satisfying the house and regulatory needs by having the same foundation which has already been tested/approved. The presentation of the gaming elements are comprised in such a way where younger demographics may be more compelled to gamble while still allowing older demographics to understand and enjoy the experience if they so desire to participate. The skill-based, wager-based gaming techniques described herein may also be utilized for enabling enhanced slot machine gambling with new and exciting twists, while still being compliant with local/state/Federal gaming regulations.

Walkthrough of Examples Skill-Based, Wager-Based Game Embodiment(s)

The following example is intended to help illustrate some of the various types of functions, operations, actions, and/or other features which may be provided by the skill-based, wager-based gaming system. At least a portion of these various processes, procedures and activities may also be illustrated and described with respect to the flow diagrams of FIGS. 10-13.

Initially, it is assumed that a player (e.g., or players) engages with a skill-based, wager-based gaming device via standard method (e.g., inserting monetary amount), selects gameplay and wagering options via button panel (e.g., different "characters" equal different bet/wager amounts e.g. 1 line vs 30 lines), "shoots" moving elements on the display (e.g., destroying a target qualifies as a triggering event for causing initiation of a wager-based event (e.g., initiating a wager-based spin of a virtual slot reel, which collects a specified amount of wagered credits), claims winnings/payouts (e.g., based on the outcome of the virtual slot reel spin), and continues to "shoot" until additional monetary amount is needed to continue play (e.g., out of credits) and/or until player is satisfied with gambling duration and decides to discontinue gameplay.

In some embodiments, the player character is on a "rail" (e.g., "House of the Dead", "Area 51", "Lethal Enforcers" one or more of which are classic arcade rail styled shooter games) which does not allow for free range of movement or choice of direction within the gaming environment (e.g., commonly referred to as "game world" or "game level").

The automated movement of the player's character is determined by the game's functionality and whether or not the player is actually playing (e.g., destroying zombies). By way of illustration, let's envision a short animated sequence—the player's mercenary character kicks down a door and enters a small maintenance room, Upon entering the room he stops to make sure the environment is safe to move on, however, 5 NPC's (e.g., Non Player Characters) heard the noise (e.g., from the door being kicked down) and have now surrounded the mercenary and are beginning to attack. Once the player character is in the room and surrounded, the rail movement (e.g., kicking down the door and walking into the room) stops. Once stopped, the player may use the game's HID (e.g., an electro-mechanical gun, which, for example, may be electronically tethered to the gaming device) to shoot and destroy the 5 NPC's.

According to different embodiments, one or more different types of gameplay-related triggering event(s)/condition(s) may be defined for initiating a wager-based event to occur during game play (e.g., execution of wager-based slot reel spin may take place concurrently with or simultaneously with the player's continued and active participation in the arcade-style portion of the game). Examples of different types of triggering event(s)/condition(s) may include, but are not limited to, one or more of the following (e.g., or combinations thereof):

Pulling a trigger;
Firing a shot with a gun or other weapon;
Hitting a specified target;
Destroying a specified virtual object;
One or more character movements such as, for example, jumping, ducking, punching, hitting, running, sitting, etc.;
An environmental object event, such as, for example, volcano eruption, avalanche, earthquake, or sci-fi/fantasy element (e.g., a strange alien world may harbor anti-matter pockets and/or worm-holes in space-time) and/or weather (e.g., "Lightning Strike" trigger);
NPC or Boss event such as, for example, a mage or magic wielding character casting a specific spell (e.g., Fire Flare bonus round), a boss summoning a group of minions during a battle (e.g., Golden Goblin minions with multipliers);
Predetermined outcome via host application such as, for example, a property may "credit/reward" a specific patron by triggering an event (e.g., "Hot Seat bonus" etc.), and/or may initiate an event based on a situation deemed necessary for triggering such an event. (e.g., See, e.g., 1208, FIG. 12);
A multiplayer and/or team and/or co-op event (e.g., similar to other embodiments described and/or referenced herein) in occurrence with multiple players and situations thereof;
And/or other types of event(s)/condition(s) may be defined for initiating a wager-based event to occur during game play.

Examples of different types of wager-based gaming events which may be initiated may include, but are not limited to, one or more of the following (e.g., or combinations thereof):

spin of virtual slot reel (e.g., based on RNG)
spin of roulette wheel
throw of dice
dealing of one or more cards
pick & choose/find hidden item
scramble elements/find hidden item
"scratch off"/reveal hidden item
a pachinko round
"virtual" carnival/parlor events/spin of a wheel, etc.
and/or other types of wager-based gaming events (e.g., or wager-based games) known in the art and/or described and/or referenced herein.

In at least one embodiment, it is preferable that the gameplay-related triggering event(s)/condition(s) (e.g., for triggering initiation of a wager-based event to occur) relates to an event which repeatedly occurs during the player's active participation in the arcade-style portion of the game, such as, for example: pulling of a trigger, firing of a weapon, hitting an object/target, destroying and object, etc.

For example, in one embodiment, each time the player fires a shot (e.g., by pulling a trigger of the gun-HID device) during play of the arcade portion of the skill-based, wager-based game, the system may automatically initiate a wager-based spin of a virtual slot reel. In other embodiments, each time the player destroys a specified target (e.g., destroys a zombie) during play of the arcade portion of the skill-based, wager-based game, the system may automatically initiate a wager-based spin of the virtual slot reel.

In some embodiments, the skill-based, wager-based game may be configured or designed as a "rail movement" type game, where the player's character is automatically moved through various scenes of the game (e.g., as if the player's character were riding on an automated rail or transport). Rail movement advances the player's character into next game world location. The rail movement durations may be short, as to not interfere with quickly repetitive and continuous shoot/spin gameplay situations. In some embodiments, there may be stopping points of play as well as regulated movement intervals which comply with then current gambling regulations and/or local casino gaming requirements/preferences (e.g., casino may deem it desirable that play of the skill-based, wager-based game achieves at least 8 spins of virtual slot reel per minute). In at least some embodiments, the skill-based, wager-based game may also be configured or designed to take into account standard slot game feature transition times, bonus round intro's, wild animations, etc., when determining rail movements and sequence zones.

In some embodiments, if the player decides not to shoot or destroy the Non Player Characters ("NPCs"), the NPC's may eventually destroy the player character. In at least one embodiment, when this occurs, the player character may automatically rejuvenate (e.g., come to life again), and the player may be provided with additional opportunities to destroy the NPC's at the current visual gaming location (e.g., level), before being allowed to proceed to the next level. Thus it will be appreciated that, in at least some embodiments, the skill-based, wager-based game may be configured or designed to provide a minimal/no cost of failure (e.g., as compared with traditional arcade-style video games where loss of lives/credits=game over). Such techniques provide an advantage of allowing a player to temporarily depart from the game (e.g., to order a drink, have a smoke, etc.) as a traditional slot player might do. During such moments, play of the skill-based, wager-based gaming device may be considered to be in an idle state. However, in some embodiments, even though the skill-based, wager-based game may provide idle benefits, the game may continue to display or impart a visual sense of urgency to promote/stimulate gameplay (e.g., zombies continue to attack player character during idle game state).

According to different embodiments, different skill-based, wager-based games may be configured or designed to include at least one arcade-style game play portion and at least one wager-based game play portion. Examples of various arcade-style games or arcade-style themes which may be used in implementing the arcade-style game play portion of the skill-based, wager-based game may include, but are not limited to, one or more of the following (or combinations thereof):

- "First person shooter" type, arcade-style games such as, for example, "House of the Dead," "Area 51", "Lethal Enforcers".
- "Non-linear" (e.g., open world) type video and/or arcade-style games such as, for example, Grand Theft Auto.
- "Linear" type video and/or arcade-style games such as, for example, Half-Life.
- Massively multiplayer online "MMO" type video and/or arcade-style games such as, for example, World of Warcraft.
- Role-playing game "RPG" type video and/or arcade-style games such as, for example, "Final Fantasy".
- Racing/Driving arcade style game(s) (e.g., Cars, boats, planes etc.).
- Sports-themed arcade style game(s) (e.g., Football, Baseball, downhill skiing, etc.).
- Challenge arcade style game(s) (e.g., Archery, Darts, Hunting, Shooting, etc.).
- Recreation arcade style game(s) (e.g., Horseshoes, Croquet, Fishing etc.).
- TV-themed arcade style game(s).
- And/or other types of arcade-style games.

Examples of various wager-based games or wager-based themes which may be used in implementing the wager-based game play portion of the skill-based, wager-based game may include, but are not limited to, one or more of the following (or combinations thereof):

- Spin of virtual slot reel (e.g., based on RNG). Examples of these types of wager-based games of chance include the RNG-based virtual slot games.
- Throw of virtual dice. An example of this type of wager-based game of chance includes the RNG-based virtual dice game.
- Spin of a virtual roulette wheel or other type of wheel (such as, for example, "Wheel of Fortune").
- Examples of these types of wager-based games of chance include the RNG-based virtual roulette game, and the RNG-based "Wheel of Fortune" game.
- Dealing of one or more virtual cards.
- Pick & choose/find hidden item.
- Scramble elements/find hidden item.
- "Scratch off"/reveal hidden item.
- A pachinko-type game.
- A bingo-type game.
- "Virtual" carnival/parlor events/spin of a wheel, etc.
- And/or other types of RNG-based games of chance known in the art and/or described and/or referenced herein.

According to different embodiments, different types of electronic gaming machine cabinets may be configured with different human interface devices ("HIDs") for enabling players/participants to engage in one or more of the skill-based, wager-based gaming activities described and/or referenced herein. Examples of different human interface devices ("HIDs") may include, but are not limited to, one or more of the following (or combinations thereof):

- Touchscreen interfaces
- Mechanical Buttons
- Gun, Pistol, Shooting Device
- Mechanical Joystick
- Gaming Controller such as, for example, remote gaming controllers similar to those used for X-Box™ Playstation™, Wii™, etc.
- Mechanical vehicle components such as, for example, vehicle steering wheel, gear shift, gas pedal, brake pedal, clutch pedal, etc.
- And/or other types of HIDs described and/or referenced herein and/or commonly known.

Walkthrough of Examples Skill-Based, Wager-Based Game Embodiment(s)

The following example is intended to help illustrate some of the various types of functions, operations, actions, and/or other features which may be provided by the skill-based, wager-based gaming system. At least a portion of these various processes, procedures and activities may also be illustrated and described with respect to the flow diagrams of FIGS. 10-13.

Initially, it is assumed that a player (e.g., or players) engages with a skill-based, wager-based gaming device via standard method (e.g., inserting monetary amount), selects gameplay and wagering options via button panel (e.g., different "characters" equal different bet/wager amounts e.g. 1 line vs 30 lines), "shoots" moving elements on the display (e.g., destroying a target qualifies as a triggering event for causing initiation of a wager-based event (e.g., initiating a wager-based spin of a virtual slot reel, which collects a specified amount of wagered credits), claims winnings/payouts (e.g., based on the outcome of the virtual slot reel spin), and continues to "shoot" until additional monetary amount is needed to continue play (e.g., out of credits) and/or until player is satisfied with gambling duration and decides to discontinue gameplay.

In some embodiments, the player character is on a "rail" (e.g., "House of the Dead", "Area 51", "Lethal Enforcers" one or more of which are classic arcade rail styled shooter games) which does not allow for free range of movement or choice of direction within the gaming environment (e.g., commonly referred to as "game world" or "game level").

The automated movement of the player's character is determined by the game's functionality and whether or not the player is actually playing (e.g., destroying zombies). By way of illustration, let's envision a short animated sequence—the player's mercenary character kicks down a door and enters a small maintenance room, Upon entering the room he stops to make sure the environment is safe to move on, however, 5 NPC's (e.g., Non Player Characters) heard the noise (e.g., from the door being kicked down) and have now surrounded the mercenary and are beginning to attack. Once the player character is in the room and surrounded, the rail movement (e.g., kicking down the door and walking into the room) stops. Once stopped, the player may use the game's HID (e.g., an electro-mechanical gun, which, for example, may be electronically tethered to the gaming device) to shoot and destroy the 5 NPC's.

According to different embodiments, one or more different types of gameplay-related triggering event(s)/condition(s) may be defined for initiating a wager-based event to occur during game play (e.g., execution of wager-based slot reel spin may take place concurrently with or simultaneously with the player's continued and active participation in the arcade-style portion of the game). Examples of different types of triggering event(s)/condition(s) may include, but are not limited to, one or more of the following (e.g., or combinations thereof):

- Pulling a trigger;
- Firing a shot with a gun or other weapon;
- Hitting a specified target;
- Destroying a specified virtual object;
- One or more character movements such as, for example, jumping, ducking, punching, hitting, running, sitting, etc.;
- An environmental object event, such as, for example, volcano eruption, avalanche, earthquake, or sci-fi/fantasy element (e.g., a strange alien world may harbor anti-matter pockets and/or worm-holes in space-time) and/or weather (e.g., "Lightning Strike" trigger);
- NPC or Boss event such as, for example, a mage or magic wielding character casting a specific spell (e.g., Fire Flare bonus round), a boss summoning a group of minions during a battle (e.g., Golden Goblin minions with multipliers);
- Predetermined outcome via host application such as, for example, a property may "credit/reward" a specific patron by triggering an event (e.g., "Hot Seat bonus" etc.), and/or may initiate an event based on a situation deemed necessary for triggering such an event. (e.g., See, e.g., 1208, FIG. 12);
- A multiplayer and/or team and/or co-op event (e.g., similar to other embodiments described and/or referenced herein) in occurrence with multiple players and situations thereof;
- And/or other types of event(s)/condition(s) may be defined for initiating a wager-based event to occur during game play.

Examples of different types of wager-based gaming events which may be initiated may include, but are not limited to, one or more of the following (e.g., or combinations thereof):

- spin of virtual slot reel (e.g., based on RNG)
- spin of roulette wheel
- throw of dice
- dealing of one or more cards
- pick & choose/find hidden item
- scramble elements/find hidden item
- "scratch off"/reveal hidden item
- a pachinko round
- "virtual" carnival/parlor events/spin of a wheel, etc.
- and/or other types of wager-based gaming events (e.g., or wager-based games) known in the art and/or described and/or referenced herein.

In at least one embodiment, it is preferable that the gameplay-related triggering event(s)/condition(s) (e.g., for triggering initiation of a wager-based event to occur) relates to an event which repeatedly occurs during the player's active participation in the arcade-style portion of the game, such as, for example: pulling of a trigger, firing of a weapon, hitting an object/target, destroying and object, etc.

For example, in one embodiment, each time the player fires a shot (e.g., by pulling a trigger of the gun-HID device) during play of the arcade portion of the skill-based, wager-based game, the system may automatically initiate a wager-based spin of a virtual slot reel. In other embodiments, each time the player destroys a specified target (e.g., destroys a zombie) during play of the arcade portion of the skill-based, wager-based game, the system may automatically initiate a wager-based spin of the virtual slot reel.

In some embodiments, the skill-based, wager-based game may be configured or designed as a "rail movement" type game, where the player's character is automatically moved through various scenes of the game (e.g., as if the player's character were riding on an automated rail or transport). Rail movement advances the player's character into next game world location. The rail movement durations may be short, as to not interfere with quickly repetitive and continuous shoot/spin gameplay situations. In some embodiments, there may be stopping points of play as well as regulated movement intervals which comply with then current gambling regulations and/or local casino gaming requirements/preferences (e.g., casino may deem it desirable that play of the skill-based, wager-based game achieves at least 8 spins of virtual slot reel per minute). In at least some embodiments, the skill-based, wager-based game may also be configured or designed to take into account standard slot game feature transition times, bonus round intro's, wild animations, etc., when determining rail movements and sequence zones.

In some embodiments, if the player decides not to shoot or destroy the Non Player Characters ("NPCs"), the NPC's may eventually destroy the player character. In at least one embodiment, when this occurs, the player character may automatically rejuvenate (e.g., come to life again), and the player may be provided with additional opportunities to destroy the NPC's at the current visual gaming location (e.g., level), before being allowed to proceed to the next level. Thus it will be appreciated that, in at least some embodiments, the skill-based, wager-based game may be configured or designed to provide a minimal/no cost of failure (e.g., as compared with traditional arcade-style video games where loss of lives/credits=game over). Such techniques provide an advantage of allowing a player to temporarily depart from the game (e.g., to order a drink, have a smoke, etc.) as a traditional slot player might do. During such moments, play of the skill-based, wager-based gaming device may be considered to be in an idle state. However, in some embodiments, even though the skill-based, wager-based game may provide idle benefits, the game may continue to display or impart a visual sense of urgency to promote/stimulate gameplay (e.g., zombies continue to attack player character during idle game state).

According to different embodiments, different skill-based, wager-based games may be configured or designed to include at least one arcade-style game play portion and at least one wager-based game play portion. Examples of various arcade-style games or arcade-style themes which may be used in implementing the arcade-style game play portion of the skill-based, wager-based game may include, but are not limited to, one or more of the following (or combinations thereof):

- "First person shooter" type, arcade-style games such as, for example, "House of the Dead," "Area 51", "Lethal Enforcers".
- "Non-linear" (e.g., open world) type video and/or arcade-style games such as, for example, Grand Theft Auto.
- "Linear" type video and/or arcade-style games such as, for example, Half-Life.
- Massively multiplayer online "MMO" type video and/or arcade-style games such as, for example, World of Warcraft.
- Role-playing game "RPG" type video and/or arcade-style games such as, for example, "Final Fantasy".
- Racing/Driving arcade style game(s) (e.g., Cars, boats, planes etc.).
- Sports-themed arcade style game(s) (e.g., Football, Baseball, downhill skiing, etc.).
- Challenge arcade style game(s) (e.g., Archery, Darts, Hunting, Shooting, etc.).

Recreation arcade style game(s) (e.g., Horseshoes, Croquet, Fishing etc.).

TV-themed arcade style game(s).

And/or other types of arcade-style games.

Examples of various wager-based games or wager-based themes which may be used in implementing the wager-based game play portion of the skill-based, wager-based game may include, but are not limited to, one or more of the following (or combinations thereof):

Spin of virtual slot reel (e.g., based on RNG). Examples of these types of wager-based games of chance include the RNG-based virtual slot games.

Throw of virtual dice. An example of this type of wager-based game of chance includes the RNG-based virtual dice game.

Spin of a virtual roulette wheel or other type of wheel (such as, for example, "Wheel of Fortune").

Examples of these types of wager-based games of chance include the RNG-based virtual roulette game, and the RNG-based "Wheel of Fortune" game.

Dealing of one or more virtual cards.

Pick & choose/find hidden item.

Scramble elements/find hidden item.

"Scratch off"/reveal hidden item.

A pachinko-type game.

A bingo-type game.

"Virtual" carnival/parlor events/spin of a wheel, etc.

And/or other types of RNG-based games of chance known in the art and/or described and/or referenced herein.

According to different embodiments, different types of electronic gaming machine cabinets may be configured with different human interface devices ("HIDs") for enabling players/participants to engage in one or more of the skill-based, wager-based gaming activities described and/or referenced herein. Examples of different human interface devices ("HIDs") may include, but are not limited to, one or more of the following (or combinations thereof):

Touchscreen interfaces

Mechanical Buttons

Gun, Pistol, Shooting Device

Mechanical Joystick

Gaming Controller such as, for example, remote gaming controllers similar to those used for X-Box™, Playstation™, Wii™, etc.

Mechanical vehicle components such as, for example, vehicle steering wheel, gear shift, gas pedal, brake pedal, clutch pedal, etc.

And/or other types of HIDs described and/or referenced herein and/or commonly known.

Example Skill-Based, Wager-Based Game GUIs and Procedures

FIGS. 10-13 illustrate various example embodiments of different skill-based, wager-based gaming procedures and/or procedural flows which may be used for facilitating activities relating to one or more of the skill-based, wager-based gaming aspects disclosed herein.

Figure 15:
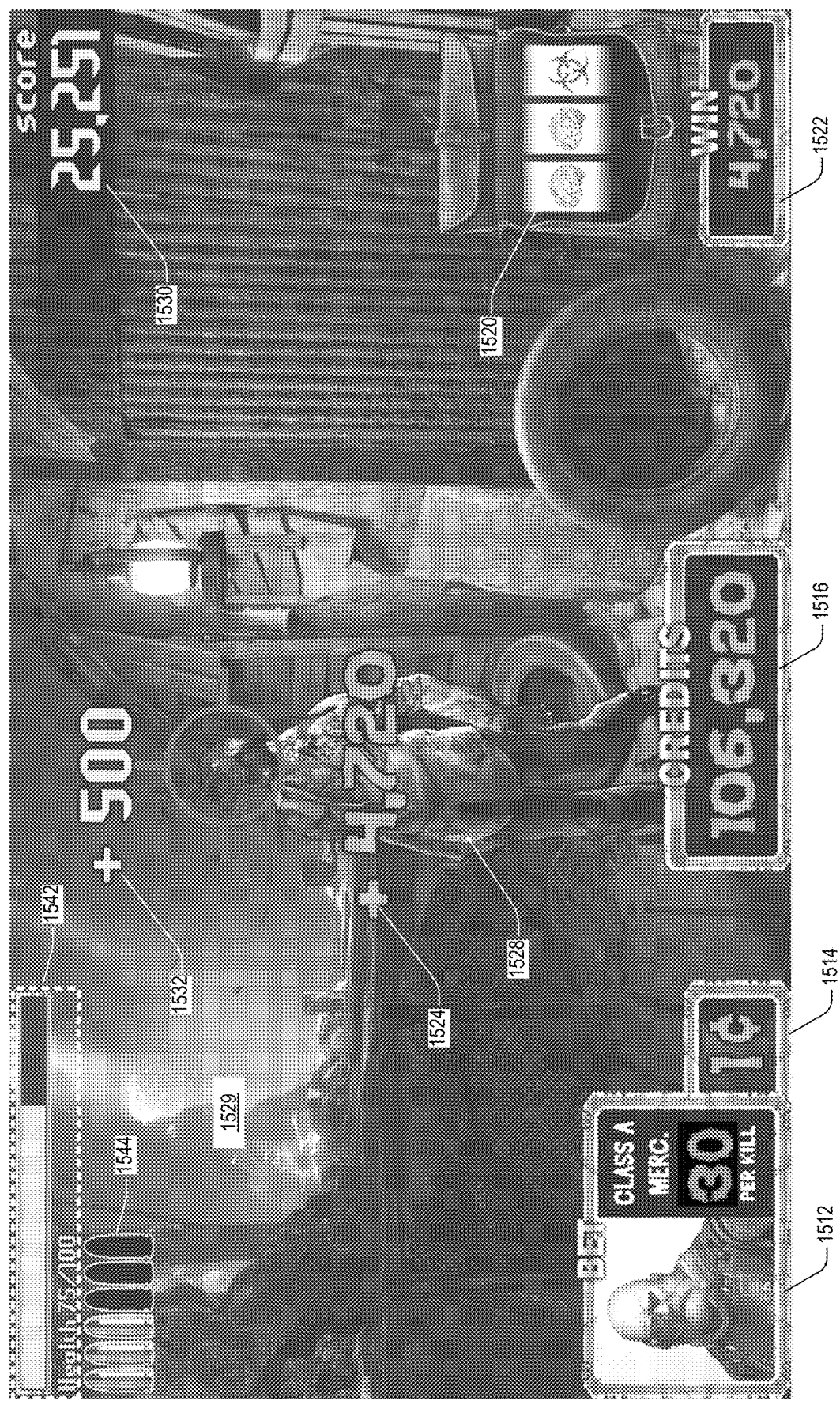
FIG. 15-20 illustrate different example embodiments of various screenshots of skill-based, wager-based game GUIs which may be used for facilitating activities relating to one or more of the skill-based, wager-based gaming aspects disclosed herein. In at least one embodiment, at least a portion of the GUIs may be configured or designed for use at one or more mobile devices and/or at one or more casino gaming machines.

FIG. 15 illustrates an example screenshots of a skill-based, wager-based game GUIs which may be used for facilitating activities relating to one or more of the skill-based, wager-based gaming aspects disclosed herein. In at least one embodiment, at least a portion of the GUIs may be configured or designed for use at one or more mobile devices and/or at one or more casino gaming machines.

According to different embodiments, at least a portion of the various types of functions, operations, actions, and/or other features provided by the skill-based, wager-based gaming Procedures of FIGS. 10-13 may be implemented at one or more client systems(s), at one or more System Servers (s), and/or combinations thereof.

In at least one embodiment, one or more of the skill-based, wager-based gaming procedures may be operable to utilize and/or generate various different types of data and/or other types of information when performing specific tasks and/or operations. This may include, for example, input data/information and/or output data/information. For example, in at least one embodiment, the skill-based, wager-based gaming procedures may be operable to access, process, and/or otherwise utilize information from one or more different types of sources, such as, for example, one or more local and/or remote memories, devices and/or systems. Additionally, in at least one embodiment, the skill-based, wager-based gaming procedures may be operable to generate one or more different types of output data/information, which, for example, may be stored in memory of one or more local and/or remote devices and/or systems. Examples of different types of input data/information and/or output data/information which may be accessed and/or utilized by the skill-based, wager-based gaming procedures may include, but are not limited to, one or more of those described and/or referenced herein.

In at least one embodiment, a given instance of the skill-based, wager-based gaming procedures may access and/or utilize information from one or more associated databases. In at least one embodiment, at least a portion of the database information may be accessed via communication with one or more local and/or remote memory devices. Examples of different types of data which may be accessed by the skill-based, wager-based gaming procedures may include, but are not limited to, one or more of those described and/or referenced herein.

According to specific embodiments, multiple instances or threads of the skill-based, wager-based gaming procedures may be concurrently implemented and/or initiated via the use of one or more processors and/or other combinations of hardware and/or hardware and software. For example, in at least some embodiments, various aspects, features, and/or functionalities of the skill-based, wager-based gaming procedures may be performed, implemented and/or initiated by one or more of the various systems, components, systems, devices, procedures, processes, etc., described and/or referenced herein.

According to different embodiments, one or more different threads or instances of the skill-based, wager-based gaming procedures may be initiated in response to detection of one or more conditions or events satisfying one or more different types of minimum threshold criteria for triggering initiation of at least one instance of the skill-based, wager-based gaming procedures. Various examples of conditions or events which may trigger initiation and/or implementation of one or more different threads or instances of the skill-based, wager-based gaming procedures may include, but are not limited to, one or more of those described and/or referenced herein.

According to different embodiments, one or more different threads or instances of the skill-based, wager-based gaming procedures may be initiated and/or implemented manually, automatically, statically, dynamically, concurrently, and/or combinations thereof. Additionally, different instances and/or embodiments of the skill-based, wager-based gaming procedures may be initiated at one or more different time intervals (e.g., during a specific time interval, at regular periodic intervals, at irregular periodic intervals, upon demand, etc.).

In at least one embodiment, initial configuration of a given instance of the skill-based, wager-based gaming procedures may be performed using one or more different types of initialization parameters. In at least one embodiment, at least a portion of the initialization parameters may be accessed via communication with one or more local and/or remote memory devices. In at least one embodiment, at least a portion of the initialization parameters provided to an instance of the skill-based, wager-based gaming procedures may correspond to and/or may be derived from the input data/information.

For purposes of illustration, an example walk-through of a specific embodiment of a skill-based, wager-based game will now be described by way of example with reference to the FIGS. 10-13.

It is to be noted that, although various process steps, method steps, algorithms or the like may be described in a sequential order, such processes, methods and algorithms may be configured to work in alternate orders. Accordingly, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

Figure 10:
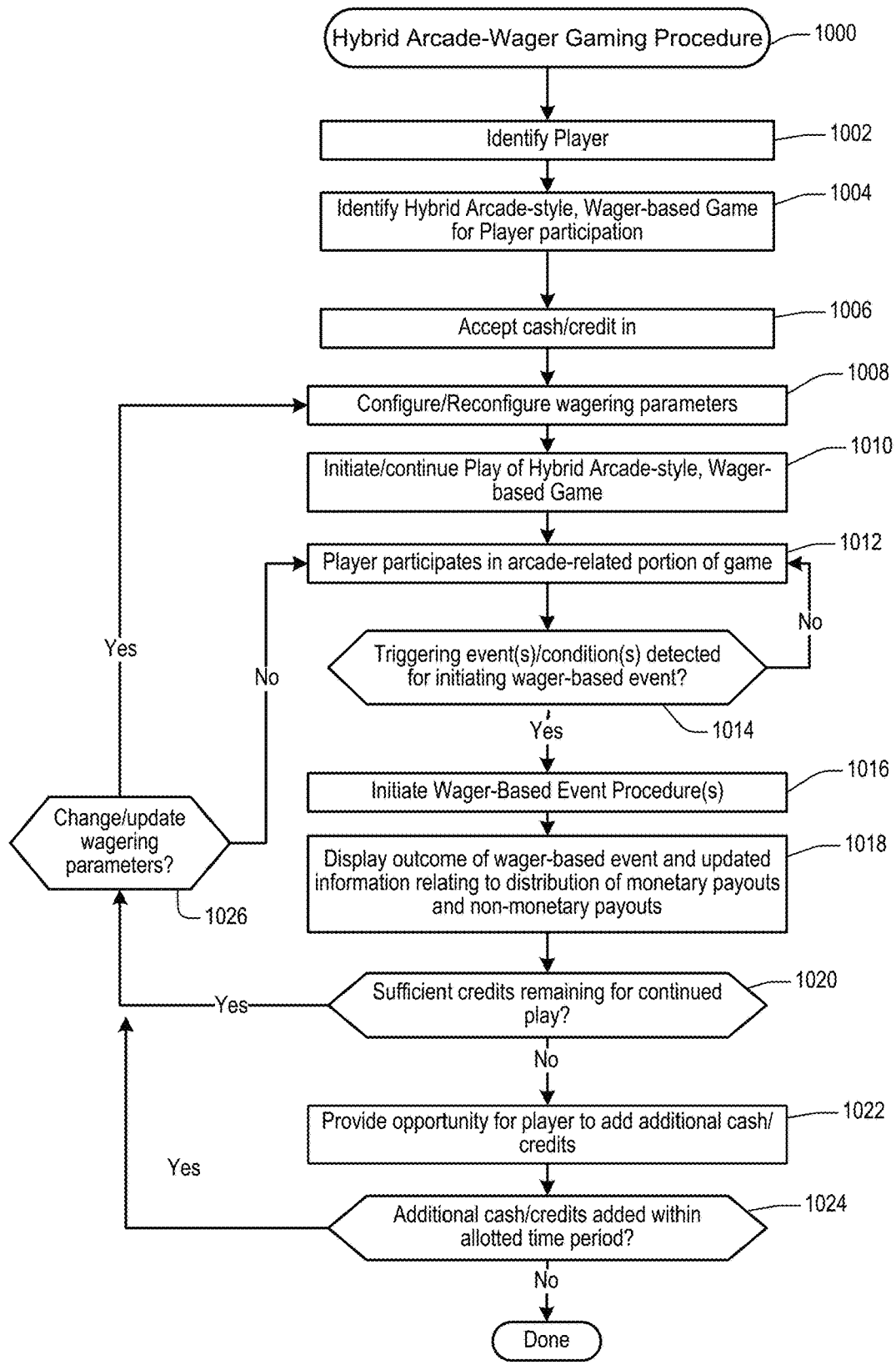
FIGS. 10-13 illustrate various example embodiments of different skill-based, wager-based gaming procedures and/or procedural flows which may be used for facilitating activities relating to one or more of the skill-based, wager-based gaming aspects disclosed herein.

FIG. 10 shows an illustrative example of an embodiment of a Hybrid Arcade-Wager Gaming Procedure 1000, which may also be referred to as a "Skill-based, Wager-Based Gaming Procedure" or "Hybrid Skill-based, Wager-Based Gaming Procedure". As illustrated in the example embodiment of FIG. 10, the Hybrid Arcade-Wager Gaming Procedure may facilitate, enable, initiate, and/or perform one or more of the following operation(s), action(s), and/or feature(s) (or combinations thereof):

Identify Player 1002.
Identify Hybrid Arcade-style, Wager-based game for Player participation 1004.
Accept cash/credit in 1006.
Configure/Reconfigure wagering parameters 1008. Reconfigure wagering parameters during continued game play, if desired
Initiate/continue Play of Hybrid Arcade-style, Wager-based game 1010. Continue play of game (if start of game already initiated).
Player participates in arcade-related portion of game 1012, which corresponds to the non-wager based portion of the skill-based, wager-based game.
Triggering event(s)/condition(s) detected for initiating wager-based event? For example:
NPC hit/destroyed?
NPC damaged by player's character?
Wagering Object collected by player's character?
Achievement satisfied or accomplished in non-wager-based portion of game?
Other type of wager-based triggering event detected?

Figure 11:
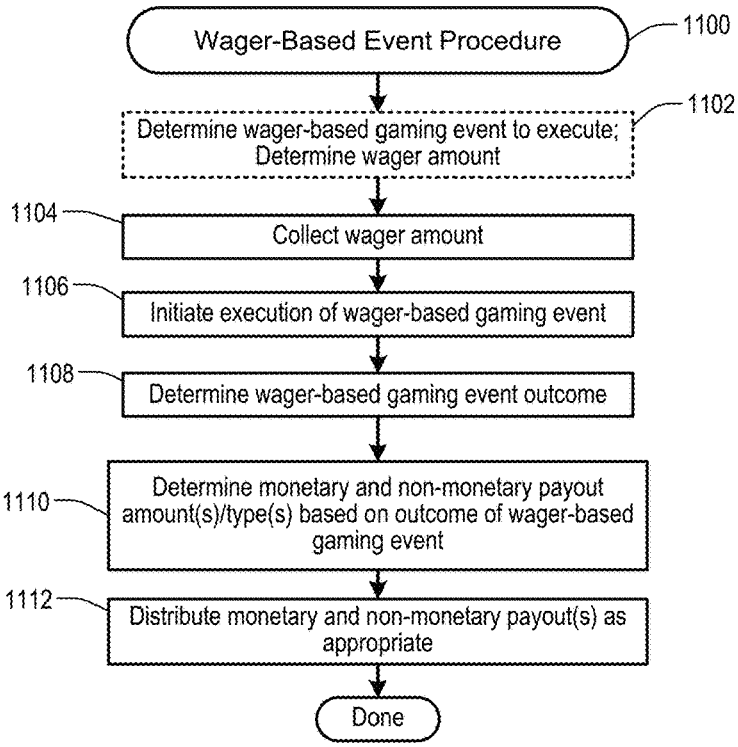

If yes to 1014, Initiate Wager-Based Event Procedure(s) 1016, such as those described with respect to FIG. 11. By way of illustration:
Initiate wager-based virtual slot reel spin in response to successful NPC hit/destruction.
Initiate wager-based virtual slot reel spin in response to Player's character collecting "Wagering Ring" or "Gold Award Object".
Initiate wager-based virtual slot reel spin in response to player achieving an objective in the non-wager-based portion of the skill-based, wager-based game.
Display outcome of wager-based event and updated information relating to distribution of monetary payouts and non-monetary payouts.
Display outcome of wager-based event and updated information relating to distribution of monetary payouts and non-monetary payouts 1018. e.g., Display outcome of virtual slot reel spin and update player's credits based on payout from virtual slot reel spin. In some embodiments, depending upon the wager-based game event outcome, one or more non-monetary payouts may also be distributed (e.g., within the non-wager-based portion of the skill-based, wager-based game).
Sufficient credits remaining for continued play of skill-based, wager-based game 1020?
If yes to 1020, change/update wagering parameters 1026?
If no to 1020, provide opportunity for player to add additional cash/credits 1022.
Additional cash/credits added within allotted time period 1024?
If yes to 1024, present opportunity to change wager parameters 1026, and continue game play 1012.
If no to 1024, end player's participation in skill-based, wager-based game.

FIG. 11 shows an illustrative example of a Wager-Based Event Procedure 1100 in accordance with a specific example embodiment. In at least one embodiment, the Wager-Based Event Procedure 1100 may be initiated or implemented concurrently during skill-based, wager-based game play, allowing player to seamlessly continue arcade-style game play while wagering event is executed and outcome determined. As illustrated in the example embodiment of FIG. 11, the Wager-Based Event Procedure may facilitate, enable, initiate, and/or perform one or more of the following operation(s), action(s), and/or feature(s) (or combinations thereof):

Determine wager-based gaming event to execute, and determine wager amount(s) 1102.
Collect wager amount 1104. For example, collect one credit.
Initiate execution of wager-based gaming event 1106. For example, initiate spin of RNG-based virtual slot reels.
Determine wager-based gaming event outcome 1108. For example, determine outcome of virtual slot reel spin.
Determine monetary and non-monetary payout amount(s)/type(s) (if any) based on outcome of wager-based gaming event 1110. According to different embodiments, depending on the wager-based game event outcome, monetary payouts and/or non-monetary-payouts may be identified for distribution.
Distribute monetary and non-monetary payout(s) as appropriate 1112. For example, distribute any monetary payout(s) (e.g., credits) and/or non-monetary payouts due to player based on outcome of virtual slot reel spin.

Figure 13:
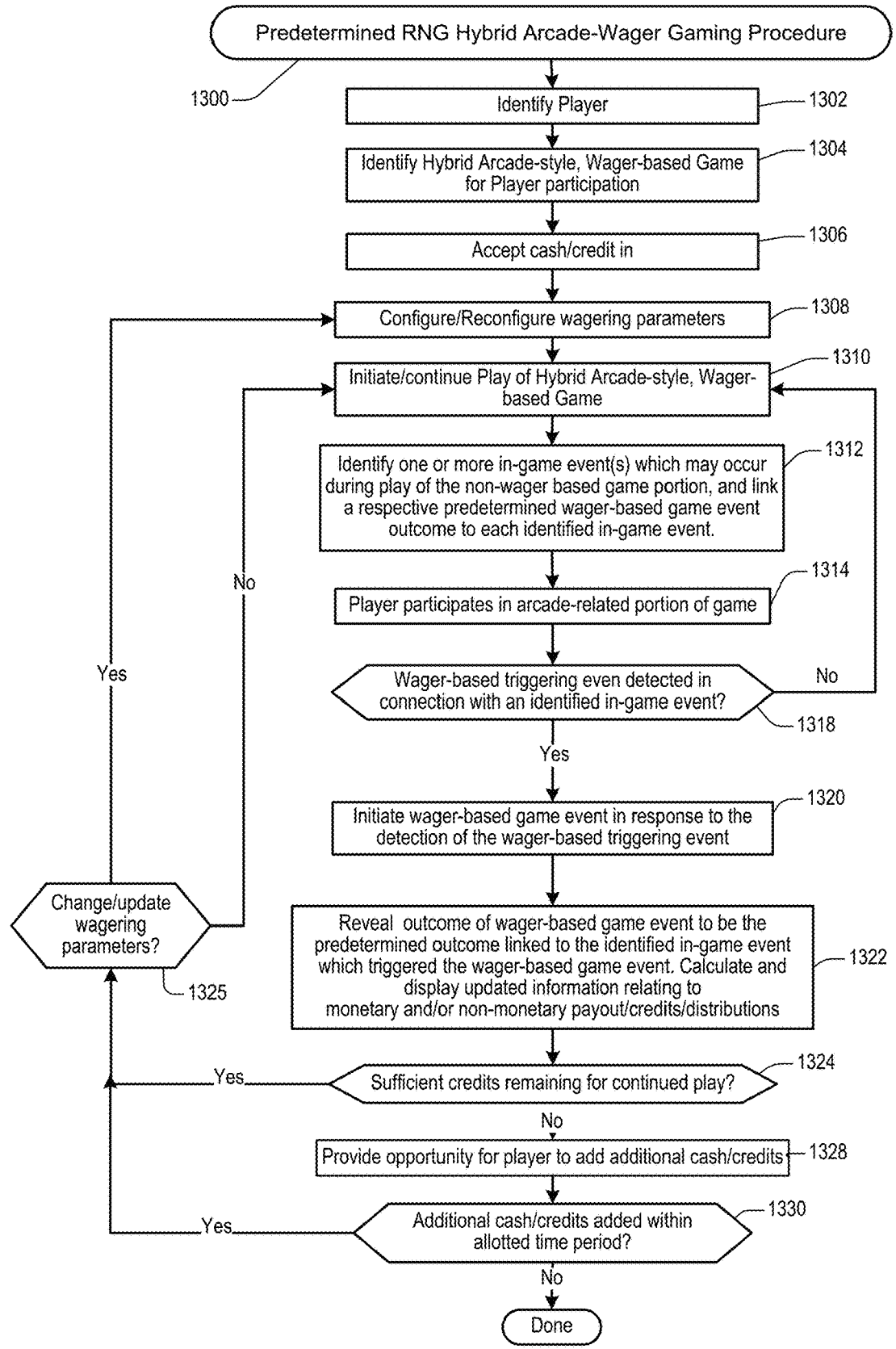

FIG. 13 shows an illustrative example of a Predetermined RNG Hybrid Arcade-Wager gaming Procedure 1300 in accordance with a specific example embodiment, which may also be referred to as a "Predetermined RNG Skill-based, Wager-Based Gaming Procedure" or "Predetermined RNG Hybrid Skill-based, Wager-Based Gaming Procedure. As illustrated in the example embodiment of FIG. 13, the Predetermined RNG Hybrid Arcade-Wager gaming Procedure may facilitate, enable, initiate, and/or perform one or more of the following operation(s), action(s), and/or feature(s) (or combinations thereof):

Identify Player 1302.

Identify Hybrid Arcade-style, Wager-based game for Player participation 1304.

Accept cash/credit in 1306.

Configure/Reconfigure wagering parameters 1308. Reconfigure wagering parameters during continued game play, if desired Initiate/continue Play of Hybrid Arcade-style, Wager-based game 1310. Continue play of game (if start of game already initiated).

Identify one or more in-game event(s) which may occur during play of the non-wager based game portion, and link a respective predetermined wager-based game event outcome to each identified in-game event 1312. In at least one embodiment, this may involve generating or acquiring a respective, predetermined outcome (e.g., RNG-based outcome) for one or more identified in-game event(s). For example, in the zombie-themed skill-based, wager-based game, each spawned NPC may have associated therewith a respective RNG-based game of chance outcome, which has been determined before the initiation of the associated RNG-based game of chance (e.g., before spin of virtual slot reels), and which has been determined before a wager-based triggering event has occurred in association with that particular NPC. However, in at least some embodiments, the skill-based, wager-based game may be configured or designed to prevent the player from being aware that the outcome of the wager-based game of chance has been predetermined. In such embodiments, even though the outcome of the wager-based game of chance has been predetermined, the skill-based, wager-based game may be configured or designed to lead the player to believe that the outcome of the wager-based game of chance was determined after the occurrence of the wager-based triggering event, and subsequent execution of the wager-based game of chance.

Player participates in arcade-related portion of game 1314, which corresponds to the non-wager based portion of the skill-based, wager-based game.

Wager-based triggering event detected in connection with an identified in-game event 1318? For example, in at least one embodiment, the gaming device may be configured or designed to monitor activities in the entertainment portion (e.g., non-wager-based portion) of the skill-based, wager-based game for occurrences of in-game event(s) which qualify as wager-based triggering event(s). In one embodiment, if an occurrence of an in-game event is detected, the gaming device may determine whether or not the occurrence of the detected in-game event qualifies as a wager-based triggering event. For example, the killing or destruction of an NPC in a zombie-themed skill-based, wager-based game may correspond to an in-game event which qualifies as a wager-based triggering event.

If it is determined that the occurrence of the first in-game event qualifies as a wager-based triggering event, the gaming device may initiate 1320 a wager-based game event in response to the occurrence or detection of the wager-based triggering event. For example, in at least one embodiment, when a wager-based triggering event occurs in the arcade (e.g., non-wager-based) portion of the skill-based, wager-based game, the skill-based, wager-based game may respond by automatically initiating a wager-based game event such as, for example, initiating wager-based spin of a set of virtual slot reels. In at least one embodiment, the process of initiating a wager-based game event may include:

automatically identifying an amount to be wagered on the outcome of the wager-based game event; and automatically using funds from the player's account to initiate and fund a wager (for the identified wager amount) on the outcome of the wager-based game event.

Reveal outcome of wager-based game event to be the predetermined outcome linked to the identified in-game event which triggered initiation of the wager-based game event. Calculate and display updated information relating to monetary and/or non-monetary payouts/credits/distributions (if any).

Sufficient credits remaining for continued play of skill-based, wager-based game 1824?

If yes to 1324, change/update wagering parameters 1325?

If no to 1324, provide opportunity for player to add additional cash/credits 1328.

Additional cash/credits added within allotted time period 1330?

If yes to 1330, present opportunity to change wager parameters 1325, and continue game play 1310.

If no to 1330, end player's participation in skill-based, wager-based game.

In at least some embodiments where skill-based, wager-based games are deployed in casino/regulated environments in which voluntary and/or mandatory rules/regulations are imposed (e.g., based on GLI standards, specific jurisdiction rules/regulations, and/or casino rules/regulations), one or more mechanisms may be implemented (see, e.g., FIG. 12) to cause wager-based game events to be initiated or triggered in a manner which conforms with governing rules/regulations. For example, according to different embodiments, a skill-based, wager-based game may be configured or designed to automatically create conditions for a wager-based triggering event to occur in situations where there is lack of player input while credits are present, and gameplay is expected. In other embodiments, one or more skill-based, wager-based games may be configured or designed to automatically cause wager-based game events to be initiated or triggered in accordance with specifically defined rules and/or criteria such as, for example, one or more of the following (or combinations thereof):

One wager-based event (e.g., virtual reel spin) about every 10 seconds (or sooner);

6 wager-based events (e.g., 6 separate reel spins) w/in 30 seconds);

10 wager-based events (e.g., 10 separate reel spins) during each level of game play);

Etc.

Additionally, in at least some embodiments, a player character's game world movement may be automatically controlled or influenced (e.g., via rail style, programmatically controlled gameplay destination paths, predetermined (and/or player-selectable) gameplay destination paths, etc.) to cause, satisfy, or achieve one or more identified or predefined goals/objectives. At least a portion of such goals/objectives may be defined by or generated by the skill-based, wager-based game software and/or by local rules/regulations governing play of the skill-based, wager-based game (e.g., in contrast to goals/objectives defined by the player). Additionally, in at least some embodiments, a player character's game world movement may also be automatically controlled or influenced so as to avoid the need for player input, and/or so as to avoid the need for providing specific HID hardware. For example, in one embodiment, a player character's game world movement may be automatically controlled or influenced in a manner which enables the player to interact with the gameplay elements via existing gaming cabinet hardware such as, for example, button panels, touchscreens, etc. In a controlled movement setting, the player may see their character travel a short distance on a game world map before engaging in a battle, similar to the Zombie Rail Shooter mentioned in previous embodiments where short automated movement zones offer a quick "break" in action/wagering events (e.g., to thereby cause the game to be in conformance with standards governing the occurrence of wager-based game events, which may be imposed by local rules/regulations).

Figure 12:
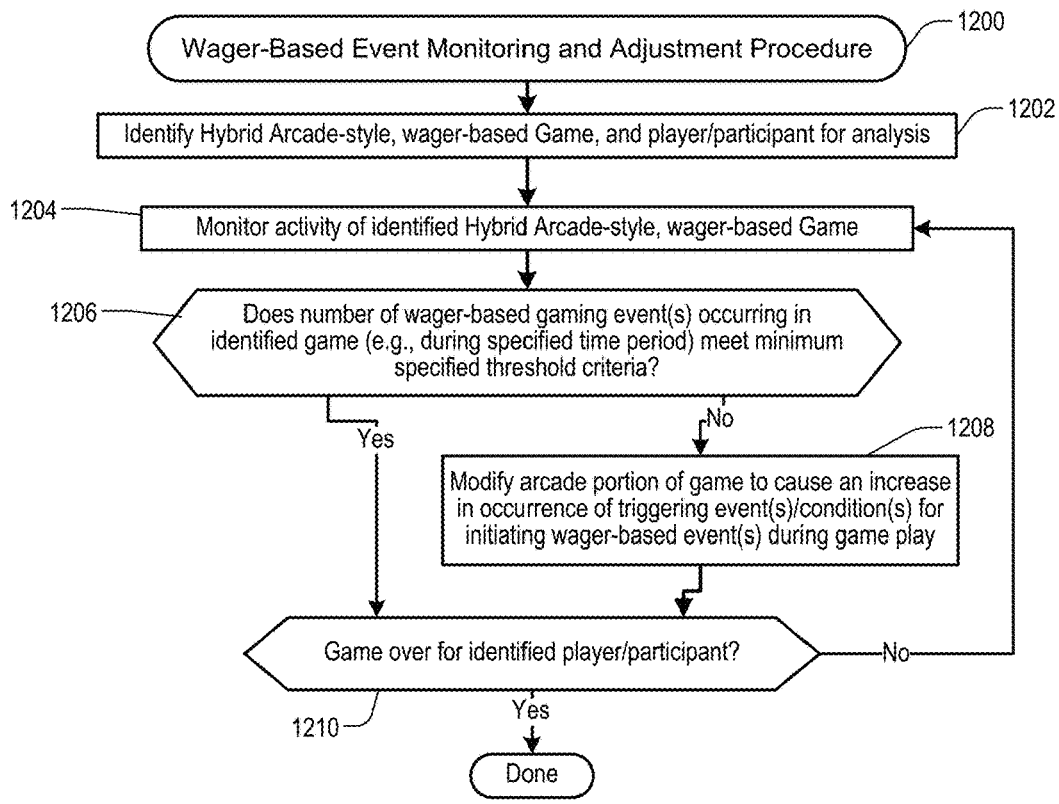

FIG. 12 shows an illustrative example of a Wager-Based Event Monitoring and Adjustment Procedure 1200 in accordance with a specific example embodiment. As illustrated in the example embodiment of FIG. 12, the Wager-Based Event Monitoring and Adjustment Procedure may facilitate, enable, initiate, and/or perform one or more of the following operation(s), action(s), and/or feature(s) (or combinations thereof):

Identify Hybrid Arcade-style, wager-based game, and player/participant for analysis 1202.
Monitor activity of identified Hybrid Arcade-style, wager-based game 1204.
Does number of wager-based gaming event(s) occurring in identified game (e.g., during specified time period) meet minimum specified threshold criteria 1206?
If no to 1206, modify arcade portion of game to cause an increase in occurrence of triggering event(s)/condition(s) for initiating wager-based event(s) during game play 1208. For example, in one embodiment, a minimum specified threshold criteria may be configured by the Casino such as, for example, one or more of the following (or combinations thereof):
  One wager-based event (e.g., virtual reel spin) about every 10 seconds (or sooner);
  6 wager-based events (e.g., 6 separate reel spins) w/in 30 seconds);
  10 wager-based events (e.g., 10 separate reel spins) during each level of game play);
  Etc.
If yes to 1206, game over for identified player/participant 1210?
If no to 1210, continue to monitor activity of identified hybrid skill-based, wager-based game 1204.

In a case where such games are featured in a casino/regulated environment, there may be a need to initiate or trigger a gambling event based on (e.g., GLI standards and/or specific jurisdiction guidelines) "lack of player input while credits are present and gameplay is expected" (e.g., 1208, FIG. 12). Also, a player characters game world movement may be automatically controlled (e.g., rail style and/or programmatically controlled predetermined (e.g., and/or selectable) gameplay destination paths) as to not facilitate the need for a specific HID, wherein the player could interact with the gameplay elements via current methods (e.g., button panel and/or touchscreen). In a controlled movement setting, the player may see their character travel a short distance on a game world map before engaging in a battle, similar to the Zombie Rail Shooter mentioned in previous embodiments where short automated movement zones offer a quick "break" in action/wagering events (e.g., conforming to regulatory spins per minute).

FIG. 15 shows a screenshot of an example embodiment of a skill-based, wager-based game GUI 1500 which may be used for facilitating game play and wagering activities relating to one or more of the skill-based, wager-based gaming aspects disclosed herein. More specifically, FIG. 15 shows an example screenshot of skill-based, wager-based game GUI based on concept of a first person shooter zombie game.

In the specific example embodiment of FIG. 15 it is assumed that the skill-based, wager-based game corresponds to a first person shooter zombie game. According to different embodiments, the skill-based, wager-based game GUI 1500 may be configured or designed to display graphics, animation, images, video, text, and/or other types of content such as, for example, one or more of the following (or combinations thereof):

Player character/avatar content (e.g., 1512). As illustrated in the example embodiment of FIG. 15, this may include an image of the character, a description of the character (e.g., Class A Merc.), and other characteristics associated with the character such as, for example, character classification, skill level, strength, speed, power, knowledge, weapons, bet/wager multiplier value (e.g., 30× per kill), etc.
Wagering content (e.g., 1514). In the specific example embodiment of FIG. 15, the wagering content 1514 includes a wager value (e.g., $0.01) representing an amount to be automatically wagered for each wager-based event which occurs during play of the skill-based, wager-based game.
Player credit information (e.g., 1516, 1524, 1522). In the specific example embodiment of FIG. 15, a first portion of player credit information 1524 may indicate recent credit(s) (e.g., "+4,720") awarded to the player (e.g., based on recent wager-based event), and a second portion of player credit information 1516 may indicate the player's current amount of total credits (e.g., 106, 320 credits).
Wager-based event outcome information (e.g., 1522). In the specific example embodiment of FIG. 15, the wager-based event outcome information 1522 shows an amount of credits awarded to the player based on the most recent wager-based game event which was initiated and executed during play of the skill-based, wager-based game.
Player character health status information (e.g., 1542).
Player character ammunition status information (e.g., 1544).
Player score information (e.g. 1530, 1532). In at least one embodiment, a first portion of player score information 1530 may represent the player's current total score achieved during the skill-based, wager-based game play session. In at least one embodiment, a second portion of player score information 1532 may represent the player's score or award which has been awarded to the player based on a game play event activity and/or outcome achieved during the skill-based, wager-based game play session.
Scene/Background Graphics (e.g., 1529)
NPC graphics/content (e.g., 1528)

In the specific example embodiment of FIG. 15, a classic styled slot game (e.g., 1520) comprising 3 virtual slot reels is displayed, and configured or designed to offer a 1 line setup. In the specific example embodiment of FIG. 15, the skill-based, wager-based game is configured or designed to use different player characters (e.g., "mercenaries", 1512) as bet multipliers. For example, as illustrated in the example embodiment of FIG. 15, the player may use the gaming device button panel to choose a wager amount "weapon" or "character" to use, say, an armored mercenary game character (e.g., 1512, FIG. 15) wielding a shotgun (e.g., equivalent to a 30 line max bet). A bet multiplier of "30" (e.g., 30×) is associated with Class A Mercenary character 1512. Additionally, as illustrated in the example embodiment of FIG. 15, the wagering denomination is $0.01 (e.g., 1514). Accordingly, since the selected game character/weapon (e.g., 1512) is configured to correspond to a 30× wager of the wagering denomination, this is equivalent to a $0.30 wager per kill (e.g., a $0.30 wager per kill of each NPC). Thus, for example, in the specific example embodiment of FIG. 15, when the player destroys NPC 1529, this event may qualify as a wager-based triggering event, which may cause the gaming machine to automatically place and initiate (using the player's funds) a $0.30 wager at the wager-based portion of the game (e.g., $0.30 wager automatically initiated at the slot game 1520). In some embodiments, the wager-based portion of the game is implemented as a RNG-based game of chance (e.g., such as a slot reel spin, roulette wheel spin, dice roll, etc.). In some embodiments, the outcome of the wager-based game event is determined after the wager-based triggering event has occurred. In other embodiments, as described in greater detail herein, the outcome of the wager-based game event is determined before the wager-based triggering event has occurred, but not revealed until after the wager-based triggering event has been initiated. In the specific example embodiment of FIG. 15, it is assumed that the outcome of the wager-based slot game 1520 results in the player winning 4,720 credits (1122), which may be automatically distributed to the player's account. In at least some embodiments, credits won by the player during play of the skill-based, wager-based game may be converted into cash or other forms of monetary currency or credit.

Relationships Between Entertainment Game and Wagering Game

In at least some embodiments of skill-based, wager-based games (HAWGs), there exists a specific need for a defined relationship between entertainment and gambling. In looking at examples of HAWG-type games, such as, for example, "Zombie$", "Winning Wheels" & "Basket Bonanza"—each theme has its own individual relationship between entertainment and gambling. Looking at "Zombie$" wherein a patron assumes the role of one or more mercenaries who battle hoards of the undead along with other demented creatures, the player is offered specific set of symbols which correlate to a paytable. The paytable defines winning combinations of symbols that in turn, when lined up correctly during a wager-based game event (e.g., corresponding to an RNG/game of chance outcome), may offer a pay out to the player.

Traditionally, when conducting wager-based gaming events in a wager-based game, a player places a wager (representing some amount of monetary value) on a specific wager-based game event, and the wager-based game event is then initiated and wager-based game event outcome is determined. If the wager-based game event outcome corresponds to a "win" for the player, a monetary payout is distributed to the player, typically in the form of tokens, cash, and/or credit.

Many of today's wager-based games are typically designed based on long-standing conventional wisdom that the primary motivation for players to engage and participate in wager-based games relates to the player's expectation of receiving a net positive financial gain. For example, a player may be motivated to bet one dollar on a video slot game because there is a possibility of the player winning a payout which exceeds $1.

Taking into account such conventional wisdom, most wager-based games are configured or designed to primarily offer monetary-type payouts for wager-based game event outcomes. Additionally, such monetary-type payouts are typically unrelated to, and have no effect or influence on, the gameplay portion of the wager-based game. The same is also true for skill-based, wager-based games. For example, in skill-based, wager-based games which include an entertainment (e.g., arcade-type) game portion and wager-based game portion, the monetary-type payouts associated with the wager-based game portion are typically unrelated to, and have no affect or influence on, the gameplay of the entertainment (e.g., arcade-type) game portion of the skill-based, wager-based game.

In contrast to such conventional wager-based game design considerations, various aspects disclosed herein are directed to techniques for implementing wager-based game event "payouts" which may be utilized by the player to affect and/or influence gameplay of the non-wager-based game portion and/or wager-based game portion of a skill-based, wager-based game being played by that player. For example, in at least some embodiments, one or more skill-based, wager-based games may be configured or designed to provide "payouts" to wager-based game events (e.g., occurring during play of a skill-based, wager-based game) which may be utilized by a player to affect and/or influence subsequent and/or continued gameplay of the entertainment (e.g., arcade-type) game portion of the skill-based, wager-based game (herein referred to as "non-monetary payouts").

Examples of various types of non-monetary payouts which may be utilized by a player to affect and/or influence gameplay of the entertainment game portion (e.g., non-wager-based game portion) of a skill-based, wager-based game, may include, but are not limited to, one or more of the following (or combinations thereof):

"Payouts" for increasing player character health.

"Payouts" for increasing available ammunition of player character's weapon and/or for adding additional type(s) of weapons/armor/ammunition to the player character's arsenal.

"Payouts" for enhancing existing character attributes/skills and/or for adding additional attributes/skills to the player's character (e.g., time manipulation, invisibility, invincibility, special powers, speed, strength, wisdom, stamina, etc.).

"Payouts" for enabling player character access to hidden levels, objects, rooms, etc.

Example non-monetary payouts relating to Zombie themed skill-based, wager-based games:

Medkit symbols for health increase by [x %]

Ammunition symbols for temporary ammo increase by [x seconds]

Clock symbols for temporary time slow, (i.e. "Matrix/bullet time") for [x seconds]

Biohazard symbols for "halving" onscreen NPC health, (will not kill NPC's)

Grenade symbols for "exploding bullets" for [x seconds]

Zombie symbols for temporary invincibility for [x seconds]

Brain symbols for temporary slow of zombie attack speeds for [x seconds]

Example non-monetary payouts relating to Driving themed skill-based, wager-based games:

Boost bottle symbols for [x seconds] of speed boost

Glue symbols for [x seconds] of no-skid traction control

Fuel tank symbols for [x amount] of fuel replenish

Leaf symbols for [x seconds] of no fuel use

Sun symbols for [i.e.] "One solar powered lap" {no fuel used for a lap}

Roll cage symbols for [x seconds] of invincibility

Guard rail symbols for [x seconds]—can't go off road

Example non-monetary payouts relating to RPG (MMO) themed skill-based, wager-based games:

Red crystal symbols for temporary health restore for player characters

Green crystal symbols for temporary stamina restore for player characters

Blue crystal symbols for temporary magic restore for player characters

Scroll symbols for temporarily removing fatigue or knock-out from a player

Independent cross symbols for temporary NPC stun, (i.e. stunned for one full turn)

Lucky feather symbols for doubling "graphical loot/item collected" for inventory [x seconds]

Smoke bomb symbols for temporarily increasing the deflection % from NPC attacks [x seconds]

Example non-monetary payouts relating to other types/themes of skill-based, wager-based games:

Key symbols—used for unlocking ingame treasure/loot chests

Lunch bag symbols—for removing hunger/thirst from a character

Weapon symbols—used to change rate/style of fire, (similar to "1942" & "Super Smash TV" games)

Shield symbols—used for temporary shields on player characters/vehicles/vessels

Tool symbols—used for fixing any type of broken ingame equipment

Lantern symbols—used for temporarily "lighting" the way in dark areas, (better than a flashlight)

Happy face symbols—doubles ammunition, (i.e. can only reload once it's all used) per time hit Non-monetary payouts relating to other types of in-game character skills and/or attributes, including, for example, one or more of the following (or combinations thereof):

damage;
defense;
power;
magic;
mana;
endurance;
health;
strength;
dexterity;
agility;
intelligence;
weapons;
spells;

and/or other types of player skills/attributes associated with RPG games.

And/or other types of non-monetary payouts.

In at least some embodiments, one or more of the non-monetary payouts may be enabled only temporarily, e.g., for a predetermined time interval, and/or until some specified event/condition occurs in the game.

Figure 16:
Figure 17:
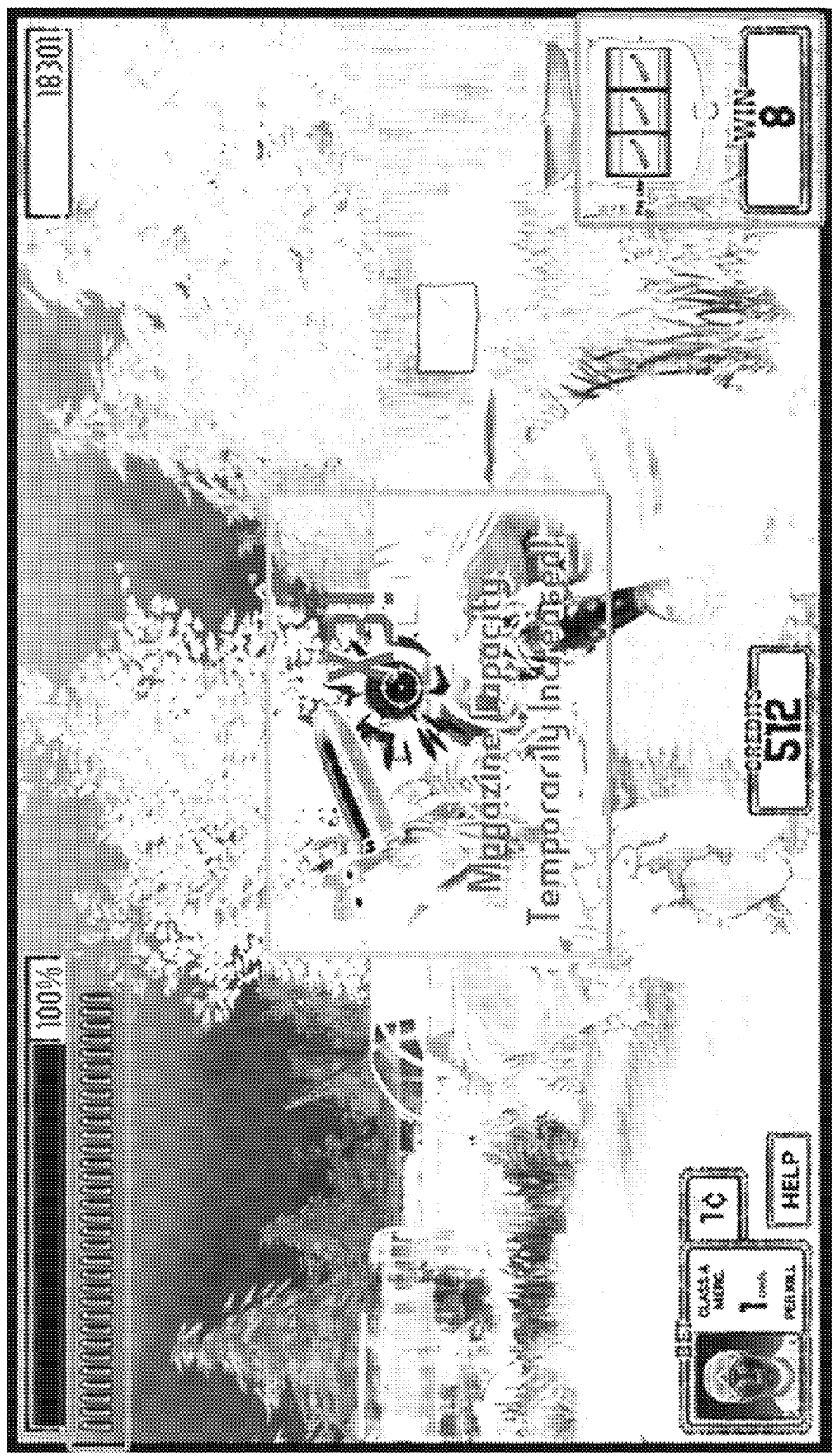

FIGS. 16-17 illustrate example screenshots of various skill-based, wager-based game GUIs illustrating different example scenarios where payouts for wager-based game events may include different types of non-monetary payouts.

By way of illustration, in one embodiment of a zombie themed skill-based, wager-based game, the slot symbols (e.g., corresponding to the wager-based slot game portion) may offer other non-monetary type "payouts", "awards" and/or "benefits" that may be utilized by a player to affect and/or influence gameplay of the entertainment game portion of the skill-based, wager-based game. For example, using a virtual three reel, single line slot configuration implemented in a Zombie themed skill-based, wager-based game, one or more of the following wager-based game event outcomes may result in different types of non-monetary payouts to the player:

3 med kit symbols=player health increased by [x %]

3 ammunition symbols=player ammo increase by [x] for [t] seconds

3 "pow" symbols=player gets "exploding bullets" for [x] seconds

For example, as illustrated in the example embodiment of FIG. 16, it may be assumed that, on the death/destruction of a NPC, a wager-based game event is triggered in which the wager-based game event outcome (e.g., RNG outcome of the virtual slot reels) corresponds to 3 "med kit" symbols (e.g., displayed on the payout line of the virtual slot reel display, as shown, for example, in FIG. 16). In at least one embodiment, the player may receive a monetary payout (e.g., cash or credits awarded to player), and may also receive a non-monetary "payout" in the form of additional health points for the player's game character (e.g., which increases the health status of player's character). Thus, for example, in the example embodiment of FIG. 16, the skill-based, wager-based game may notify the player that the outcome of the wager-based slot reel spin has resulted in the player receiving an in-game non-monetary payout award of 3 health med kits, which has been added to the player's in-game inventory of the non-wager-based portion of the skill-based, wager-based game.

In an alternate embodiment, as illustrated in the example embodiment of FIG. 17, the player may receive a monetary payout (e.g., cash or credits awarded to player) if the outcome of the wager-based game event (e.g., displayed on the virtual slot reel display) shows 3 bullet symbols in some specified combination/order of the virtual slot reel display. In at least some embodiments, even if the player does not receive a monetary payout based on a wager-based game event outcome, the wager-based game event outcome may still allow the player to receive a non-monetary payout which may be utilized by a player to affect and/or influence gameplay of the entertainment game portion of the skill-based, wager-based game. Thus, for example, in the example embodiment of FIG. 17, the skill-based, wager-based game may notify the player that the outcome of the wager-based slot reel spin has resulted in the player receiving a temporary increase of ammunition magazine capacity, for use in the non-wager-based portion of the skill-based, wager-based game.

Further, in at least some embodiments, even if the player does not receive a monetary payout based on a wager-based game event outcome, the wager-based game event outcome may still allow the player to receive a non-monetary payout which may be utilized by a player to affect and/or influence gameplay of the entertainment game portion of the skill-based, wager-based game. In at least some embodiments, the non-monetary "payout" does not affect the play or outcome of the wager-based game, but may affect or influence the player's gameplay experience in the entertainment game portion of the skill-based, wager-based game.

According to different skill-based, wager-based game embodiments, when players execute specific tasks throughout gameplay of the arcade-style portion of the game, the player may be rewarded in one or more of the following ways:

Player is rewarded for event outcomes which occur in the arcade-style portion of the game.

Player is rewarded with monetary payout(s) for wager-based game event outcomes which are triggered during play of the arcade-style portion of the game. In at least one embodiment, monetary payout(s) may be achieved by matching monetary paytable layout(s) which are used to determine the appropriate monetary payout(s) for each wager-based game event outcome.

Player is rewarded with non-monetary payout(s) for wager-based game event outcomes which are triggered during play of the arcade-style portion of the game, wherein the non-monetary payout(s) may be utilized by the player to affect and/or influence gameplay of the arcade-style portion of the skill-based, wager-based game. In at least one embodiment, non-monetary payout(s) may be achieved by matching non-monetary paytable layout(s) which are used to determine the appropriate non-monetary payout(s) for each wager-based game event outcome.

In at least some embodiments, a player may already be "expecting" to receive some sort of monetary-based win/lose experience during play of the skill-based, wager-based game (e.g., due to the fact that the game involves wager-based gaming. When a player "wins" in this situation, they become excited, even if the win amount is small. In the examples mentioned above, let's say the same player gets the same "small win" while also getting a temporary increase to their character's overall health (e.g., 100 max health now bumped up to 125 max). Not only does the player feel excitement from the win, but they now have an extra incentive to continue playing (e.g., attributable to their character's increased health capacity). The increased health capacity allows the player's character to take more damage for a longer period of time, keeping them in the game longer (unless/until the player decides to cash out, etc.).

Figure 18:
Figure 19:
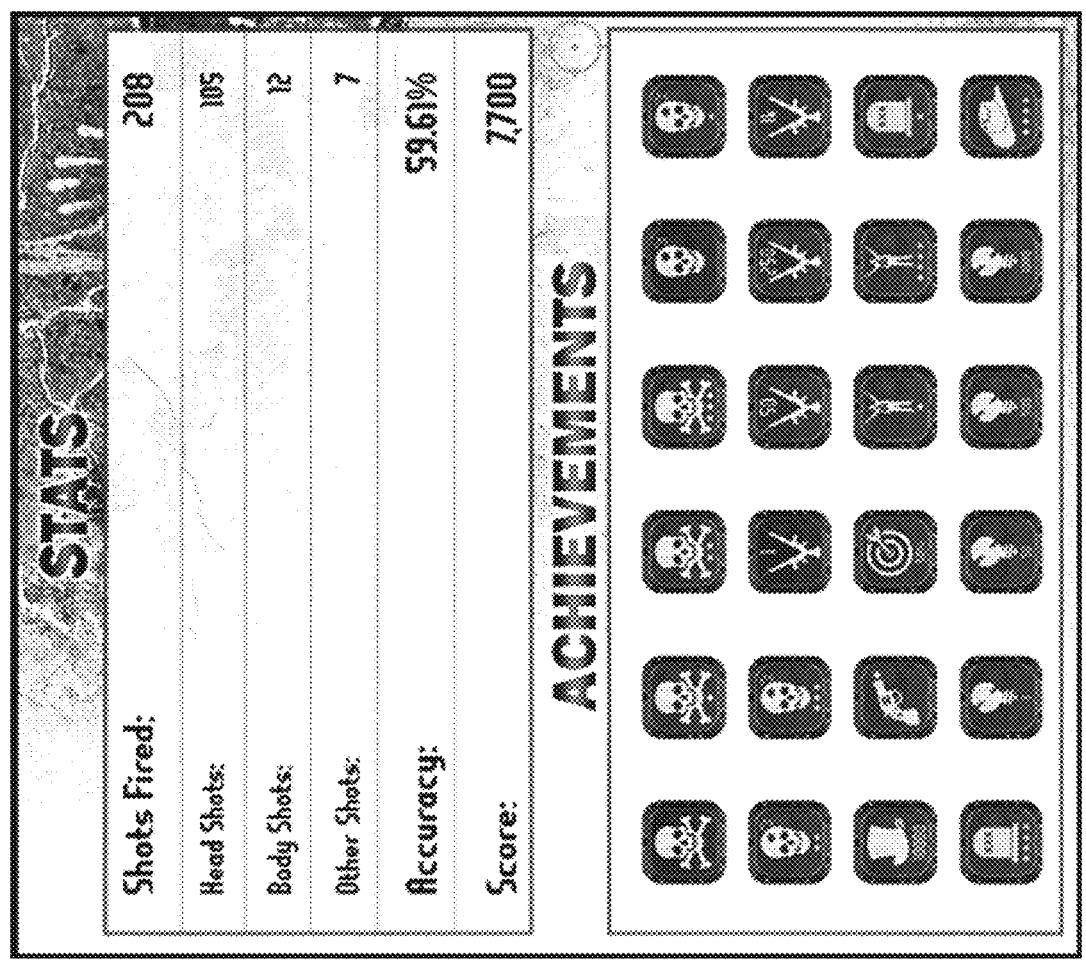
Figure 20:
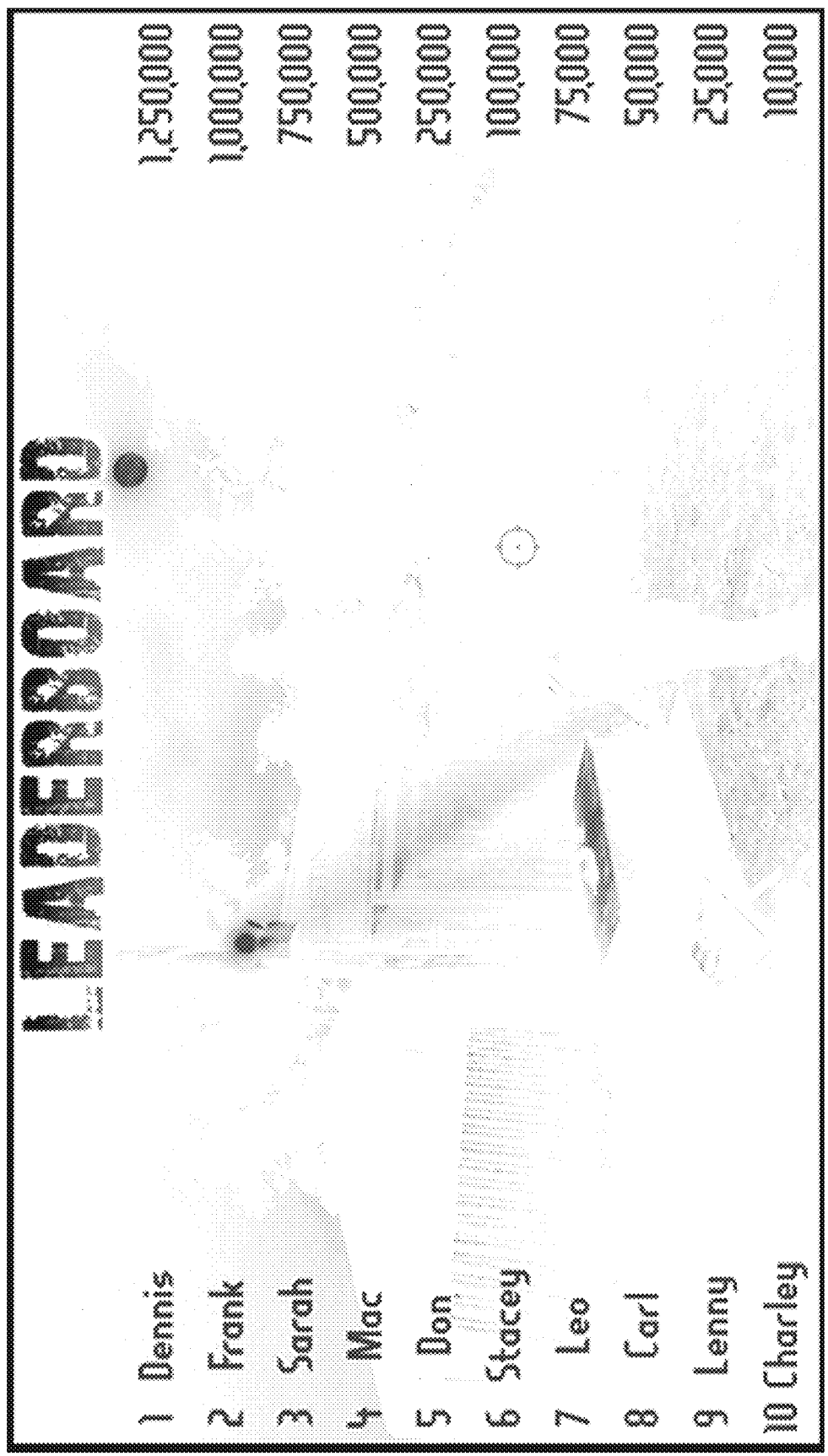

According to different embodiments, one or more skill-based, wager-based games may be configured or designed to include functionality for tracking and displaying various achievements which are earned or accomplished by one or more player(s) during play of one or more skill-based, wager-based games. By way of illustration, FIGS. 18-20 illustrate example screenshots of various skill-based, wager-based game GUIs illustrating how different types of in-game activities and achievements may be tracked and displayed via one or more electronic gaming device displays.

As with most of today's wager-based gaming slot machines, there is relatively little entertainment activity which occurs for the player during the wager-based game other than watching the reels spin before the results are displayed and the game is over. Accordingly, the "experiential value" of such conventional wager-based games (e.g., as perceived by the player) is focused primarily upon the relative monetary success of the player in terms of how much that player has won/lost, with relatively little (if any) consideration toward the entertainment value of the actual gameplay.

In contrast, the "experiential value" of skill-based, wager-based games (such as those described and/or referenced herein) is substantially focused on the entertainment value of the non-wager-based game play, as well as on the relative monetary success of the player in terms of how much that player has won/lost.

The various HAWG techniques described and/or referenced herein may be configured or designed to create different environments which attract "garners" and other players (such as those belonging to the Millennial demographic), provide significant and/or substantial entertainment activities with respect to non-wager-based gameplay, and which also provides the ability and opportunity for the players to concurrently participate in wager-based gaming, and to experience the acceleration attributable to wager-based gaming activity. Additionally, in at least some embodiments, such skill-based, wager-based games may be adapted and/or deployed via approved packages that are flexible enough to comply with multiple jurisdiction/regulations while still providing the ability for the hosting gaming entity (e.g., the house or casino) to customize and control various aspects relating to the skill-based, wager-based games.

It will be appreciated that, in at least some skill-based, wager-based game embodiments, it is desirable to determine and/or fine tune the optimal balance between (i) the player's awareness and focus on the non-wager-based gaming activity, and (ii) the player's awareness and focus on the wager-based gaming activity of the skill-based, wager-based game. For example, it may be preferable to configure or design skill-based, wager-based games so as to avoid creating situations where the player becomes so immersed in the non-wager-based gameplay that they "forget" they are gambling. Similarly, it may be preferable to configure or design skill-based, wager-based games so as to avoid creating situations where the player becomes so focused on the wager-based gameplay that it causes the player to perform more poorly in the non-wager-based gameplay.

In at least some embodiments, when configuring and/or designing skill-based, wager-based games, it may be preferable to take into account a variety of different considerations and criteria for optimizing and maximizing the games' entertainment value to one or more players. Examples of such considerations and criteria may include, for example, taking into account how players may respond to one or more of the following types of questions:

"What is the benefit of me playing this game?"
"What value is in it for me?"
"Why should I keep playing?"
"Why don't I just go play a regular slot machine?"
"Am I having fun playing this game?"
"Is it still worth playing this game even if I don't win any money?"

For example, in at least some embodiments, it may be preferable to configure or design a skill-based, wager-based game in a manner which provides or imparts a positive overall gaming experience to the player, and which may invoke the player to respond to each of the above-referenced questions as follows:

"What is the benefit of me playing this game?" The benefit for me is a new user experience that incorporates more fun & excitement while still playing a "good ol' fashioned game of chance."

"What value is in it for me?" The value in it for me is more internal—I've funded a game of chance, knowing it is a game of chance and the possibility of losing my funding is known—however, if I do lose my funding, at least now I got to interact and be immersed in an epic adventure where I used more than "just a button or a lever."

"Why should I keep playing?" I just got a small win and an extra ammo clip—might as well use up some or all these extra bullets; maybe I'll get lucky again.

"Why don't I just go play a regular slot machine?" I very well could, but then I'm just waiting for something special to happen. In between the times of a win, my mind starts to wander, I lose focus of the game and then I'm just mindlessly pressing a button. Sometimes getting depressed because I'm not "doing" anything.

"Am I having fun playing this game?" Yes. I'm definitely having fun playing the arcade-type game portion of the game, and am also enjoying the wager-based gaming portion of the game.

"Is it still worth playing this game even if I don't win any money?" Yes. Even if I don't win any money from the wager-based gaming portion of the game, the experience of playing the arcade-type portion of the game is well worth the money I spent and/or risked.

At least some embodiments of skill-based, wager-based games may be configured or designed to be targeted toward demographics of younger players who are familiar with wager-based gaming video slot machines, and have grown up loving and playing arcade style video games.

Open World & Role-Playing Gaming (e.g., RPG) Embodiments

The format of at least some of the hybrid skill-based, wager-based games may also focus on "linear", "non-linear (e.g., open world)", Massively Multiplayer Online "MMO", and/or Role-Playing ("RPG") type video and/or arcade-style games such as, for example, "Half-Life", "Grand Theft Auto", "World of Warcraft", and "Final Fantasy" (e.g., respectively). Such games may be collectively referred to herein as "RPG" type games, and may feature a player character that is moved through the game world via player input (e.g., HID). This allows for an increased sense of excitement through gameplay by providing a multitude of player-choice possibilities through a wide-array of path directions.

In some embodiments, the format of the hybrid skill-based, wager-based game may facilitate a gameplay environment in which multiplayer functionality takes place. The multiplayer gameplay may have multiple "enrollment" aspects in which one particular player could be on location at a casino playing a skill-based, wager-based game, while another different player could be at a different location (e.g., a location outside the casino which may be accessible via network access to a home/personal computer and/or mobile device) playing the same skill-based, wager-based game, but without the wagering aspect found in the casino environment.

A non-wagering game such as this is commonly known as a "free to play" game, in which the player is allowed to download and install said game on their own devices, which then allows the player progress through the game in a manner substantially similar to that of the skill-based, wager-based game except that the wagering component (e.g., regulated gambling component) of the game is omitted. Examples of some popular "free to play" games may include: "TERA", "Marvel Puzzle Quest", "Planetside 2", etc. gaming situations such as this may promote a "clicks to bricks" outcome where a casino property could promote or solicit home users to "login over the weekend to play Super Awesome RPG! Free! Come down to the casino and play Super Awesome RPG for a chance to win big!" Such property advertisement may entice more patrons to visit the casino in order to "win big" on their favorite skill-based, wager-based game. The various skill-based, wager-based gaming techniques described herein may also be utilized for enabling enhanced slot machine gambling with new and exciting twists, while still being compliant with local/state/Federal gaming regulations.

In at least some embodiments, the assemblage and representation of graphical elements of the RPG type skill-based, wager-based games may be configured or designed such that the visual result (e.g., as experienced by the player) resembles that of a traditional, arcade-style RPG-type game, and may be further configured or designed such that the interaction by the player (e.g., via HID, EGM button panel and/or possible touchscreen) facilitates wagered gameplay, for example, by providing opportunities to the player (e.g., during play of the RPG-type skill-based, wager-based game) to selectively participate in wager-based activities/events which conform to appropriate gaming regulations and jurisdictional requirements. Using the various skill-based, wager-based gaming technique described herein, the visual relationship between player and machine may be enhanced and improved, thereby increasing player immersion and facilitating longer more exciting gambling durations without the need to implement new and/or reconfigured back-end delivery structure(s).

Additionally, unlike the Zombie themed rail shooter embodiments previously described herein, the RPG (e.g., Role Playing game) skill-based, wager-based game may be setup/configured/built substantially differently (e.g., than that of rail-type games), while still utilizing similar concepts, triggering mechanisms and gameplay criteria. For example, in some embodiments, the focus on the wagering event may change depending on the structure, style, and theme of the RPG game. For example, in one embodiment of the Zombie theme game, the wager event was triggered after (or in response to) an NPC being destroyed; whereas an RPG version of the game may be configured or designed to trigger a wager-based gaming event to occur when a player character deals damage to an NPC and/or attacks an NPC. For example, depending on one or more factors such as, for example: the type of attack, player character performing the attack, weapon and/or magic spell being used and type of NPC player is battling, etc., there may exist the possibility of an NPC being destroyed by the damage dealt by the player character in a single wager-based gaming event (e.g., one attack). A person of ordinary skill in the art may deem it preferable that the wagering event be based on more simplified criteria such as the destruction of an object rather than on more complex criteria such as the degree of damage dealt to the object. However, by leveraging and using various programmatic functions such as those inherent in RPG styled gameplay, it becomes possible to define and/or configure one or more wager-based triggering events (e.g., for initiating pre-approved RNG-based games of chance) which may be based on different degrees of damage inflicted upon an object, and/or which may be based on player initiated attacks. In such embodiments, for example, the specific case previously described where the NPC was destroyed by a single damage dealing attack may be a result of a wild symbol and or mini bonus win line configuration, which may be displayed to the player via graphics and/or animations. In a similar manner, a player could be engaged in a battle where multiple attacks from NPCs and/or other player(s) may be exchanged. For example, from a gambling/casino viewpoint, a patron could be "battling" a giant monster for a few minute duration where each (e.g., or at least one) attack made by the player initiates a separate wager-based spin of the RNG-based slot game.

In some embodiments of RPG skill-based, wager-based games, battles between players and NPC's may follow a "turn based" style, e.g. player move, NPC move, player move, NPC move—until the battle is over (e.g., either the player or NPC gets destroyed). Some RPG skill-based, wager-based game embodiments may have multiple "hero's" controlled by one player. For example, one embodiment of an RPG skill-based, wager-based game may be configured or designed to be substantially similar in gameplay to the RPG-based game "Final Fantasy", in which the player controls (3) hero characters as "they" travel across the lands in search of their quest related tasks. These (3) hero characters may encounter numerous NPC's along their travels, and when doing so, the team of hero's may encounter a cornucopia of NPC's in no specific amount and/or arrangement. For example, one NPC encounter may entail the 3 hero characters battling 4 ogres, or 8 small gremlins, or 1 behemoth, or a combination thereof such as, 1 behemoth 1 ogre and 4 small gremlins. How the player decides to battle each group may depend on one or more factors such as, for example: the player's preferences, the player characters abilities, the type of NPC's (e.g., fighting style, weaknesses, strengths) about to be battled, wagering criteria relating to one or more player characters, etc.

Example Embodiment of RPG Skill-Based, Wager-Based Gameplay

By way of illustration, the following example embodiment is intended to help illustrate at least some of the various features of the RPG skill-based, wager-based game described herein.

According to different embodiments, a player may acquire "skill points, battle points and/or experience points" from non-monetary payouts of wager-based game event outcomes. The player may then "spend" on their character to increase abilities and/or learn new skills. For example, a warrior character has just defeated a large boss-like NPC, upon doing so, the player is awarded (3) "points" which may be used by the player (e.g., if desired) to upgrade his/her character's abilities/game play characteristics, such as, for example:
  a health, stamina or mana potion costs 1 point;
  a fancy sword costs 2 points;
  a fire imbued weapon rune costs 1 point;
  a fire imbued armor rune costs 2 points;
  a 10% health increase costs 3 points;
  a heavy plate armor set costs 5 points;
  etc.

The player may also choose to not spend points at the current time in order to save and gather more points for higher ranked (e.g., more costly) abilities and/or items.

According to different embodiments, one or more of the player's associated skill attributes may be dynamically and individually adjustable (e.g., increased/decreased) based on various criteria such as, for example: wager-based game event outcomes, objects collected, and/or other gameplay activities which may occur during play of the arcade-style portion of the skill-based, wager-based game. In some embodiments, enhancing a character's skills/abilities may affect the odds of winning a wager-based game event. In other embodiments, enhancing a character's skills/abilities may affect the odds of winning a wager-based game event, particularly where the wager-based game event is based off of an RNG and results are predetermined. In this way, the player is incentivized to work towards building his/her character to become a powerful force to be reckoned with. An additional benefit in providing functionality for enabling a player to increase his/her gameplay skill attributes relates to the ability to periodically add visually appealing effects and designs that may be built upon throughout an extended period of gameplay.

Predetermined RNG Hybrid Arcade-Wager Games

Various embodiments of skill-based, wager-based games may be configured or designed in a manner such that the respective wager event outcomes associated with a given wager-based triggering event may be predetermined before the occurrence of the wager-based triggering event. For example, in at least one embodiment, a skill-based, wager-based game may be configured or designed to:
  enable a player to engage in interactive game play of a skill-based, wager-based game at a first EGD, wherein the skill-based, wager-based game includes a non-wager based gaming portion and a wager-based gaming portion;
  link a first predetermined wager-based game event outcome to a first in-game event which may occur during play of the non-wager based game portion;
  detect an occurrence of the first in-game event in the non-wager based game portion;
  determine if the occurrence of the first in-game event qualifies as a wager-based triggering event;
  if it is determined that the occurrence of the first in-game event qualifies as a wager-based triggering event, initiate a first wager-based game event;
  automatically fund an amount wagered on the first wager-based game event; and
  reveal, after initiation of the first wager-based game event, the first predetermined wager-based game event outcome as an outcome of the first wager-based game event.

Additionally, according to different embodiments, the skill-based, wager-based game may be configured or designed to facilitate, enable, initiate, and/or perform one or more of the following operation(s), action(s), and/or feature(s) (or combinations thereof):
  Enable the player to concurrently engage in continuous game play of the non-wager based gaming portion of the skill-based, wager-based game during execution of the first wager-based game event.
  Analyze the first wager-based game event outcome to determine whether or not to automatically modify an availability of at least one resource or attribute of the non-wager based gaming portion; if the first wager-based game event outcome satisfies a first set of conditions, automatically modify an availability of at least one resource or attribute of the non-wager based gaming portion; if the first wager-based game event outcome does not satisfy the first set of criteria, not perform modification of the at least one resource or attribute of the non-wager based gaming portion in response to the first wager-based game event outcome.
  Analyze the first wager-based game event outcome to determine whether or not a non-wager based gaming award should be distributed at the non-wager based gaming portion; if the first wager-based game event outcome satisfies a first set of criteria, automatically cause the non-wager based gaming award to be distributed at the non-wager based gaming portion; and wherein the distribution of the non-wager based gaming award includes causing at least one component of the gaming network to modify at least one in-game resource or attribute which is available for use by an in-game character during play of the non-wager based gaming portion.

Automatically retrieve a first batch of predetermined wager-based game event outcomes from a first RNG engine; and select the first wager-based game event outcome from the first batch of predetermined wager-based game event outcomes.

In at least some embodiments where the first in-game event corresponds to a spawning of a first non-player character ("First NPC") in the non-wager based gaming portion, the skill-based, wager-based game may be configured or designed to: link a first predetermined wager-based game event outcome to the First NPC; detect a first in-game interaction with the First NPC, the first in-game interaction being caused based on input from the player during play of the non-wager based gaming portion; determine if the first in-game interaction with the First NPC qualifies as a wager-based triggering event; if it is determined that the occurrence of the first in-game interaction with the First NPC qualifies as a wager-based triggering event, initiate the first wager-based game event; and reveal, after initiation of the first wager-based game event, the first predetermined wager-based game event outcome as the outcome of the first wager-based game event which was initiated in response to the occurrence of the first in-game interaction with the First NPC.

In at least some embodiments where the first in-game event corresponds to a spawning of a first object ("First Object") in the non-wager based gaming portion, the skill-based, wager-based game may be configured or designed to: link a first predetermined wager-based game event outcome to the First Object; detect a first in-game interaction with the First Object, the first in-game interaction being caused based on input from the player during play of the non-wager based gaming portion; determine if the first in-game interaction with the First Object qualifies as a wager-based triggering event; if it is determined that the occurrence of the first in-game interaction with the First Object qualifies as a wager-based triggering event, initiate the first wager-based game event; and reveal, after initiation of the first wager-based game event, the first predetermined wager-based game event outcome as the outcome of the first wager-based game event which was initiated in response to the occurrence of the first in-game interaction with the First Object.

In at least some embodiments where the first in-game event corresponds to the satisfying or accomplishing of a first achievement ("First Achievement") in the non-wager based gaming portion, the skill-based, wager-based game may be configured or designed to: link a first predetermined wager-based game event outcome to the First Achievement; detect a that the First Achievement has been accomplished or satisfied during play of the non-wager based gaming portion; determine if the accomplishing of the First Achievement qualifies as a wager-based triggering event; if it is determined that the accomplishing of the First Achievement qualifies as a wager-based triggering event, initiate the first wager-based game event; and reveal, after initiation of the first wager-based game event, the first predetermined wager-based game event outcome as the outcome of the first wager-based game event which was initiated in response to the accomplishing of the First Achievement.

By way of illustration, the introduction (or spawning) of a new NPC into the gaming environment may represent an "NPC Spawning Event". In at least one embodiment, each spawned NPC may have associated therewith a respectively different, predetermined RNG-based outcome. For example, in some embodiments, each spawned NPC has associated therewith a respective RNG-based game of chance outcome, which may be determined before the initiation of the wager-based game event (e.g., before initiation of the RNG-based game of chance), and which may be determined before a wager-based triggering event has occurred for that particular NPC.

In at least one embodiment, each NPC Spawning Event may initiate, trigger or cause the gaming machine to perform or execute a plurality of operations for determining a respective RNG-based game of chance outcome to be associated with each spawned dark monger gremlin (NPC). For example, the plurality of operations may include, but are not limited to, one or more of the following (or combinations thereof):

Detecting an NPC Spawning Event associated with a spawned NPC.

Identifying the spawned NPC.

Causing the RNG to generate a predetermined RNG-based outcome for the identified, spawned NPC. According to different embodiments, the predetermined RNG-based outcome may result in monetary payouts and/or non-monetary payouts.

Associating or linking the predetermined RNG-based outcome with a specific wager-based triggering event (e.g., destruction of the NPC) associated with the identified NPC.

Encrypting and saving the predetermined RNG-based outcome associated with the identified NPC.

For example, in at least one embodiment, when an NPC Spawning Event occurs in association with a specific NPC, the gaming device may respond by making a call to a Random Number Generator (RNG) in order to obtain a predetermined outcome of a future wager-based gaming event associated with the specific NPC. In some embodiments, the call to the Random Number Generator (RNG) may be made before the occurrence of a wager-based triggering event in order to predetermine an outcome of the future wager-based gaming event.

In at least one embodiment, when a wager-based triggering event is detected in association with an identified NPC (e.g., killing or damaging an NPC), the gaming device may be configured or designed to respond by automatically initiating and/or performing one or more operations, including, for example:

Retrieving the predetermined RNG-based outcome for the identified NPC (associated with the wager-based triggering event).

Using the predetermined RNG-based outcome to dynamically determine or calculate the wager-based gaming event symbols to be displayed in connection with the wager-based game event.

Automatically initiating a wager-based game event (e.g., virtual slot reel spin) in connection with detected wager-based triggering event. In the present example, a maximum permitted wager amount may be placed on the outcome of a virtual slot reel spin, and the virtual slot reel spin initiated.

Causing anticipation animation to be displayed at the gaming device display (e.g., spinning reels, NPC damage animations, etc.).

Determining, using the predetermined RNG-based outcome, the final arrangement of symbols to be displayed in connection with the wager-based game event outcome (e.g., which is to be initiated in response to the detection of the wager-based triggering event associated with the identified NPC).

Displaying the final arrangement of symbols (e.g., display final position of symbols of virtual slot reel spin) to convey the outcome of wager-based game event in accordance with the predetermined RNG-based outcome associated with the identified NPC. (e.g., based on outcome of the wager-based game of chance).

Calculate and display updated information relating to payout/credits/distributions using the predetermined RNG-based outcome of the wager-based game of chance. Update player's credits based on payout from virtual slot reel spin.

In at least one embodiment, if the outcome of the wager-based game of chance is a win or payout, "loot piles", among other graphical representations, may be displayed adjacent to the damaged NPC. Player may also be notified of any non-monetary payouts, free spins, bonus rounds and the like, which may be awarded or distributed to the player based on one or more wager-based game event outcome(s).

In at least some embodiments, the RPG skill-based, wager-based game may be configured or designed to provide opportunities in which the player is awarded specific "points" (e.g., mentioned previously) to upgrade their character stats. For example, a player may be awarded a non-monetary payout of points based upon the outcome of a wager-based game event initiated during play of the RPG skill-based, wager-based game.

In at least some embodiments, the RPG skill-based, wager-based game may be configured or designed to include functionality for enabling the player to acquire or purchase various types of in-game resources (e.g., items, skills, and abilities, etc.) using points that were awarded to the player from non-monetary payouts of wager-based game events. In at least some embodiments, the skill-based, wager-based game may be configured or designed to offer the ability for a player to exchange earned points for other types of artifacts such as, for example: scrolls, gems, crystals, pendants and/or other artifacts that possess special abilities/attributes.

Sports/Motorsports RPG Embodiments

In other embodiments, the format or theme of the skill-based, wager-based games may be directed to "sports" style arcade games (e.g., including motorsports), such as, for example, "NBA JAM", "Golden Tee", "San Francisco Rush", "Need for Speed", etc. Such games may feature a player character(s) and/or a player vehicle(s) and/or vessel(s), wherein the player has control over his or her character/vehicle via HID interaction (e.g., XBOX controller, steering wheel/foot-pedal combo, etc.). Sports-type skill-based, wager-based games (e.g., including motorsports) may be setup (e.g., built) completely different (e.g., from rail-type or RPG-type games), while still utilizing concepts, triggering mechanisms and gameplay criteria which may be common to some or all types of skill-based, wager-based games.

In some embodiments, focus on the wager-based game event(s) may change depending on the structure, style, and theme of the Sports-type skill-based, wager-based game. For example, in the Rail-themed and RPG-themed skill-based, wager-based games, initiation of at least some of the wager-based gaming events were triggered in response to events/conditions which occurred to NPCs, such as for example, the destruction of an NPC, damage to an NPC, attack on an NPC, etc. In contrast, in sports-themed skill-based, wager-based games, initiation of at least some of the wager-based gaming events may be automatically triggered in response to actions and/or activities performed by the player (or performed by the player's character).

For example, in sports-themed skill-based, wager-based game embodiments involving characters (e.g., rather than vehicles/vessels), a player may control one or more characters, and based on the type of sport, specific gameplay actions or events may be configured or defined to correspond to wager-based triggering events (e.g., for triggering initiation of one or more wager-based game events). Examples of such specific gameplay actions or events may include, but are not limited to, one or more of the following (or combinations thereof):

Making a basket.
Scoring a touchdown.
Hitting a ball or other object.
Kicking a ball or other object.
Catching a ball or other object.
Kicking a goal.
Sinking a ball (e.g., birdie, bogey in golf).
Running a play.
Dodging an opponent.
Swinging something (e.g., racquet, tennis, ping pong, etc.).
Scoring one or more point(s) during gameplay.
Fouling an opponent.
Etc.

In sports-themed skill-based, wager-based game embodiments involving vehicles/vessels (e.g., rather than characters), a player may control one or more "vehicles" and, based on the type of sport, specific gameplay actions or events may be configured or defined to correspond to wager-based triggering events (e.g., for triggering initiation of one or more wager-based game events). Examples of such specific gameplay actions or events may include, but are not limited to, one or more of the following (or combinations thereof):

Crossing checkpoints.
Dodging and/or evading items.
Collecting items.
Making laps.
Time based durations (e.g., drag racing, "endless-driver", oval-track).
Picking up virtual object(s).
Driving over/into a virtual object.
Crashing.
Avoiding collisions/objects.
Driving to specific regions/locations.
Passing opponent(s).
Etc.

In at least one embodiment, a "point" may be defined or interpreted as a term that references one gaining a level in score in relation to a specific game in which they are involved (e.g., as opposed to "points" that may be known in relation to EGM gameplay (e.g., leaderboard points) and/or player club card points). Depending on the specific type of sports game involved, one or more one or more specific sets of wager-based triggering events may be predefined for triggering initiation of one or more approved wager-based game events (e.g., RNG-based games of chance) which conform with regulatory/jurisdictional requirements.

One of the benefits of using symbols such as Wager Triggering object(s) to initiate wager-based game events, is that it provides player with the ability to selectively initiate a wager-based game event and/or to selectively cause a wager-based triggering event to occur, as desired. For example, in embodiments where a wager-based triggering event occurs when a player's character collects a Wager Triggering Ring, the player may elect to not initiate any wagers during play of the skill-based, wager-based game, for example, by avoiding collection of Wager Triggering object(s). In this way, the frequency and pace of the wagering events may be directly controlled by the player during active play of the arcade-style portion of the skill-based, wager-based game.

A related benefit of using symbols such as Wager Triggering object(s) to initiate wager-based game events, is that it provides the ability for each player to establish and control his/her preferred pace of gambling during play of the skill-based, wager-based game. For example, by purposefully interacting with Wager Triggering object(s) relatively infrequently during gameplay, a player may maintain a relatively slow pace of gambling during play of the skill-based, wager-based game. In contrast, by purposefully interacting with Wager Triggering object(s) relatively frequently during gameplay, a player may maintain a relatively fast pace of gambling during play of the skill-based, wager-based game.

By way of illustration, let's say a player enjoys gambling slowly, e.g., "pressing the spin button" and waiting for the animations, enjoying the moment, having a sip of their drink, looking around the casino between spins, then spinning again in the same manner. This particular player could experience a similar "relaxed" level of gambling during play of a driving-type skill-based, wager-based game, for example, by selectively choosing when to interact with a Wager Triggering Ring. For example, during gameplay, the player may control the direction of the vehicle so as to avoid interacting with one or more Wager Triggering object(s). When the player is ready to initiate another wager-based spin of the virtual slot reel, the player may choose steer the vehicle so that it interacts with the next displayed "Wager Ring," thereby initiating a wager-based gaming event (e.g., virtual slot reel spin). The player may relax/enjoy the moment, and then continue on.

In contrast, a fast paced player (who prefers faster paced gambling) may purposefully chose to drive relatively fast, and steer his/her vehicle so as to interact with each Wager Triggering object which is displayed during gameplay, thereby initiating multiple wager-based gaming events (e.g., virtual slot reel spins) within a given time interval in order to maintain a relatively fast pace of gambling during play of the skill-based, wager-based game.

In at least one embodiment, the slow paced player and fast paced player could each be playing the same driving-type skill-based, wager-based game at two different, adjacent gaming machines, and have completely different gameplay experiences. Yet both players may be enjoying themselves equally as much due to the flexibility of design of the skill-based, wager-based game configuration and the ability for each player to establish and control his/her preferred pace of gambling during play of the skill-based, wager-based game.

According to different embodiments, each Wager Triggering object introduced into the gaming environment may have associated therewith a respectively different, predetermined RNG-based outcome. For example, in at least one embodiment, when an identified Wager Triggering object is initially introduced (e.g., and displayed) in the gaming environment, the gaming device may respond by making a call to a Random Number Generator (RNG) in order to obtain a predetermined outcome of a future wager-based gaming event which will be initiated in response to the player's vehicle/character interacting with the identified Wager Triggering object. In some embodiments, the predetermined RNG-based game of chance outcome associated with a given Wager Triggering object is generated/determined before the initiation of the corresponding RNG-based game of chance, and is generated/determined before the player's vehicle/character has interacted with the identified Wager Triggering object.

At least some skill-based, wager-based game embodiments may be configured or designed to provide the ability to selectively toggle certain HUD elements, timers, checkpoints, and the like. Additionally, at least some skill-based, wager-based game embodiments may be configured or designed to provide capability of supporting multiplayer events and/or tournaments (e.g., in which timer-based events occur). For example, a casino property may have a promotion setup where groups of people/teams may be "racing" to get the most "spins" within a specific timeframe. In doing so, timers, points, and other various details may be displayed to the patron(s).

In other sports-type skill-based, wager-based game embodiments, similar mechanisms may be implemented for enabling a player to selectively control the pace of wager-based game events. For example, in sports-type skill-based, wager-based game embodiments involving characters (e.g., basketball-themed games, football-themed games, soccer-themed games, baseball-themed games, hockey-themed games, etc.) Wager Triggering object(s) and/or other symbols for triggering wager-based game events may be distributed at various locations of the virtual game play field/arena/court of the skill-based, wager-based game. A player may selectively choose to navigate his/her character, during gameplay, to interact with one or more Wager Triggering object(s) (to thereby trigger initiation of one or more wager-based game event) and/or to avoid interacting with one or more Wager Triggering object(s) (to thereby prevent initiation of one or more wager-based game events).

Player Event Based Wager Triggering Associations

In at least some skill-based, wager-based game embodiments where one or more wager-based triggering events are based on specifically defined player character game play activities, a respective, predetermined RNG-based game of chance outcome may be generated/determined before (e.g., in advance of) the occurrence of each specific player character game play activity or achievement which causes or triggers a wager event. Examples of such player character game play activities may include, but are not limited to, one or more of the following (or combinations which may include, but are not limited to, one or more of the following (or combinations thereof):

blocking a shot;
stealing a ball;
jumping in the air;
doing a flip;
firing a weapon;
casting a spell;
initiating a power punch;
jumping
ducking
scoring a goal specific interaction(s) with objects;
specific interaction(s) with other players;
satisfying or accomplishing an in-game achievement (e.g., clearing a row in Tetris® or linking 3 or more gems in Bejeweled®);
etc.;

For example, in one embodiment, a wager-based triggering event may be defined to occur whenever a player's character performs a flip during game play. In this specific example, before the player's character performs a flip during game play, the gaming device may make a call to the Random Number Generator (RNG) in order to obtain a predetermined outcome of a future wager-based gaming event which may be subsequently initiated if/when the system detects that the player's character has performed a flip during game play. Upon detecting the next occurrence of a player character flip event, a wager-based game event will be automatically initiated by the system, and the outcome of the wager-based game event will correspond to the predetermined RNG outcome. Thereafter, the gaming device may make another call to the Random Number Generator (RNG) to obtain a next predetermined outcome to be associated with a next wager-based game event which will be triggered by the player's character performing another flip during game play.

By way of illustration, a player may initiate a wager-based triggering event, such as, for example, when a player character does a "ninja flip" while jumping. In this specific example, a player character may be able to jump repeatedly. In order to properly utilize HAWG's functionality, the code of the game may implement or initiate a series of calls, checks, and/or other operations such as, for example:

Determine if a player's character did in fact jump;
Determine if, while the player's character was airborne, it performed a "ninja flip";
(Assuming player's character performed a "ninja flip") retrieve the pre-predetermined RNG outcome associated with the detected wager-based triggering event;
Display wager event outcome to the player (and calculate winnings, if applicable);
Generate and store another new pre-predetermined RNG for a next player's character "ninja flip" event;
In some embodiments, some of all of the above-described activities may occur while the player's character is still in the air (e.g., w/in a few milliseconds)

To further elaborate, let's say the player's character in the above example just landed back on the ground and the player decided to immediately do another "ninja flip" jump (e.g., immediately after touchdown). Upon the next jump, the some or all of the activities described immediately above may repeat. If the nature of gameplay were to continually jump and do flips, this process may continue until the player is satisfied with the gambling duration and/or no longer has credits to fund gameplay.

In some skill-based, wager-based game embodiments, the occurrence of various types of scoring events during gameplay (e.g. scoring a field goal, scoring a basket, scoring a touchdown, scoring a run, scoring a goal, sinking ball in hole, etc.) may trigger the automatic initiation of one or more wager-based game event(s), thereby allowing players to get a "real win" feel (e.g., if winnings are applicable). In at least some such embodiments, an occurrence of such a scoring event during gameplay may be treated by the skill-based, wager-based game as the occurrence of a wager-based triggering event, which, in turn, may trigger the automatic initiation of a respective wager-based game event. For example, in the basketball-themed skill-based, wager-based game embodiment, the court may have multiple Wager Triggering object(s) distributed throughout. A player may choose to navigate his/her character in various directions, such as, for example: (a) towards a displayed Wager Triggering Ring to thereby initiate one or more wager-based gaming events; (b) away from the displayed Wager Triggering object(s) to thereby prevent initiation any wager-based gaming events; and/or (c) directly towards the basket to score (e.g., which, in some embodiments, may also trigger initiation of a wager-based gaming event).

One perceived benefit of configuring or designing a sports-type skill-based, wager-based game to initiate a wager-based game event in response to an occurrence of a game-related scoring event is that it helps to create a positive association (e.g., in the player's mind) between a game-based achievement (e.g., scoring of a basket), and the associated wager-based game event. Consequently, such a positive association may help encourage the player to have thoughts or perceptions such as, for example, "my luck may come when I score an actual basket" (e.g., the "real win" perception). This comparison to gameplay may be comparatively similar to the comparison made between the "fast" and "slow" paced gamblers—each is based on player interaction, the methods & designs thereof, and the visual and mental relationships between said elements which promote a fun and flexible environment capable of providing satisfactory results to target specific and wide-ranged demographics.

Wager Configuration/Selection

According to different embodiments, there are multiple ways in which a player's wagering preferences may be selected/configured in a given skill-based, wager-based game. By way of illustration, a few simplified examples (using only characters) are described below.

A player may select from various characters (etc.), wherein each of the individual characters is configured or designed to have associated therewith a respective bet line value (e.g., 1-line, 3-lines, 5-lines, 10-lines, 30-lines etc.) and/or wager multiplier value (e.g., 1×, 3×, 8×, 10×, 25×, 30×, etc.).

A player may select from various characters (etc.), wherein each character has associated therewith a respective set of attacks, weapons, abilities, skills, etc., and wherein each set of attacks/weapons/abilities/skills/etc. has associated therewith a respective bet line value and/or wager multiplier value.

A player may select from various characters (etc.), and use a standard wager selection process for wager selection/configuration (e.g., in which the player manually selects desired wagering criteria such as, for example, base wagering amount, number of bet line(s) to be wagered, wager multiplier value(s), etc.

Etc.

In some embodiments, at least a portion of the various wager-related parameters may be coded into skill-based, wager-based game software/hardware, and utilized for defining and/or determining the different sets of pre-configured wager-related parameters which may be available for player selection in a given skill-based, wager-based game.

In one embodiment, the RPG skill-based, wager-based game implemented at an EGM may be configured or designed to enable a player to selectively choose from a set of characters, and the basis for wager differentiation is reflected via which move, ability, skill, spell, etc. is initiated by the player and performed by the player's character (e.g., after wager funding and/or during play at) the EGM. In some embodiments, the "max bet" or relatively highest wager multiplier value may correspond to the "strongest" moves/abilities for a given character, and the "min bet" or relatively lowest wager multiplier value may correspond to the "weakest" moves/abilities for that character.

In one example, a First Person skill-based, wager-based game may be configured or designed to enable a player to select from various characters, where each character has associated therewith a corresponding bet/wager multiplier value.

In at least some embodiments, the wagering outcomes may be based on a series of themed slot reel symbols rather than a specific type of NPC battled (e.g. the destruction of a tiny gremlin may net the same winnings as a demon boss etc.). This may help to avoid the need of using large and possibly confusing pay tables wherein hundreds of different NPC's and/or "Wager Triggering objects" may need to be shown. Using themed reel symbols allows HAWG design to remain clean and simple to play and understand like standard slot machines.

In at least some embodiments, the number and/or type of activities which may be performed by a player's character may depend on various wager-related parameters, such as, for example, the number of lines of the virtual slot interface being wagered upon. For example, in one embodiment utilizing a virtual 3 reel 1 line slot interface, each character may only have as many moves as bet multiplier selections allowed. In this simplified example, each player character may only have 5 moves/abilities each (e.g., corresponding to their respective wager multipliers 1×, 2×, 3×, 5×, 10×), and depending on which one is selected, a specific sequence of player character animation would play when initiated. In other embodiments, if we change our example to a multiple line slot interface, depending on the amount of lines, reels, style of gameplay, and wager triggering events, the number and type of player character moves/abilities available to be selected by the player (e.g., for each RPG character) may be substantially increased. Additionally, in at least some embodiments, the number and type of player character moves/abilities available to be selected by the player (e.g., for each RPG character) may be automatically and dynamically increased/decreased depending on the number of wager lines selected by the player. For example, in one embodiment, if the player selects a 2-line slot wager option, the player's may automatically be provided with the ability to perform an additional "healing" ability (e.g., in addition to the character's other 5 available activities/abilities). Depending on the nature of the gameplay and pay table details, the player may in fact initiate a wager-based event by simply healing themselves during a round of play.

Similar techniques may be implemented for sports related skill-based, wager-based games. For example, in a basketball-themed skill-based, wager-based game, a player may be able to initiate a wager based event by stealing the ball from an opponent. Other factors influencing how the wager initiation is handled may include, but are not limited to, one or more of the following (or combinations thereof):
  style of activity involved (e.g., layup, slam dunk, etc.);
  total wager amount;
  wager multiplier amount;
  base wager denomination amount;
  etc.

For example, in one embodiment, a non-monetary payout opportunity may be made available only if the player selects the "max bet" and other game conditions are met, such as, for example, the player's character performs a slam dunk, and a predetermined symbol appears on the bet line of the slot game interface. A player could successfully play and slam dunk all day long (getting wins if applicable), but if they are only betting minimum (or are only betting less than "max bet"), such activity may not meet the specific requirements needed to initiate additional enhanced outcomes, non-monetary payouts, bonuses, awards, etc. In at least some embodiments, some or all of these gaming/wagering rules are clearly defined to the player in a manner which conforms with appropriate gaming jurisdictions and/or regulations.

At least some embodiments of skill-based, wager-based games may not require that character selection be associated with wager or line multipliers. For example, in some skill-based, wager-based game embodiments, the player may be allowed to dynamically select the wager-related parameters (e.g., line/bet multiplier(s), wager denomination(s), etc.) to be applied to the wager-based game event(s).

Example Random Number Generator (RNG) Embodiment(s)

According to different embodiments, one or more different types of RNG engines may be utilized to generate random numbers, game event outcome(s), and/or wager event outcome(s). For example, in at least one embodiment, an RNG engine may be implemented using a standard Mersenne Twister algorithm.

Initializing and Seeding

Upon initialization of the RNG engine, it may generate a seed value based on values of several different parameters, such as, for example:
  Current time in milliseconds,
  Process ID of the current process,
  The address of the current time variable, and
  The last seed value used.
After generating all of the variables, they are all multiplied by the last seed value. An XOR operator is applied to the current time variable, with a variable based on the bits for the current time shifted to the right by 11. In at least one embodiment, the seed value is determined by using an XOR operator to combine all four of the variables.

Background Generation

After initialization the RNG engine may start generating numbers on a separate thread. This thread may be constantly running in the background resulting in millions of numbers being discarded per second.

Generating RNG Number(s)

When a component of the skill-based, wager-based game requests a random number, it may call the GetRandomNumberRange function one or more times (e.g., depending on the number of reels). For example, for a 3 reel slot game, the GetRandomNumberRange function may be called three (3) times (e.g., 1 RNG call per reel).

In some skill-based, wager-based game embodiments, one or more calls to the RNG engine may occur each time an NPC is spawned in the game. For example, if a new NPC is spawned in a skill-based, wager-based game which uses a 3 reel virtual slot game to implement wager-based game events, three separate GetRandomNumberRange function calls may be made to the RNG engine to obtain 3 different random numbers, which represent a predetermined outcome of the wager-based 3-reel slot game event which will be initiated if/when the newly spawned NPC is destroyed (or damaged in some embodiments).

Similarly, in skill-based, wager-based game embodiments which utilize symbols (e.g., such as Wager Triggering object(s)) to initiate wager-based game events, one or more calls to the RNG engine may occur each time a new Wager Triggering Symbol is "spawned" or introduced into the gaming environment. For example, if a new Wager Triggering Symbol is introduced into the gaming environment of a driving-type skill-based, wager-based game which uses a 3 reel virtual slot game to implement wager-based game events, three separate GetRandomNumberRange function calls may be made to the RNG engine to obtain 3 different random numbers, which represent a predetermined outcome of the wager-based 3-reel slot game event which will be initiated if/when the player's character or vehicle interacts with the identified Wager Triggering Symbol.

In at least one embodiment, the GetRandomNumberRange function may utilize 2 parameters representing, for example, a minimum value (e.g., zero) and a maximum value (e.g., 255). When the number is generated by the RNG engine, it may need to be scaled to fit inside the minimum and maximum values. In one embodiment, the value of each generated RNG number may be automatically scaled by performing the following operations:

1. Increase the maximum value by 1 so when we mod it later we can achieve the maximum number.
2. Set the limit of the number to equal the difference between the min and max. This will represent how many numbers we can generate.
3. Use integer division to get the largest number that our limit will mod evenly into our RNG's Maximum number.
4. Generate a number from the RNG engine.
5. Check to see if the number is larger than our mod evenly number. If we don't do this, then a lower number has the potential to show more often than higher numbers generated by the RNG engine generator. Comparing it to a large evenly modded number will help ensure that each number has the same chance of being called by disregarding the numbers that are higher than this.
6. If the number is larger than our mod evenly number, we discard it and generate another number.
7. Repeat operations 5 and 6 (above) until a number is found/identified.
8. Mod the identified number generated by our limit, and add the minimum amount to it. This will give us the final RNG number.

Using the RNG Engine Number(s)

In one embodiment, the 3 numbers that are generated in connection with the spawning of an identified NPC (or Wager Triggering Symbol) are securely encrypted and stored inside of (or otherwise stored in a manner which associated with or linked to) the identified NPC/Wager Triggering Symbol, in the order that the 3 RNG numbers were generated.

If/when the identified NPC is subsequently killed or destroyed (or damaged in some embodiment), or if the player's character/vehicle interacts with the identified Wager Triggering Symbol (destroying and/or damaging such object) we access and use the 3 stored RNG numbers (in order) to check the positions of each reel. These positions are then compared to a math model to get the award value. Thereafter, assuming no errors detected, the award value and reels are displayed for the user to see.

FIG. 1 illustrates a simplified block diagram of a specific example embodiment of a skill-based, wager-based (e.g., "HAWG") gaming system 100 which may be implemented via a computerized data network. As described herein, the phrase skill-based, wager-based gaming system may also be referred to as a "hybrid skill-based, wager-based gaming system" or "hybrid arcade/wager-based gaming system." As described in greater detail herein, different embodiments of skill-based, wager-based gaming systems may be configured, designed, and/or operable to provide various different types of operations, functionalities, and/or features generally relating to skill-based, wager-based gaming system technology. Further, as described in greater detail herein, many of the various operations, functionalities, and/or features of the skill-based, wager-based gaming system(s) disclosed herein may provide may enable or provide different types of advantages and/or benefits to different entities interacting with the skill-based, wager-based gaming system(s).

According to different embodiments, at least some skill-based, wager-based gaming system(s) may be configured, designed, and/or operable to provide a number of different advantages and/or benefits and/or may be operable to initiate, and/or enable various different types of operations, functionalities, and/or features, such as, for example, one or more of those described and/or referenced herein. According to different embodiments, at least a portion of the various functions, actions, operations, and activities performed by one or more component(s) of the skill-based, wager-based gaming system may be initiated in response to detection of one or more conditions, events, and/or other criteria satisfying one or more different types of minimum threshold criteria, such as, for example, one or more of those described and/or referenced herein. According to different embodiments, at least a portion of the various types of functions, operations, actions, and/or other features provided by the skill-based, wager-based gaming system may be implemented at one or more client systems(s), at one or more System Server(s), and/or combinations thereof. According to different embodiments, the skill-based, wager-based gaming system 100 may include a plurality of different types of components, devices, modules, processes, systems, etc., which, for example, may be implemented and/or instantiated via the use of hardware and/or combinations of hardware and software. For example, as illustrated in the example embodiment of FIG. 1, the skill-based, wager-based gaming system may include one or more types of systems, components, devices, processes, etc. (e.g., or combinations thereof) described and/or referenced herein.

According to different embodiments, the skill-based, wager-based gaming (e.g., HAWG) System 100 may include a plurality of different types of components, devices, modules, processes, systems, etc., which, for example, may be implemented and/or instantiated via the use of hardware and/or combinations of hardware and software. For example, as illustrated in the example embodiment of FIG. 1, the skill-based, wager-based gaming system may include one or more of the following types of systems, components, devices, processes, etc. (e.g., or combinations thereof):

Local Casino System(s) 122 operable to perform and/or implement various types of functions, operations, actions, and/or other features such as those described or referenced herein. According to different embodiments, one or more Local Casino System(s) 122 may include, but are not limited to, one or more of the following (or combinations thereof):

Casino gaming system server(s) 120—In at least one embodiment, the Casino gaming system server(s) may be operable to perform and/or implement various types of functions, operations, actions, and/or other features such as those described or referenced herein.

Class 2 RNG System(s)/Service(s) 124 operable to perform and/or implement various types of functions, operations, actions, and/or other features such as those described or referenced herein. For example, in at least some embodiments, Class 2 RNG System(s)/Service(s) 124 may be operable to dynamically generate and/or provide Class 2 gaming type RNG outcomes to be used by skill-based, wager-based gaming devices as "predetermined" RNG outcome(s) relating to Class 2 type wager-based game event(s) occurring at the skill-based, wager-based gaming devices.

Class 3 RNG System(s)/Service(s) 126 operable to perform and/or implement various types of functions, operations, actions, and/or other features such as those described or referenced herein. For example, in at least some embodiments, Class 3 RNG System(s)/Service(s) 126 may be operable to dynamically generate and/or provide Class 3 gaming type RNG outcomes to be used by skill-based, wager-based gaming devices as "predetermined" RNG outcome(s) relating to Class 3 type wager-based game event(s) occurring at the skill-based, wager-based gaming devices.

Electronic gaming Machine(s) (EGMs) 128 operable to perform and/or implement various types of functions, operations, actions, and/or other features such as those described or referenced herein.

Other gaming network(s).

Client Computer System(s) 130 operable to perform and/or implement various types of functions, operations, actions, and/or other features such as those described or referenced herein.

$3^{rd}$ Party System(s) 150 operable to perform and/or implement various types of functions, operations, actions, and/or other features such as those described or referenced herein.

Internet & Cellular Network(s) 110.

Remote/Internet-based gaming Service(s) 190 operable to perform and/or implement various types of functions, operations, actions, and/or other features such as those described or referenced herein.

According to different embodiments, one or more Remote/Internet-based gaming Service(s) 190 may include, but are not limited to, one or more of the following (or combinations thereof):

Class 2 RNG System(s)/Service(s) 194 operable to perform and/or implement various types of functions, operations, actions, and/or other features such as those described or referenced herein. For example, in at least some embodiments, Class 2 RNG System(s)/Service(s) 194 may be operable to dynamically generate and/or provide Class 2 type RNG outcomes to be used by remote skill-based, wager-based gaming devices as "predetermined" RNG outcome(s) relating to Class 2 type wager-based game event(s) occurring at the skill-based, wager-based gaming devices.

Class 3 RNG System(s)/Service(s) 196 operable to perform and/or implement various types of functions, operations, actions, and/or other features such as those described or referenced herein. For example, in at least some embodiments, Class 3 RNG System(s)/Service(s) 196 may be operable to dynamically generate and/or provide Class 3 type RNG outcomes to be used by remote skill-based, wager-based gaming devices as "predetermined" RNG outcome(s) relating to Class 3 type wager-based game event(s) occurring at the skill-based, wager-based gaming devices.

Remote Database System(s) 180 operable to perform and/or implement various types of functions, operations, actions, and/or other features such as those described or referenced herein.

Gaming Server(s) 192 operable to perform and/or implement various types of functions, operations, actions, and/or other features such as those described or referenced herein.

Remote System(s)/Service(s) 170, which, for example, may include, but are not limited to, one or more of the following (e.g., or combinations thereof):

Content provider servers/services

Media Streaming servers/services

Database storage/access/query servers/services

Financial transaction servers/services

Payment gateway servers/services

Electronic commerce servers/services

Event management/scheduling servers/services

Etc.

Mobile Device(s) 160—In at least one embodiment, the Mobile Device(s) may be operable to perform and/or implement various types of functions, operations, actions, and/or other features such as those described or referenced herein.

Etc.

In at least one embodiment, the skill-based, wager-based gaming system may be operable to utilize and/or generate various different types of data and/or other types of information when performing specific tasks and/or operations. This may include, for example, input data/information and/or output data/information. For example, in at least one embodiment, the skill-based, wager-based gaming system may be operable to access, process, and/or otherwise utilize information from one or more different types of sources, such as, for example, one or more local and/or remote memories, devices and/or systems. Additionally, in at least one embodiment, the skill-based, wager-based gaming system may be operable to generate one or more different types of output data/information, which, for example, may be stored in memory of one or more local and/or remote devices and/or systems. Examples of different types of input data/information and/or output data/information which may be accessed and/or utilized by the skill-based, wager-based gaming system may include, but are not limited to, one or more of those described and/or referenced herein.

According to specific embodiments, multiple instances or threads of the skill-based, wager-based gaming system may be concurrently implemented and/or initiated via the use of one or more processors and/or other combinations of hardware and/or hardware and software. For example, in at least some embodiments, various aspects, features, and/or functionalities of the skill-based, wager-based gaming system may be performed, implemented and/or initiated by one or more of the various systems, components, systems, devices, procedures, processes, etc., described and/or referenced herein.

In at least one embodiment, a given instance of the skill-based, wager-based gaming system may access and/or utilize information from one or more associated databases. In at least one embodiment, at least a portion of the database information may be accessed via communication with one or more local and/or remote memory devices. Examples of different types of data which may be accessed by the skill-based, wager-based gaming system may include, but are not limited to, one or more of those described and/or referenced herein.

According to different embodiments, various different types of encryption/decryption techniques may be used to facilitate secure communications between devices in skill-based, wager-based gaming system(s) and/or skill-based, wager-based gaming Network(s). Examples of the various types of security techniques which may be used may include, but are not limited to, one or more of the following (e.g., or combinations thereof): random number generators, SHA-1 (e.g., Secured Hashing Algorithm), MD2, MD5, DES (e.g., Digital Encryption Standard), 3DES (e.g., Triple DES), RC4 (e.g., Rivest Cipher), ARC4 (e.g., related to RC4), TKIP (e.g., Temporal Key Integrity Protocol, uses RC4), AES (e.g., Advanced Encryption Standard), RSA, DSA, DH, NTRU, and ECC (e.g., elliptic curve cryptography), PKA (e.g., Private Key Authentication), Device-Unique Secret Key and other cryptographic key data, SSL, etc. Other security features contemplated may include use of well-known hardware-based and/or software-based security components, and/or any other known or yet to be devised security and/or hardware and encryption/decryption processes implemented in hardware and/or software.

According to different embodiments, one or more different threads or instances of the skill-based, wager-based gaming system may be initiated in response to detection of one or more conditions or events satisfying one or more different types of minimum threshold criteria for triggering initiation of at least one instance of the skill-based, wager-based gaming system. Various examples of conditions or events which may trigger initiation and/or implementation of one or more different threads or instances of the skill-based, wager-based gaming system may include, but are not limited to, one or more of those described and/or referenced herein.

It will be appreciated that the skill-based, wager-based gaming system of FIG. 1 is but one example from a wide range of skill-based, wager-based gaming system embodiments which may be implemented. Other embodiments of the skill-based, wager-based gaming system (e.g., not shown) may include additional, fewer and/or different components/features that those illustrated in the example skill-based, wager-based gaming system embodiment of FIG. 1.

Generally, the skill-based, wager-based gaming techniques described herein may be implemented in hardware and/or hardware+software. For example, they can be implemented in an operating system kernel, in a separate user process, in a library package bound into network applications, on a specially constructed machine, or on a network interface card. In a specific embodiment, various aspects described herein may be implemented in software such as an operating system or in an application running on an operating system.

Hardware and/or software+hardware hybrid embodiments of the skill-based, wager-based gaming techniques described herein may be implemented on a general-purpose programmable machine selectively activated or reconfigured by a computer program stored in memory. Such programmable machine may include, for example, mobile or hand-held computing systems, PDA, smart phones, notebook computers, tablets, netbooks, desktop computing systems, system servers, cloud computing systems, network devices, etc.

Figure 2:
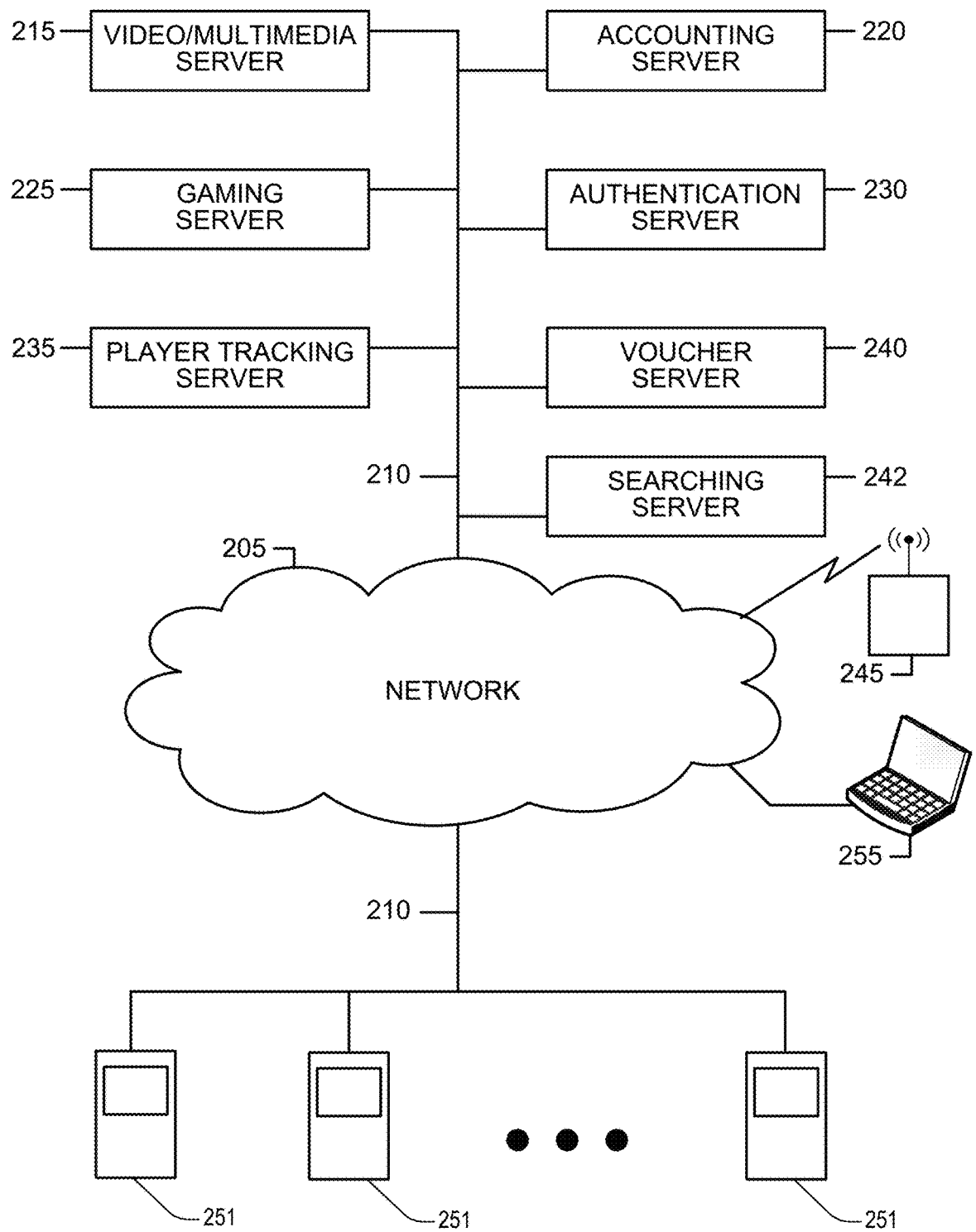
FIG. 2 shows an example block diagram of an electronic gaming system 200 in accordance with a specific embodiment.

FIG. 2 shows an example block diagram of an electronic gaming system 200 in accordance with a specific embodiment. Electronic gaming system 200 may include electronic gaming devices (e.g., electronic gaming terminals, electronic gaming machines, wager-based video gaming machines, etc.) 251, which may be coupled to network 205 via a network link 210. Network 205 may be the internet or a private network. One or more video streams may be received at video/multimedia server 215 from EGDs 251. Video/Multimedia server 215 may transmit one or more of these video streams to one or more: mobile devices 245, 255, electronic gaming devices (e.g., EGD) 251, and/or other remote electronic device. Video/Multimedia server 215 may transmit these video streams via network link 210 and network 205.

Electronic gaming system 200 may include an accounting/transaction server 220, a gaming server 225, an authentication server 230, a player tracking server 235, a voucher server 240, and a searching server 242.

Accounting/transaction server 220 may compile, track, store, and/or monitor cash flows, voucher transactions, winning vouchers, losing vouchers, and/or other transaction data for the casino operator and for the players. Transaction data may include the number of wagers, the size of these wagers, the date and time for these wagers, the identity of the players making these wagers, and the frequency of the wagers. Accounting/transaction server 220 may generate tax information relating to these wagers. Accounting/transaction server 220 may generate profit/loss reports for predetermined gaming options, contingent gaming options, predetermined betting structures, and/or outcome categories.

Gaming server 225 may generate gaming options based on predetermined betting structures and/or outcome categories. These gaming options may be predetermined gaming options, contingent gaming options, and/or any other gaming option disclosed in this disclosure.

Authentication server 230 may determine the validity of vouchers, players' identity, and/or an outcome for a gaming event.

Player tracking server 235 may track a player's betting activity, a player's preferences (e.g., language, drinks, font, sound level, etc.). Based on data obtained by player tracking server 235, a player may be eligible for gaming rewards (e.g., free play), promotions, and/or other awards (e.g., complimentary food, drinks, lodging, concerts, etc.).

Voucher server 240 may generate a voucher, which may include data relating to gaming options. For example, data relating to the structure may be generated. If there is a time deadline, that information may be generated by voucher server 240. Vouchers may be physical (e.g., paper) or digital.

Searching server 242 may implement a search on one or more gaming devices to obtain gaming data. Searching server 242 may implement a messaging function, which may transmit a message to a third party (e.g., a player) relating to a search, a search status update, a game status update, a wager status update, a confirmation of a wager, a confirmation of a money transfer, and/or any other data relating to the player's account. The message can take the form of a text display on the gaming device, a pop up window, a text message, an email, a voice message, a video message and the like. Searching server 242 may implement a wagering function, which may be an automatic wagering mechanism. These functions of searching server 242 may be integrated into one or more servers.

Searching server 242 may include one or more searching structures, one or more searching algorithms, and/or any other searching mechanisms. In general, the search structures may cover which skill-based, wager-based games paid out the most money during a time period, which skill-based, wager-based games kept the most money from players during a time period, which skill-based, wager-based games are most popular (e.g., top games), which skill-based, wager-based games are least popular, which skill-based, wager-based games have the most amount of money wager during a period, which skill-based, wager-based games have the highest wager volume, which skill-based, wager-based games are more volatile (e.g., volatility, or deviation from the statistical norms, of wager volume, wager amount, pay out, etc.) during a time period, and the like. Search may also be associated with location queries, time queries, and/or people queries.

The searching structures may be predetermined searching structures. For example, the method may start searching a first device, then a second device, then a third device, up to an $N^{th}$ device based on one or more searching parameters (e.g., triggering event). In one example, the search may end once one or more triggering events are determined. In another example, the search may end once data has been received from a predetermined number (e.g., one, two, ten, one hundred, all) of the devices. In another example, the search may be based on a predetermined number of devices to be searched in combination with a predetermined number of search results to be obtained. In this example, the search structure may be a minimum of ten devices to be searched, along with a minimum of five gaming options to be determined.

In another example, the searching structures may be based on one or more specific game types and/or themes (e.g., first person shooter types, first person rail types, TV themes, Movie themes, multiplayer types, etc.). Searching structure may search one or more of these games.

In another example, the searching structure may be based on a player's preferences, past transactional history, player input, a particular game, a particular EGD, a particular casino, a particular location within a casino, game outcomes over a time period, payout over a time period, and/or any other criteria.

Figure 3:
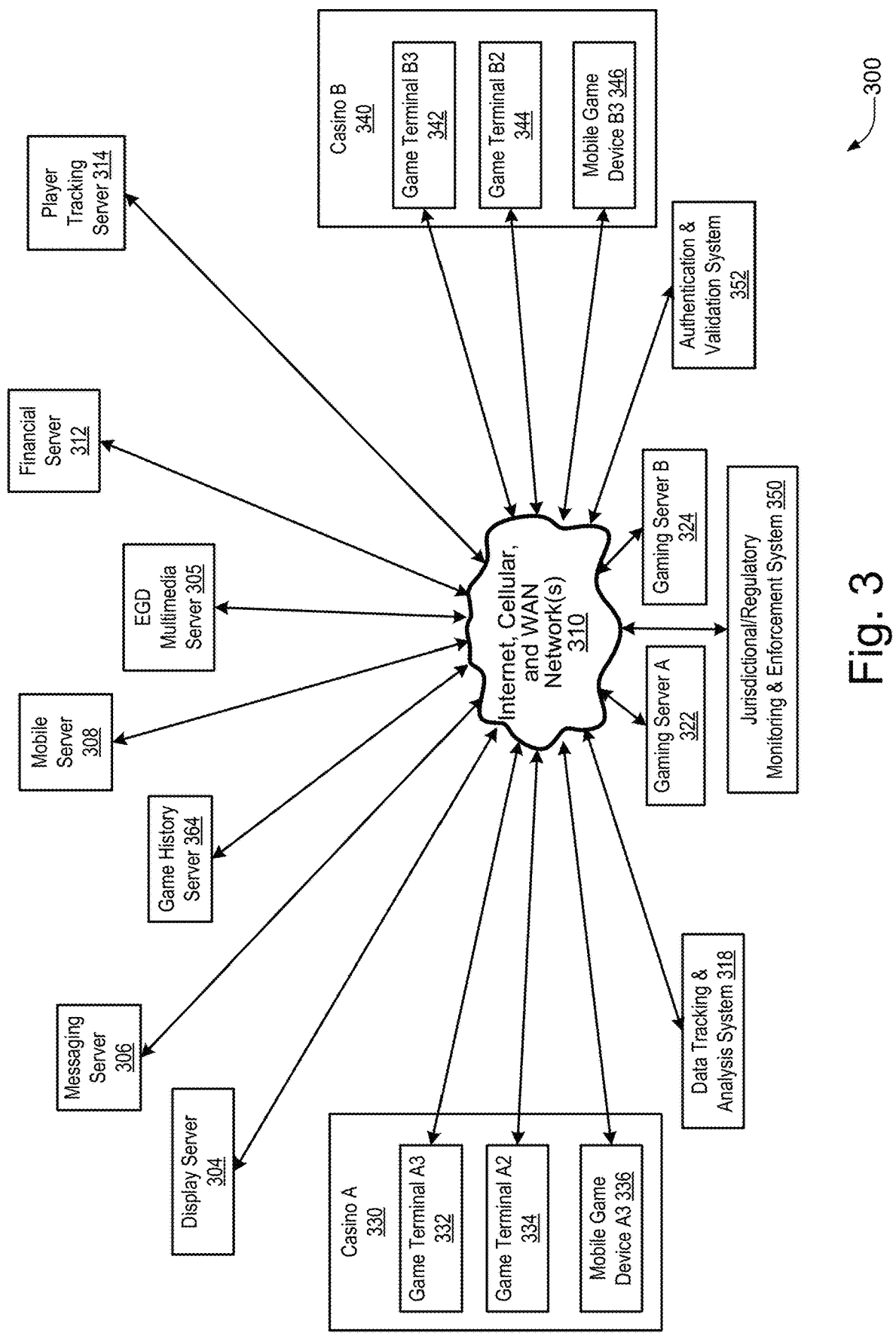
FIG. 3 illustrates a network diagram of an example embodiment of a gaming Network 300 which may be configured or designed to implement various skill-based, wager-based gaming techniques described and/or referenced herein.

Searching algorithms may be dynamic searching programs, which may be modified based on one or more past results. In one example, the search algorithm may determine that a specific triggering event occurs with a ninety percent success rate on a first EGD, a ten percent success rate on a second EGD, a fifty percent success rate on a third EGD, and a seventy percent success rate on a fourth EGD. The search algorithm may generate a search priority based on the probability of success, which may lead to the first EGD being searched first, the fourth EGD being searched second, the third EGD being searched third, and the second EGD being searched fourth. Search algorithm may utilize any dynamic feedback procedure to enhance current and/or future searching results FIG. 3 illustrates a network diagram of an example embodiment of a gaming Network 300 which may be configured or designed to implement various skill-based, wager-based gaming techniques described and/or referenced herein. As described in greater detail herein, different embodiments of gaming Networks may be configured, designed, and/or operable to provide various different types of operations, functionalities, and/or features generally relating to gaming Network technology. Further, as described in greater detail herein, many of the various operations, functionalities, and/or features of the gaming Network(s) and/or gaming system(s) disclosed herein may provide may enable or provide different types of advantages and/or benefits to different entities interacting with the gaming Network(s).

According to different embodiments, at least some gaming Network(s) may be configured, designed, and/or operable to provide a number of different advantages and/or benefits and/or may be operable to initiate, and/or enable various different types of operations, functionalities, and/or features, such as, for example, one or more of the following (e.g., or combinations thereof):

Enable real-world casino venues to securely and legally provide opportunities for their players/players to participate in online or network-based wager-based gaming sessions. Examples of various types of games which may be played may include, but are not limited to, one or more skill-based, wager-based game(s) such as those described and/or referenced herein.

Enable casino venues to provide opportunities for their players/players to participate in live, multiplayer, wager-based, arcade-style video games where players from different casinos, different locations, and/or different EGDs, are able to compete against one another in a multiplayer, skill-based, wager-based gaming environment. In at least one embodiment, players can be located at the same and/or at remote gaming venues that are connected via a wide area network such as the Internet, cellular networks, VPNs, cloud-based networks, etc.

Utilize live electronic gaming device dealers and attendants for conducting the wager-based, arcade-style video games.

Deploy electronic gaming devices (e.g., EGDs) in multiple different physical casino venues, and utilize the EGDs for enabling casino players/players to participate in wager-based, arcade-style video games.

Players may be allowed to manually switch or change their opponents (e.g., in heads-up game play).

Players may be automatically switched (e.g., by gaming system) to play different opponents (e.g., auto switching feature; useful for tournament play).

Gaming system may perform automated matching of players in tournament (e.g., based on various criteria such as, for example: skill level, experience, random, social relationships, etc.). In at least one embodiment, multi-property network connections between various different casino venues (e.g., located at different geographic locations) may be implemented and utilized to facilitate pairing of and/or participation by remote players.

In at least one embodiment, a central clearing house may be utilized for financial transactions (e.g., deposit, debit of player accounts, payouts, lines of credit, etc.) relating to the skill-based, wager-based game sessions.

Various types of game play rules may be implemented and automatically enforced for the skill-based, wager-based game sessions, such as, for example: time limit per play, amount per wager, max wager, maximum wager, rules to facilitate speed of game play, rules imposed for conformance with regulatory or jurisdiction requirements, etc. For example, in one embodiment, if a player failed to make a wager within an allotted time interval, the system may be configured or designed to automatically enter default wager for that player.

According to different embodiments, the gaming Network 300 may include a plurality of different types of components, devices, modules, processes, systems, etc., which, for example, may be implemented and/or instantiated via the use of hardware and/or combinations of hardware and software. For example, as illustrated in the example embodiment of FIG. 3, the gaming Network may include one or more of the following types of systems, components, devices, processes, etc. (e.g., or combinations thereof):

- Display System Server(s) 304. In at least one embodiment, the Display System Server(s) may be configured or designed to implement and/or facilitate management of content (e.g., graphics, images, text, video fees, etc.) to be displayed and/or presented at one or more EGDs (e.g., or at one or more groups of EGDs), dealer displays, administrator displays, etc.
- EGD Multimedia System Server(s) 305. In at least one embodiment, the Table Multimedia System Server(s) may be configured or designed to generate, implement and/or facilitate management of content (e.g., graphics, images, text, video fees, audio feeds, etc.), which, for example, is to be streamed or provided to one or more EGDs (e.g., or to one or more groups of EGDs).
- Messaging System Server(s) 306. In at least one embodiment, the Messaging System Server(s) may be configured or designed to implement and/or facilitate management of messaging and/or other communications among and between the various systems, components, devices, EGDs, players, dealers, and administrators of the gaming network.
- Mobile System Server(s) 308. In at least one embodiment, the Mobile System Server(s) may be configured or designed to implement and/or facilitate management of communications and/or data exchanged with various types of mobile devices, including for example: player-managed mobile devices (e.g., smart phones, PDAs, tablets, mobile computers), casino-managed mobile devices (e.g., mobile gaming devices), etc.
- Financial System Server(s) 312. In at least one embodiment, the Financial System Server(s) may be configured or designed to implement and/or facilitate tracking, management, reporting, and storage of financial data and financial transactions relating to one or more skill-based, wager-based game sessions. For example, at least some Financial System Server(s) may be configured or designed to keep track of the game accounting (e.g., money in, money out) for a virtual skill-based, wager-based game being played, and may also be configured or designed to handle various financial transactions relating to player wagers and payouts. For example, in at least one embodiment, Financial Servers may be configured or designed to monitor each remote player's account information, and may also manage or handle funds transfers between each player's account and the active game server (e.g., associated with the player's game session).
- Player Tracking System Server(s) 314. In at least one embodiment, the Player Tracking System Server(s) may be configured or designed to implement and/or facilitate management and exchange of player tracking information associated with one or more EGDs, skill-based, wager-based game sessions, etc. In at least one embodiment, a Player Tracking System Server may include at least one database that tracks each player's hands, wins/losses, bet amounts, player preferences, etc., in the network. In at least one embodiment, the presenting and/or awarding of promotions, bonuses, rewards, achievements, etc., may be based on a player's play patterns, time, games selected, bet amount for each game type, etc. A Player Tracking System Server may also help establish a player's preferences, which assists the casino in their promotional efforts to: award player comps (e.g., loyalty points); decide which promotion(s) are appropriate; generate bonuses; etc.
- Data Tracking & Analysis System(s) 318. In at least one embodiment, the Data Tracking & Analysis System(s) may be configured or designed to implement and/or facilitate management and analysis of game data. For example, in one embodiment the Data Tracking & Analysis System(s) may be configured or designed to aggregate multisite skill-based, wager-based gaming trends, local wins, jackpots, etc.
- Gaming System Server(s) (e.g., 322, 324). In at least one embodiment, different game servers may be configured or designed to be dedicated to one or more specifically designated type(s) of game(s). Each game server has game logic to host one of more virtual skill-based, wager-based game sessions. At least some game server(s) may also be capable of keeping track of the game accounting (e.g., money in, money out) for a virtual skill-based, wager-based game being played, and/or for updating the Financial Servers at the end of each game. The game server(s) may also operable to generate the EGD graphics primitives (e.g., game virtual objects and game states), and may further be operable to update EGDs when a game state change (e.g., new card dealt, player upped the ante, player folds/busts, etc.) may be detected.
- Jurisdictional/Regulatory Monitoring & Enforcement System(s) 350. In at least one embodiment, the Jurisdictional/Regulatory Monitoring & Enforcement System(s) may be configured or designed to handle tracking, monitoring, reporting, and enforcement of specific regulatory requirements relating to wager-based gameplay activities in one or more jurisdictions.
- Authentication & Validation System(s) 352. According to different embodiments, the Authentication & Validation System(s) may be configured or designed to determine and/or authenticate the identity of the current player at a given EGD. For example, in one embodiment, the current player may be required to perform a log in process at the EGD in order to access one or more features. Alternatively, the EGD may be adapted to automatically determine the identity of the current player based upon one or more external signals such as, for example, scanning of a barcode of a player tracking card, an RFID tag or badge worn by the current player which provides a wireless signal to the EGD for determining the identity of the current player. In at least one implementation, various security features may be incorporated into the EGD to prevent unauthorized players from engaging in certain types of activities at the EGD. In some embodiments, the Authentication & Validation System(s) may be configured or designed to authenticate and/or validate various types of hardware and/or software components, such as, for example, hardware/software components residing at a remote EGDs, game play information, wager information, player information and/or identity, etc. Examples of various authentication and/or validation components are described in U.S. Pat. No. 6,620,047, titled, "ELECTRONIC GAMING APPARATUS HAVING AUTHENTICATION DATA SETS," incorporated herein by reference in its entirety for all purposes.

Casino Venues (e.g., 330, 340). In at least one embodiment, each casino venue may correspond to a real-world, physical casino which is located at a particular geographic location. In some embodiments, a portion of the multiple different casino venues may be affiliated with each other (e.g., Harrah's Las Vegas, Harrah's London). In other embodiments, at least a portion of the multiple different casino venues do not share any affiliation with each other.

Electronic gaming devices (e.g., EGDs) 332, 334, 336, 342, 344, 346. As described in greater detail herein, the EGDs may be configured or designed to facilitate and enable players to participate in wager-based, arcade-style video game sessions (e.g., and/or other types of skill-based, wager-based game sessions). Different EGDs may be physically located in one or more different casino venues, and may be connected via a communication network. In some embodiments, EGDs may be implemented as stationary machines. In some embodiments, at least some EGDs may be implemented using mobile devices (e.g., tablets, smartphones, laptops, PC's, and the like).

Internet, Cellular, and WAN Network(s) 310

Game History Server(s) 364. In at least one embodiment, the game History Server(s) may be configured or designed to track all (e.g., or selected) game types and game play history for all (e.g., or selected) skill-based, wager-based games. In some embodiments, a game History Server may also assist the casino manager in case of disputes between players and the casino by, for example, providing the ability to "replay" (e.g., by virtually recreating the game events) the game in dispute, step by step, based on previously stored game states. Such dispute resolution capability is a desirable feature in skill-based, wager-based game environments.

Remote Database System(s) which, for example, may be operable to store and provide access to various types of information and data described herein.

Remote System Server(s)/Service(s), which, for example, may include, but are not limited to, one or more of the following (e.g., or combinations thereof):
Content provider servers/services
Media Streaming servers/services
Database storage/access/query servers/services
Financial transaction servers/services
Payment gateway servers/services
Electronic commerce servers/services
Event management/scheduling servers/services
Etc.

Figure 6:
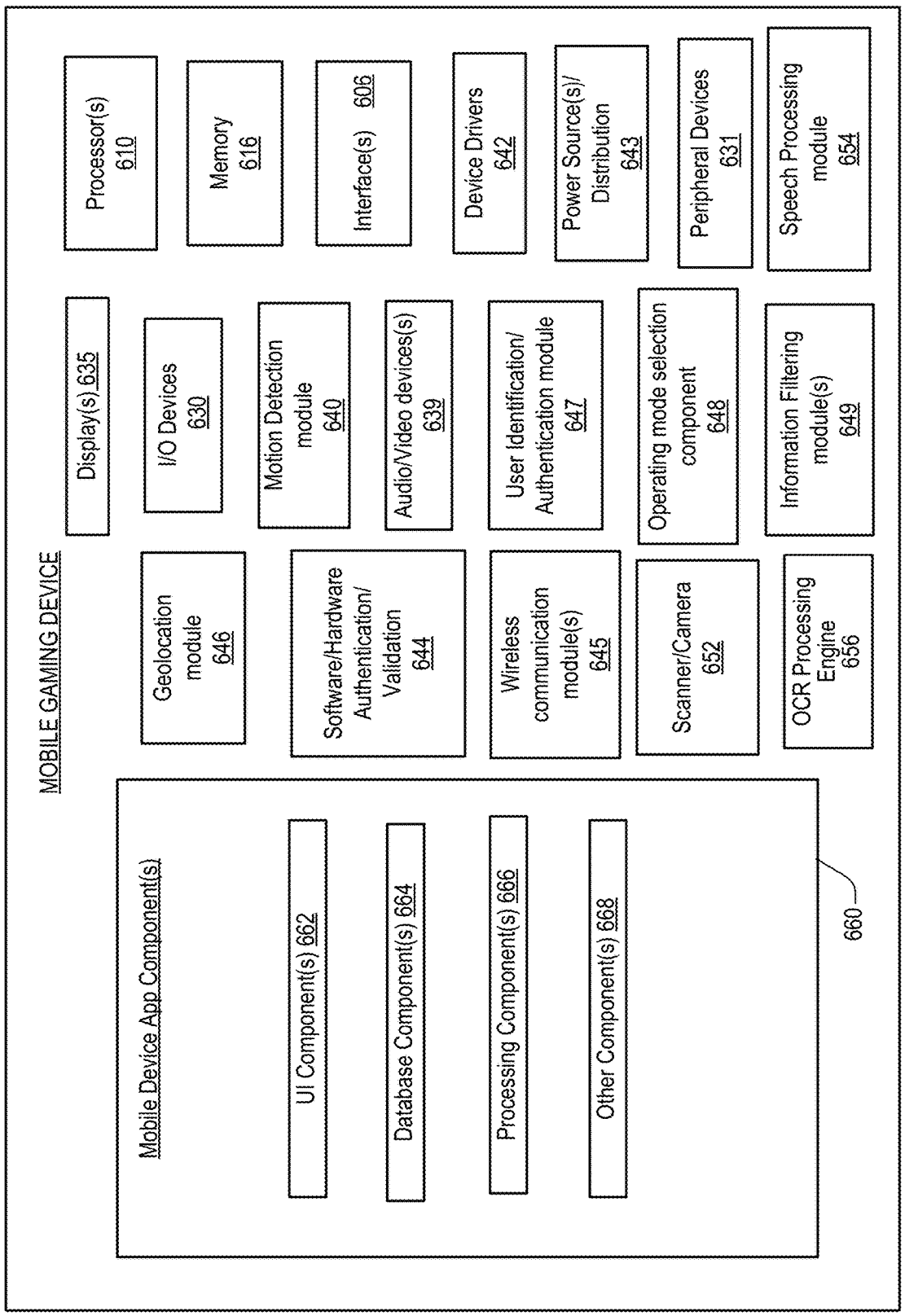
FIG. 6 is a simplified block diagram of an exemplary mobile gaming device 600 in accordance with a specific embodiment.

Mobile game Device(s) 336, 346—In at least one embodiment, the Mobile Device(s) may be operable to perform and/or implement various types of functions, operations, actions, and/or other features such as those described or referenced herein (e.g., such as those illustrated and/or described with respect to FIG. 6).

According to specific embodiments, a variety of different game states may be used to characterize the state of current and/or past events which are occurring (e.g., or have occurred) at a given EGD. For example, in one embodiment, at any given time in a game, a valid current game state may be used to characterize the state of game play (e.g., and/or other related events, such as, for example, mode of operation of the EGD, etc.) at that particular time. In at least one embodiment, multiple different states may be used to characterize different states or events which occur at the EGD at any given time. In one embodiment, when faced with ambiguity of game state, a single state embodiment forces a decision such that one valid current game state is chosen. In a multiple state embodiment, multiple possible game states may exist simultaneously at any given time in a game, and at the end of the game or at any point in the middle of the game, the EGD may analyze the different game states and select one of them based on certain criteria. Thus, for example, when faced with ambiguity of game state, the multiple state embodiment(s) allow all potential game states to exist and move forward, thus deferring the decision of choosing one game state to a later point in the game. The multiple game state embodiment(s) may also be more effective in handling ambiguous data or game state scenarios.

According to specific embodiments, a variety of different entities may be used (e.g., either singly or in combination) to track the progress of game states which occur at a given gaming EGD. Examples of such entities may include, but are not limited to, one or more of the following (e.g., or combination thereof): master controller system, display system, gaming system, local game tracking component(s), remote game tracking component(s), etc. Examples of various game tracking components may include, but are not limited to: automated sensors, manually operated sensors, video cameras, intelligent playing card shoes, RFID readers/writers, RFID tagged chips, objects displaying machine readable code/patterns, etc.

According to a specific embodiment, local game tracking components at the EGD may be operable to automatically monitor game play activities at the EGD, and/or to automatically identify key events which may trigger a transition of game state from one state to another as a game progresses. Depending upon the type of game being played at the gaming table, examples of possible key events may include, but are not limited to, one or more of the following (e.g., or combination thereof):
start of a new skill-based, wager-based gaming session;
end of a current skill-based, wager-based gaming session;
start of a virtual slot wheel spin;
game start event;
game end event;
detection of event for triggering initiation of wager-based event (e.g., destroying a zombie on screen triggers spin of virtual slot reel, and subsequent payout/credit award);
detection of event for triggering end of wager-based event (e.g., slot wheel spin, etc.);
detection of event for triggering initiation of randomized game play event;
detection of event for triggering end of randomized game play event;
initial wager period start;
initial wager period end;
subsequent wager period start;
subsequent wager period end;
payout period start;
payout period end;
etc.

FIGS. 4, 5, 6, and 14 show block diagrams of different example embodiments of electronic gaming machines (e.g., EGMs) or electronic gaming devices ("EGDs) which may be used for facilitating, enabling, initiating, and/or implementing one or more of the skill-based, wager-based gaming aspects described herein.

Figure 4:
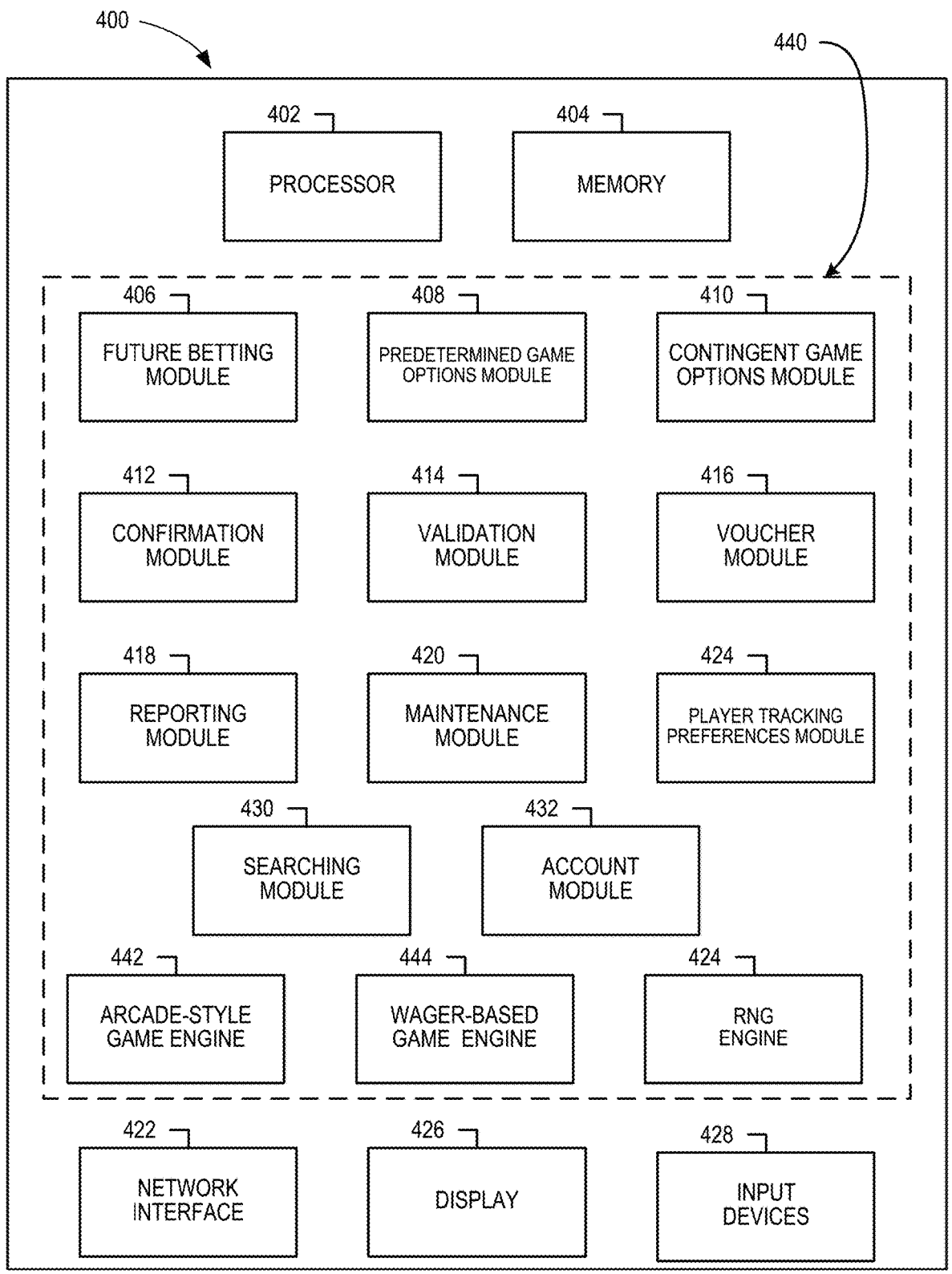
FIG. 4 shows a block diagram of electronic gaming device 400, in accordance with a specific embodiment.

FIG. 4 shows a block diagram 400 of electronic gaming device 400, in accordance with a specific embodiment. Electronic gaming device 400 may include a processor 402, a memory 404, a network interface 422, input devices 428, and a display 426.

Processor 402 may generate gaming options based on predetermined betting structures and/or outcome categories. Predetermined betting structures may utilize more than one outcome category to generate via processor 402 gaming options. Predetermined betting structures may combine any outcome category with any other outcome category to gaming options.

Processor 402 may offer a gaming option which is structured so that the gaming option relates to more than one EGD. Processor 402 may generate contingent gaming options and/or predetermined gaming options. Contingent gaming options 410 may be structures such that when a triggering event occurs over one or more than one gaming event, racing event, and/or sporting event, the wager is activated.

Network interface 422 may allow electronic gaming device 400 to communicate with remote devices/systems such as, for example, video/multimedia server(s), accounting/transaction server(s), gaming server(s), authentication server(s), player tracking server(s), voucher server(s), etc.

Input devices 428 may be mechanical buttons, electronic buttons, a touchscreen, a microphone, cameras, an optical scanner, or any combination thereof. Input devices 428 may be utilized to make a wager, to make an offer to buy or sell a voucher, to determine a voucher's worth, to cash in a voucher, to modify (e.g., change sound level, configuration, font, language, etc.) electronic gaming device 400, to select a movie or music, to select type of content to be displayed on main and/or auxiliary screen(s) of EGD, or any combination thereof.

Arcade-Style game Engine 442 may be configured or designed to manage the arcade-style game play portion (or entertainment portion) of the skill-based, wager-based game.

Wager-Based game Engine 444 may be configured or designed to manage the wager-based game event portion(s) of the skill-based, wager-based game.

Random Number Generator (RNG) Engine 446 may include software and/or hardware algorithm and/or processes which are used to generate random outcomes, and may be used by the Wager-Based game Engine to generate wager-based game event outcomes, at least a portion of which may correspond to predetermined wager-based game event outcomes (as described in greater detail below).

Display 426 may show video streams from one or more gaming devices, gaming objects from one or more gaming devices, computer generated graphics, predetermined gaming options, and/or contingent gaming options.

Memory 404 may include various memory modules 440. Memory 404 via various memory modules 440 may include a future betting module 406, a predetermined game options module 408, a contingent game options module 410, a confirmation module 412, a validation module 414, a voucher module 416, a reporting module 418, a maintenance module 420, a player tracking preferences module 424, a searching module 430, and an account module 432.

Future betting module 406 may store data relating to the predetermined betting structure. Processor 402 may utilize data in future betting module 406 to generate predetermined gaming options and/or contingent gaming options. Any other processor (e.g., gaming server 225, any virtualized gaming server, etc.) may implement these functions of processor 402.

Predetermined game options module 408 may store data relating to predetermined gaming options, which may be offered to a player.

Contingent game options module 410 may store data relating to contingent gaming options, which may be offered to a player.

Confirmation module 412 may utilize data received from a voucher, the transaction history of the voucher (e.g., the voucher changed hands in a secondary market), and/or the identity of the player to confirm the value of the voucher. In another example, confirmation module 412 may utilize game event data, along with voucher data to confirm the value of the voucher.

Validation module 414 may utilize data received from a voucher to confirm the validity of the voucher.

Voucher module 416 may store data relating to generated vouchers, redeemed vouchers, bought vouchers, and/or sold vouchers.

Reporting module 418 may generate reports related to a performance of electronic gaming device 400, electronic gaming system(s), skill-based, wager-based game(s), video streams, gaming objects, credit device(s), identification device(s), etc.

In one implementation, reporting module 418 may reside on a central server and can aggregate and generate real time statistics on betting activities at one or more skill-based, wager-based games at one or more participating casino's. The aggregate betting statistics may include trends (e.g., aggregate daily wager volume and wager amount by game types, by casinos, and the like), top games with the most payouts, top tables with the most payouts, top search structures used by players, most popular skill-based, wager-based game(s) by wager volume, most searched for game, skill-based, wager-based game(s) with least payouts, weekly trends, monthly trends, and other statistics related to game plays, wagers, people, location, and searches.

The information and statistics generated by the server-based reporting module 418 can be displayed publicly or privately. For example, popular trending and statistical information on wager volume and wager amount for the top ten skill-based, wager-based games can be publicly displayed in a casino display system so that players can study and decide what game to play, where, when, etc. Such a public display of general statistics can also be posted on the Internet, sent out as a text, an email, or multimedia message to the player's smart phones, tablets, desktop computer, etc. In another example, the trending and statistical information can also be distributed privately to privileged players such as casino club members.

Maintenance module 420 may track any maintenance that is implemented on electronic gaming device 400 and/or electronic gaming system 200. Maintenance module 420 may schedule preventative maintenance and/or request a service call based on a device error.

Player tracking preferences module 424 may compile and track data associated with a players preferences.

Searching module 430 may include one or more searching structures, one or more searching algorithms, and/or any other searching mechanisms. The searching structures may be predetermined searching structures. For example, the method may start searching a first device, then a second device, then a third device, up to an $N^{th}$ device based on one or more searching parameters (e.g., triggering event). In one example, the search may end once one or more triggering events are determined. In another example, the search may end once data has been received from a predetermined number (e.g., one, two, ten, one hundred, all) of the devices.

In another example, the search may be based on a predetermined number of devices to be searched in combination with a predetermined number of search results to be obtained. In this example, the search structure may be a minimum of ten devices to be searched, along with a minimum of five gaming options to be determined.

In another example, the searching structures may be based on one or more specific games (e.g., baccarat tables, roulette tables, blackjack tables, poker tables, craps tables, Sic Bo tables, etc.). Searching structure may search one or more of these games.

In another example, the searching structure may be based on a player's preferences, past transactional history, player input, a particular skill-based, wager-based game or game type, a particular EGD, a particular casino, a particular location within a casino, game outcomes over a time period, payout over a time period, and/or any other criteria. Searching algorithms may be dynamic searching programs, which may be modified based on one or more past results, as described previously.

In another example, the search algorithm may generate a search priority based on the probability of success various events and/or conditions, as described previously. In some embodiments, the search algorithm may utilize any dynamic feedback procedure to enhance current and/or future searching results.

Account module 432 may include data relating to an account balance, a wager limit, a number of wagers placed, credit limits, any other player information, and/or any other account information.

Data from account module 432 may be utilized to determine whether a wager may be accepted. For example, when a search has determined a triggering event, the device and/or system may determine whether to allow this wager based on one or more of a wager amount, a number of wagers, a wager limit, an account balance, and/or any other criteria.

In at least one embodiment, at least a portion of the modules discussed in block diagram 400 may reside locally in gaming terminal 400. However, in at least some embodiments, the functions performed by these modules may be implemented in one or more remote servers. For instance, modules 406-420 and 424 may each be on a remote server, communicating with gaming terminal 400 via a network interface such as Ethernet in a local or a wide area network topology. In some implementations, these servers may be physical servers in a data center. In some other implementations, these servers may be virtualized. In yet some other implementations, the functions performed by these modules may be implemented as web services. For example, the predetermined game options module 408 may be implemented in software as a web service provider. gaming terminal 400 would make service requests over the web for the available predetermined wager options to be displayed. Regardless of how the modules and their respective functions are implemented, the interoperability with the gaming terminal 400 is seamless.

In one implementation, reporting module 418 may reside on a central server and can aggregate and generate real time statistics on betting activities at one or more skill-based, wager-based games at one or more participating casino's. The aggregate betting statistics may include trends (e.g., aggregate daily wager volume and wager amount by game types, by casinos, and the like), top games with the most payouts, top EGDs with the most payouts, top search structures used by players, most popular skill-based, wager-based game(s) by wager volume, most searched for game(s), EGDs with least payouts, weekly trends, monthly trends, and other statistics related to game plays, wagers, people, location, and searches.

The information and statistics generated by the server-based reporting module 418 can be displayed publicly or privately. For example, popular trending and statistical information on wager volume and wager amount for the top ten skill-based, wager-based games can be publicly displayed in a casino display system so that players can study and decide what game to play, where, when, etc. Such a public display of general statistics can also be posted on the Internet, sent out as a text, an email, or multimedia message to the player's smart phones, tablets, desktop computer, etc. In another example, the trending and statistical information can also be distributed privately to privileged players such as casino club members.

Figure 5:
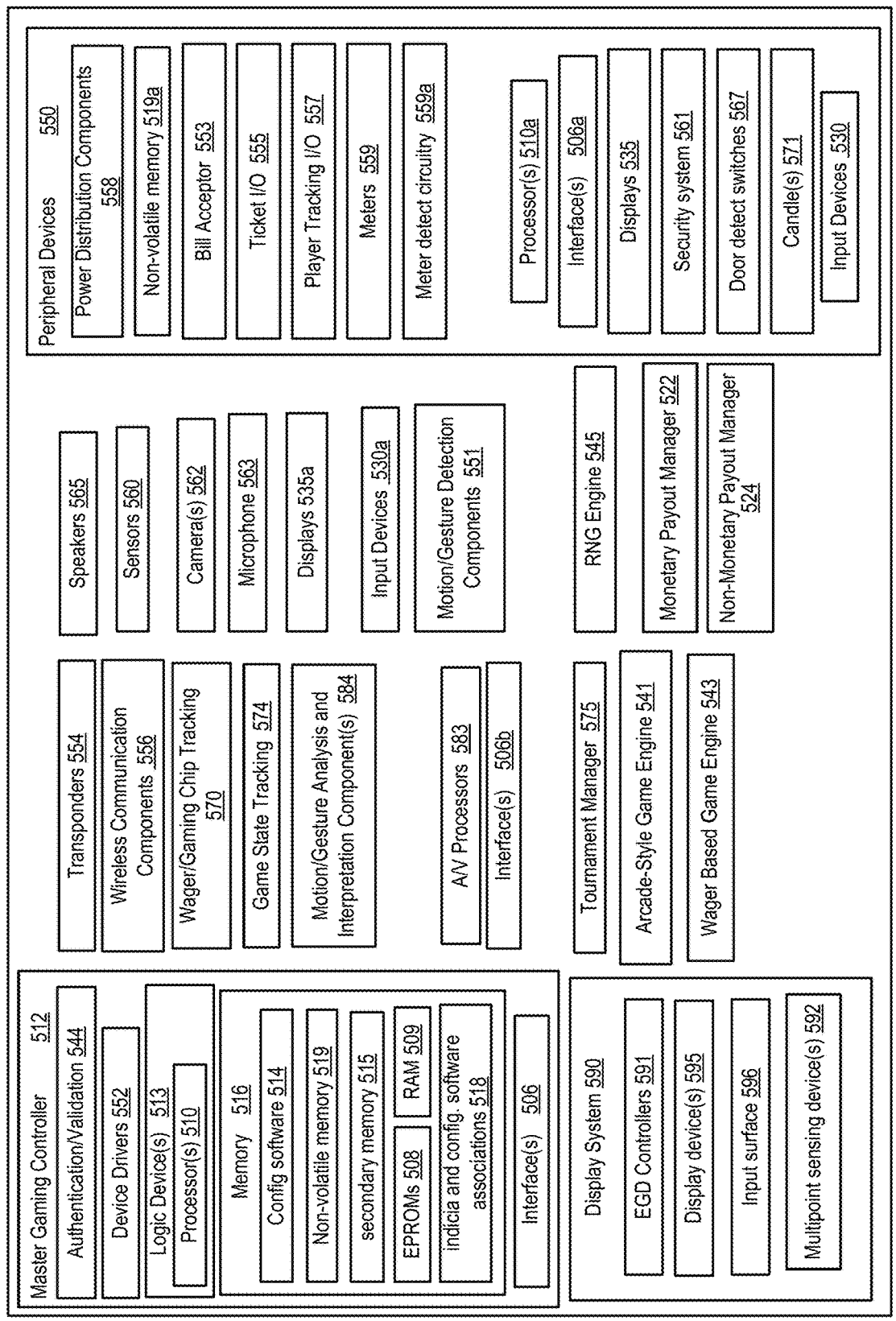
FIG. 5 is a simplified block diagram of an exemplary intelligent electronic gaming system 500 in accordance with a specific embodiment.

FIG. 5 is a simplified block diagram of an exemplary intelligent multi-player electronic gaming system 500 in accordance with a specific embodiment. In some embodiments, gaming system 500 may be implemented as a gaming server. In other embodiments, gaming system 500 may be implemented as an electronic gaming machine (e.g., EGM) or electronic gaming device (e.g., EGD).

As illustrated in the embodiment of FIG. 5, gaming system 500 includes at least one processor 510, at least one interface 506, and memory 516. Additionally, as illustrated in the example embodiment of FIG. 5, gaming system 500 includes at least one master gaming controller 512, a multi-touch sensor and display system 590, a plurality of peripheral device components 550, and various other components, devices, systems such as, for example, one or more of the following (e.g., or combinations thereof):

Arcade-Style game Engine(s) 541;
Wager-Based game Engine(s) 543;
RNG Engine(s) 545;
Candle control system which, for example, may include functionality for determining and/or controlling the appearances of one or more candles, etc.;
Transponders 554;
Wireless communication components 556;
Gaming chip/wager token tracking components 570;
Games state tracking components 574;
Motion/gesture analysis and interpretation components 584.
Audio/video processors 583 which, for example, may include functionality for detecting, analyzing and/or managing various types of audio and/or video information relating to various activities at the gaming system.
Various interfaces 506b (e.g., for communicating with other devices, components, systems, etc.);
Tournament manager 575;
Sensors 560;
One or more cameras 562;
One or more microphones 563;
Secondary display(s) 535a;
Input devices 530a;
Motion/gesture detection components 551;
Peripheral Devices 550;
Arcade-Style game Engine(s) 541 may be configured or designed to manage the arcade-style game play portion (or entertainment portion) of the skill-based, wager-based game.

Wager-Based game Engine(s) 543 may be configured or designed to manage the wager-based game event portion(s) of the skill-based, wager-based game.

Random Number Generator (RNG) Engine(s) 545 may include software and/or hardware algorithm and/or processes which are used to generate random outcomes, and may be used by the Wager-Based game Engine to generate wager-based game event outcomes, at least a portion of which may correspond to predetermined wager-based game event outcomes (as described in greater detail below).

Monetary Payout Manager 522 may be configured or designed to include functionality for determining the appropriate monetary payout(s) (if any) to be distributed to player(s) based on the outcomes of the wager-based game events which are initiated during play of one or more skill-based, wager-based games.

Non-Monetary Payout Manager 524 may be configured or designed to include functionality for determining the appropriate non-monetary payout(s) (if any) to be awarded or distributed to player(s) based on the outcomes of the wager-based game events which are initiated during play of one or more skill-based, wager-based games.

One or more cameras (e.g., 562) may be used to monitor, stream and/or record image content and/or video content relating to persons or objects within each camera's view. For example, in at least one embodiment where the gaming system is implemented as an EGD, camera 562 may be used to generate a live, real-time video feed of a player (e.g., or other person) who is currently interacting with the EGD. In some embodiments, camera 562 may be used to verify a user's identity (e.g., by authenticating detected facial features), and/or may be used to monitor or tract facial expressions and/or eye movements of a user or player who is interacting with the gaming system.

In at least one embodiment, display system 590 may include one or more of the following (e.g., or combinations thereof):
  EGD controllers 591;
  Multipoint sensing device(s) 592 (e.g., multi-touch surface sensors/components);
  Display device(s) 595;
  Input/touch surface 596;
  Etc.

According to various embodiments, display surface(s) 595 may include one or more display screens utilizing various types of display technologies such as, for example, one or more of the following (e.g., or combinations thereof): LCDs (e.g., Liquid Crystal Display), Plasma, OLEDs (e.g., Organic Light Emitting Display), TOLED (e.g., Transparent Organic Light Emitting Display), Flexible (e.g., F)OLEDs, Active matrix (e.g., AM) OLED, Passive matrix (e.g., PM) OLED, Phosphorescent (e.g., PH) OLEDs, SEDs (e.g., surface-conduction electron-emitter display), EPD (e.g., ElectroPhoretic display), FEDs (e.g., Field Emission Displays) and/or other suitable display technology. EPD displays may be provided by E-ink of Cambridge, Mass. OLED displays of the type list above may be provided by Universal Display Corporation, Ewing, N.J.

In at least one embodiment, master gaming controller 512 may include one or more of the following (e.g., or combinations thereof):
  Authentication/validation components 544;
  Device drivers 552;
  Logic devices 513, which may include one or more processors 510;
  Memory 516, which may include one or more of the following (e.g., or combinations thereof): configuration software 514, non-volatile memory 519, EPROMS 508, RAM 509, associations 518 between indicia and configuration software, etc.;
  Interfaces 506;
  Etc.

In at least one embodiment, Peripheral Devices 550 may include one or more of the following (e.g., or combinations thereof):
  Power distribution components 558;
  Non-volatile memory 519a (e.g., and/or other types of memory);
  Bill acceptor 553;
  Ticket I/O 555;
  Player tracking I/O 557;
  Meters 559 (e.g., hard and/or soft meters);
  Meter detect circuitry 559a;
  Processor(s) 510a;
  Interface(s) 506a;
  Display(s) 535;
  Independent security system 561;
  Door detect switches 567;
  Candles, etc. 571;
  Input devices 530;
  Etc.

In one implementation, processor 510 and master gaming controller 512 are included in a logic device 513 enclosed in a logic device housing. The processor 510 may include any conventional processor or logic device configured to execute software allowing various configuration and reconfiguration tasks such as, for example: a) communicating with a remote source via communication interface 506, such as a server that stores authentication information or games; b) converting signals read by an interface to a format corresponding to that used by software or memory in the gaming system; c) accessing memory to configure or reconfigure game parameters in the memory according to indicia read from the device; d) communicating with interfaces, various peripheral devices and/or I/O devices; e) operating peripheral devices such as, for example, card readers, paper ticket readers, etc.; f) operating various I/O devices such as, for example, displays 535, input devices 530; etc. For instance, the processor 510 may send messages including game play information to the displays 535 to inform players of game play/event information, wagering information, and/or other desired information.

In at least one implementation, the gaming system may include card readers such as used with credit cards, or other identification code reading devices to allow or require player identification in connection with play of the card game and associated recording of game action. Such a player identification interface can be implemented in the form of a variety of magnetic card readers commercially available for reading a player-specific identification information. The player-specific information can be provided on specially constructed magnetic cards issued by a casino, or magnetically coded credit cards or debit cards frequently used with national credit organizations such as Visa, Mastercard, American Express, or banks and other institutions.

The gaming system may include other types of participant identification mechanisms which may use a fingerprint image, eye blood vessel image reader, or other suitable biological information to confirm identity of the player. Such personalized identification information could also be used to confirm credit use of a smart card, transponder, and/or player's personal player input device (e.g., UID).

The gaming system 500 also includes memory 516 which may include, for example, volatile memory (e.g., RAM 509), non-volatile memory 519 (e.g., disk memory, FLASH memory, EPROMs, etc.), unalterable memory (e.g., EPROMs 508), etc. The memory may be configured or designed to store, for example: 1) configuration software 514 such as all the parameters and settings for a game playable on the gaming system; 2) associations 518 between configuration indicia read from a device with one or more parameters and settings; 3) communication protocols allowing the processor 510 to communicate with peripheral devices and I/O devices 4) a secondary memory storage device 515 such as a non-volatile memory device, configured to store gaming software related information (e.g., the gaming software related information and memory may be used to store various audio files and games not currently being used and invoked in a configuration or reconfiguration); 5) communication transport protocols (e.g., such as, for example, TCP/IP, USB, Firewire, IEEE1394, Bluetooth, IEEE 802.11x (e.g., IEEE 802.11 standards), hiperlan/2, HomeRF, etc.) for allowing the gaming system to communicate with local and non-local devices using such protocols; etc. In one implementation, the master gaming controller 512 communicates using a serial communication protocol. A few examples of serial communication protocols that may be used to communicate with the master gaming controller include but are not limited to USB, RS-232 and Netplex (e.g., a proprietary protocol developed by IGT, Reno, Nev.).

A plurality of device drivers 552 may be stored in memory 516. Example of different types of device drivers may include device drivers for gaming system components, device drivers for gaming system components, etc. Typically, the device drivers 552 utilize a communication protocol of some type that enables communication with a particular physical device. The device driver abstracts the hardware implementation of a device. For example, a device drive may be written for each type of card reader that may be potentially connected to the gaming system. Examples of communication protocols used to implement the device drivers include Netplex, USB, Serial, Ethernet, Firewire, I/O debouncer, direct memory map, serial, PCI, parallel, RF, Bluetooth™, near-field communications (e.g., using near-field magnetics), 802.11 (e.g., WiFi), etc. Netplex is a proprietary IGT standard while the others are open standards. According to a specific embodiment, when one type of a particular device is exchanged for another type of the particular device, a new device driver may be loaded from the memory 516 by the processor 510 to allow communication with the device. For instance, one type of card reader in gaming system 500 may be replaced with a second type of card reader where device drivers for both card readers are stored in the memory 516.

In some embodiments, the software units stored in the memory 516 may be upgraded as needed. For instance, when the memory 516 is a hard drive, new games, game options, various new parameters, new settings for existing parameters, new settings for new parameters, device drivers, and new communication protocols may be uploaded to the memory from the master gaming controller 512 or from some other external device. As another example, when the memory 516 includes a CD/DVD drive including a CD/DVD designed or configured to store game options, parameters, and settings, the software stored in the memory may be upgraded by replacing a first CD/DVD with a second CD/DVD. In yet another example, when the memory 516 uses one or more flash memory 519 or EPROM 508 units designed or configured to store games, game options, parameters, settings, the software stored in the flash and/or EPROM memory units may be upgraded by replacing one or more memory units with new memory units which include the upgraded software. In another embodiment, one or more of the memory devices, such as the hard-drive, may be employed in a game software download process from a remote software server.

In some embodiments, the gaming system 500 may also include various authentication and/or validation components 544 which may be used for authenticating/validating specified gaming system components such as, for example, hardware components, software components, firmware components, information stored in the gaming system memory 516, etc. Examples of various authentication and/or validation components are described in U.S. Pat. No. 6,620,047, entitled, "ELECTRONIC GAMING APPARATUS HAVING AUTHENTICATION DATA SETS," incorporated herein by reference in its entirety for all purposes.

Sensors 560 may include, for example, optical sensors, pressure sensors, RF sensors, Infrared sensors, motion sensors, audio sensors, image sensors, thermal sensors, biometric sensors, etc. As mentioned previously, such sensors may be used for a variety of functions such as, for example: detecting the presence and/or monetary amount of gaming chips which have been placed within a player's wagering zone; detecting (e.g., in real time) the presence and/or monetary amount of gaming chips which are within the player's personal space; etc.

In one implementation, at least a portion of the sensors 560 and/or input devices 530 may be implemented in the form of touch keys selected from a wide variety of commercially available touch keys used to provide electrical control signals. Alternatively, some of the touch keys may be implemented in another form which are touch sensors such as those provided by a touchscreen display. For example, in at least one implementation, the gaming system player may include input functionality for enabling players to provide their game play decisions/instructions (e.g., and/or other input) to the EGD using the touch keys and/or other player control sensors/buttons. Additionally, such input functionality may also be used for allowing players to provide input to other devices in the casino gaming network (e.g., such as, for example, player tracking systems, side wagering systems, etc.)

Wireless communication components 556 may include one or more communication interfaces having different architectures and utilizing a variety of protocols such as, for example, 802.11 (e.g., WiFi), 802.15 (e.g., including Bluetooth™), 802.16 (e.g., WiMax), 802.22, Cellular standards such as CDMA, CDMA2000, WCDMA, Radio Frequency (e.g., RFID), Infrared, Near Field Magnetic communication protocols, etc. The communication links may transmit electrical, electromagnetic or optical signals which carry digital data streams or analog signals representing various types of information.

An example of a near-field communication protocol is the ECMA-340 "Near Field Communication—Interface and Protocol (e.g., NFCIP-1)", published by ECMA International (e.g., www.ecma-international.org), herein incorporated by reference in its entirety for all purposes. It will be appreciated that other types of Near Field Communication protocols may be used including, for example, near field magnetic communication protocols, near field RF communication protocols, and/or other wireless protocols which provide the ability to control with relative precision (e.g., on the order of centimeters, inches, feet, meters, etc.) the allowable radius of communication between at least 5 devices using such wireless communication protocols.

Power distribution components 558 may include, for example, components or devices which are operable for providing wireless power to other devices. For example, in one implementation, the power distribution components 558 may include a magnetic induction system which is adapted to provide wireless power to one or more portable UIDs at the gaming system. In one implementation, a UID docking region may include a power distribution component which is able to recharge a UID placed within the UID docking region without requiring metal-to-metal contact.

In at least one embodiment, motion/gesture detection component(s) 551 may be configured or designed to detect player movements and/or gestures and/or other input data from the player. In some embodiments, each gaming system may have its own respective motion/gesture detection component(s). In other embodiments, motion/gesture detection component(s) 551 may be implemented as a separate subsystem of the gaming system which is not associated with any one specific gaming system or device.

Figure 14:
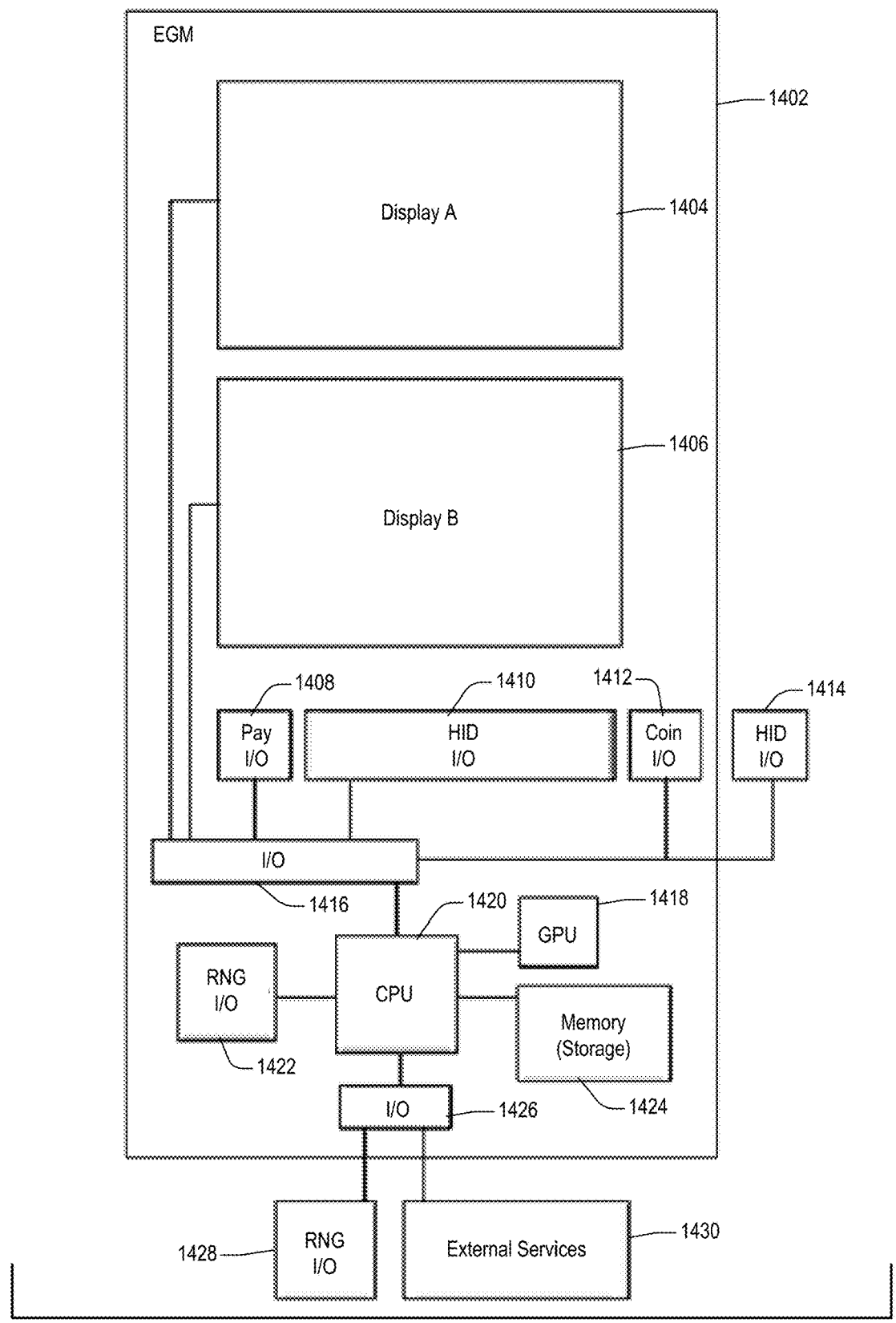
FIG. 14 shows a block diagram of electronic gaming machine (e.g., EGM), in accordance with a specific embodiment.

FIG. 14 shows an example block diagram of an alternate embodiment of an electronic gaming machine which may be configured or designed to implement one or more of the skill-based, wager-based gaming aspects described herein. As illustrated in the example embodiment of FIG. 14, the electronic gaming machine 1400 may include, but are not limited to, one or more of the following component(s) (or combinations thereof):

One or more display(s) (1404, 1406).
HID I/O component(s) (1410, 1414).
Payout I/O component(s) (1408).
Cash/Credit/Coin I/O c component(s) (1412).
CPUs/Processor(s)/Gaming Controller(s) (1420).
Memory (1424).
One or more Graphics Processor(s) (GPU) (1418).
RNG I/O component(s) (1422, 1428).
Other I/O component(s) (1416, 1426).
Interface(s) to one or more External Services (1430).

FIG. 6 is a simplified block diagram of an exemplary mobile gaming device 600 in accordance with a specific embodiment. In at least one embodiment, one or more players may participate in a wager-based, arcade-style video game session using mobile gaming devices. In at least some embodiments, the mobile gaming device may be configured or designed to include or provide functionality which is similar to that of an electronic gaming device (e.g., EGD) such as that described, for example, in FIG. 4.

As illustrated in the example of FIG. 6, mobile gaming device 600 may include a variety of components, modules and/or systems for providing various functionality. For example, as illustrated in FIG. 6, mobile gaming device 600 may include Mobile Device Application components (e.g., 660), which, for example, may include, but are not limited to, one or more of the following (e.g., or combinations thereof):

UI Components 662 such as those illustrated, described, and/or referenced herein.
Database Components 664 such as those illustrated, described, and/or referenced herein.
Processing Components 666 such as those illustrated, described, and/or referenced herein.
Other Components 668 which, for example, may include components for facilitating and/or enabling the mobile gaming device to perform and/or initiate various types of operations, activities, functions such as those described herein.

In at least one embodiment, the mobile gaming device may include Mobile Device App Component(s) which have been configured or designed to provide functionality for enabling or implementing at least a portion of the various skill-based, wager-based game techniques at the mobile gaming device.

According to specific embodiments, various aspects, features, and/or functionalities of the mobile gaming device may be performed, implemented and/or initiated by one or more of the following types of systems, components, systems, devices, procedures, processes, etc. (e.g., or combinations thereof):

Processor(s) 610
Device Drivers 642
Memory 616
Interface(s) 606
Power Source(s)/Distribution 643
Geolocation module 646
Display(s) 635
I/O Devices 630
Audio/Video devices(s) 639
Peripheral Devices 631
Motion Detection module 640
User Identification/Authentication module 647
Client App Component(s) 660
Other Component(s) 668
UI Component(s) 662
Database Component(s) 664
Processing Component(s) 666
Software/Hardware Authentication/Validation 644
Wireless communication module(s) 645
Information Filtering module(s) 649
Operating mode selection component 648
Speech Processing module 654
Scanner/Camera 652
OCR Processing Engine 656
etc.

Figure 7:
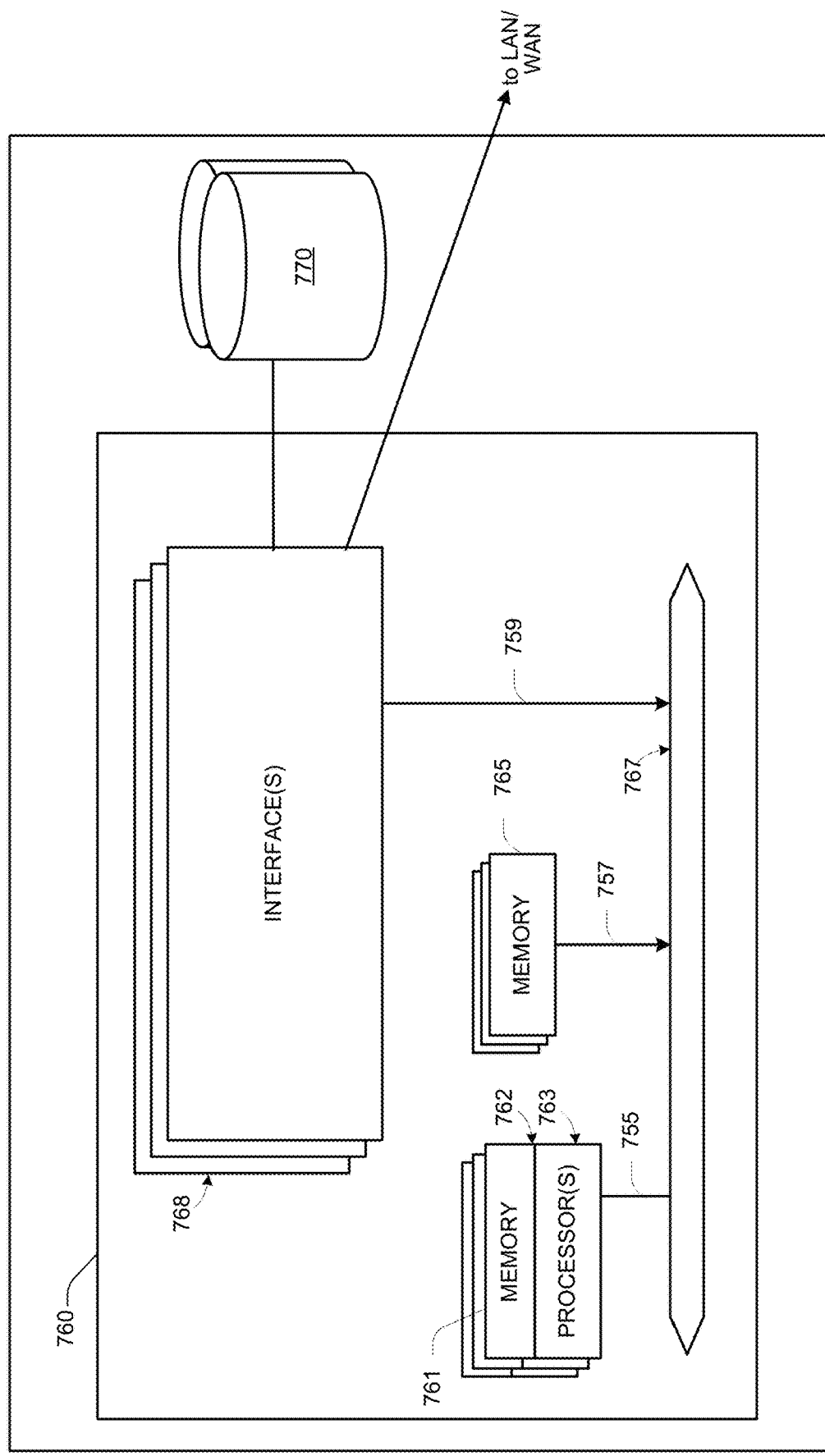
FIG. 7 illustrates an example embodiment of a System Server 780 which may be used for implementing various aspects/features described herein.

FIG. 7 illustrates an example embodiment of a system server 780 which may be used for implementing various aspects/features described herein. In at least one embodiment, the system server 780 includes at least one network device 760, and at least one storage device 770 (e.g., such as, for example, a direct attached storage device). In one embodiment, system server 780 may be suitable for implementing at least some of the skill-based, wager-based game techniques described herein.

In according to one embodiment, network device 760 may include a master central processing unit (e.g., CPU) 762, interfaces 768, and a bus 767 (e.g., a PCI bus). When acting under the control of appropriate software or firmware, the CPU 762 may be responsible for implementing specific functions associated with the functions of a desired network device. For example, when configured as a server, the CPU 762 may be responsible for analyzing packets; encapsulating packets; forwarding packets to appropriate network devices; instantiating various types of virtual machines, virtual interfaces, virtual storage volumes, virtual appliances; etc. The CPU 762 preferably accomplishes at least a portion of these functions under the control of software including an operating system (e.g., Linux), and any appropriate system software (e.g., such as, for example, AppLogic (e.g., ™) software).

CPU 762 may include one or more processors 763 such as, for example, one or more processors from the AMD, Motorola, Intel and/or MIPS families of microprocessors. In an alternative embodiment, processor 763 may be specially designed hardware for controlling the operations of system server 780. In a specific embodiment, a memory 761 (e.g., such as non-volatile RAM and/or ROM) also forms part of CPU 762. However, there may be many different ways in which memory could be coupled to the system. Memory block 761 may be used for a variety of purposes such as, for example, caching and/or storing data, programming instructions, etc.

The interfaces 768 may be typically provided as interface cards (e.g., sometimes referred to as "line cards"). Alternatively, one or more of the interfaces 768 may be provided as on-board interface controllers built into the system motherboard. Generally, they control the sending and receiving of data packets over the network and sometimes support other peripherals used with the system server 780. Among the interfaces that may be provided may be FC interfaces, Ethernet interfaces, frame relay interfaces, cable interfaces, DSL interfaces, token ring interfaces, Infiniband interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like. Other interfaces may include one or more wireless interfaces such as, for example, 802.11 (e.g., WiFi) interfaces, 802.15 interfaces (e.g., including Bluetooth™) 802.16 (e.g., WiMax) interfaces, 802.22 interfaces, Cellular standards such as CDMA interfaces, CDMA2000 interfaces, WCDMA interfaces, TDMA interfaces, Cellular 3G interfaces, etc.

Generally, one or more interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 762 to efficiently perform routing computations, network diagnostics, security functions, etc.

In at least one embodiment, some interfaces may be configured or designed to allow the system server 780 to communicate with other network devices associated with various local area network (e.g., LANs) and/or wide area networks (e.g., WANs). Other interfaces may be configured or designed to allow network device 760 to communicate with one or more direct attached storage device(s) 770.

Although the system shown in FIG. 7 illustrates one specific network device described herein, it is by no means the only network device architecture on which one or more embodiments can be implemented. For example, an architecture having a single processor that handles communications as well as routing computations, etc. may be used. Further, other types of interfaces and media could also be used with the network device.

Regardless of network device's configuration, it may employ one or more memories or memory modules (e.g., such as, for example, memory block 765, which, for example, may include random access memory (e.g., RAM)) configured to store data, program instructions for the general-purpose network operations and/or other information relating to the functionality of the various skill-based, wager-based game techniques described herein. The program instructions may control the operation of an operating system and/or one or more applications, for example. The memory or memories may also be configured to store data structures, and/or other specific non-program information described herein.

Because such information and program instructions may be employed to implement the systems/methods described herein, one or more embodiments relates to machine readable media that include program instructions, state information, etc. for performing various operations described herein. Examples of machine-readable storage media include, but are not limited to, magnetic media such as hard disks, floppy disks, and magnetic tape; optical media such as CD-ROM disks; magneto-optical media such as floptical disks; and hardware devices that may be specially configured to store and perform program instructions, such as read-only memory devices (e.g., ROM) and random access memory (e.g., RAM). Some embodiments may also be embodied in transmission media such as, for example, a carrier wave travelling over an appropriate medium such as airwaves, optical lines, electric lines, etc. Examples of program instructions include both machine code, such as produced by a compiler, and files containing higher level code that may be executed by the computer using an interpreter.

Figure 8:
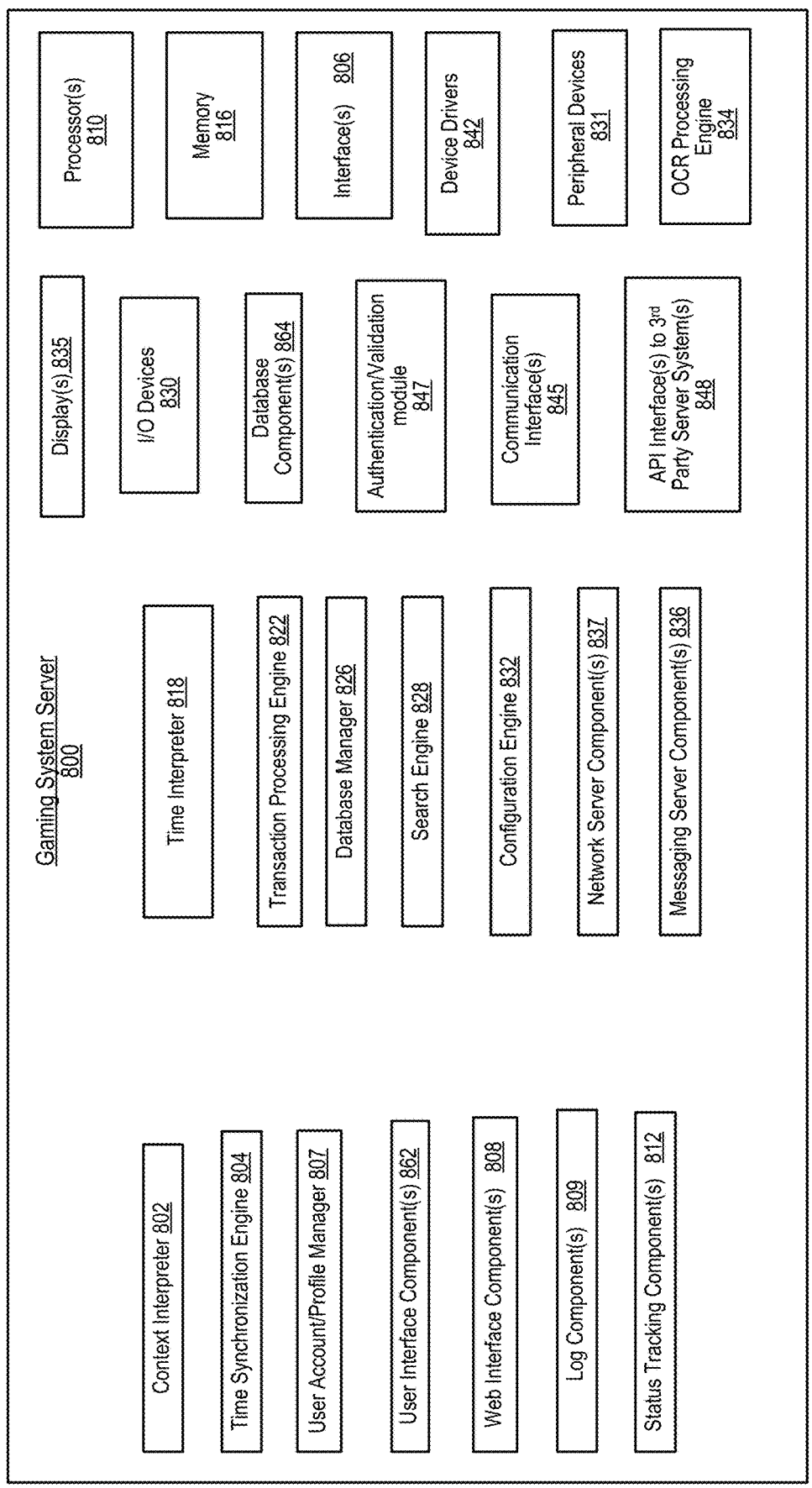
FIG. 8 illustrates an example of a functional block diagram of a gaming system server in accordance with a specific embodiment.

FIG. 8 illustrates an example of a functional block diagram of a gaming system server in accordance with a specific embodiment. In at least one embodiment, the Virtual Live electronic gaming device System Server may be operable to perform and/or implement various types of functions, operations, actions, and/or other features, such as, for example, one or more of those described and/or referenced herein.

In at least one embodiment, the gaming system server may include a plurality of components operable to perform and/or implement various types of functions, operations, actions, and/or other features such as, for example, one or more of the following (e.g., or combinations thereof):

Context Interpreter (e.g., 802) which, for example, may be operable to automatically and/or dynamically analyze contextual criteria relating to a detected set of event(s) and/or condition(s), and automatically determine or identify one or more contextually appropriate response(s) based on the contextual interpretation of the detected event(s)/condition(s). According to different embodiments, examples of contextual criteria which may be analyzed may include, but are not limited to, one or more of the following (e.g., or combinations thereof):
location-based criteria (e.g., geolocation of mobile gaming device, geolocation of EGD, etc.)
time-based criteria
identity of user(s)
user profile information
transaction history information
recent user activities
etc.
Time Synchronization Engine (e.g., 804) which, for example, may be operable to manage universal time synchronization (e.g., via NTP and/or GPS)
Search Engine (e.g., 828) which, for example, may be operable to search for transactions, logs, game history information, player information, skill-based, wager-based game information, etc., which may be accessed from one or more local and/or remote databases.
Configuration Engine (e.g., 832) which, for example, may be operable to determine and handle configuration of various customized configuration parameters for one or more devices, component(s), system(s), process(es), etc.
Time Interpreter (e.g., 818) which, for example, may be operable to automatically and/or dynamically modify or change identifier activation and expiration time(s) based on various criteria such as, for example, time, location, transaction status, etc.
Authentication/Validation Component(s) (e.g., 847) (e.g., password, software/hardware info, SSL certificates) which, for example, may be operable to perform various types of authentication/validation tasks such as one or more of those described and/or referenced herein.

Transaction Processing Engine (e.g., 822) which, for example, may be operable to handle various types of transaction processing tasks such as, for example, one or more of those described and/or referenced herein.

OCR Processing Engine (e.g., 834) which, for example, may be operable to perform image processing and optical character recognition of images such as those captured by a gaming device camera, for example.

Database Manager (e.g., 826) which, for example, may be operable to handle various types of tasks relating to database updating, database management, database access, etc. In at least one embodiment, the Database Manager may be operable to manage game history databases, player tracking databases, etc.

Log Component(s) (e.g., 809) which, for example, may be operable to generate and manage transactions history logs, system errors, connections from APIs, etc.

Status Tracking Component(s) (e.g., 812) which, for example, may be operable to automatically and/or dynamically determine, assign, and/or report updated transaction status information based, for example, on the state of the transaction.

Gateway Component(s) which, for example, may be operable to facilitate and manage communications and transactions with external Payment Gateways.

Web Interface Component(s) (e.g., 808) which, for example, may be operable to facilitate and manage communications and transactions with virtual live electronic gaming device web portal(s).

API Interface(s) to gaming system server(s), which, for example, may be operable to facilitate and manage communications and transactions with API Interface(s) to gaming system server(s)

API Interface(s) to 3rd Party System Server(s) (e.g., 848) which, for example, may be operable to facilitate and manage communications and transactions with API Interface(s) to 3rd Party System Server(s)

At least one processor 810. In at least one embodiment, the processor(s) 810 may include one or more commonly known CPUs which are deployed in many of today's consumer electronic devices, such as, for example, CPUs or processors from the Motorola or Intel family of microprocessors, etc. In an alternative embodiment, at least one processor may be specially designed hardware for controlling the operations of a gaming system. In a specific embodiment, a memory (e.g., such as non-volatile RAM and/or ROM) also forms part of CPU. When acting under the control of appropriate software or firmware, the CPU may be responsible for implementing specific functions associated with the functions of a desired network device. The CPU preferably accomplishes all these functions under the control of software including an operating system, and any appropriate applications software.

Memory 816, which, for example, may include volatile memory (e.g., RAM), non-volatile memory (e.g., disk memory, FLASH memory, EPROMs, etc.), unalterable memory, and/or other types of memory. In at least one implementation, the memory 816 may include functionality similar to at least a portion of functionality implemented by one or more commonly known memory devices such as those described herein and/or generally known to one having ordinary skill in the art. According to different embodiments, one or more memories or memory modules (e.g., memory blocks) may be configured or designed to store data, program instructions for the functional operations of the mobile gaming system and/or other information relating to the functionality of the various Mobile Transaction techniques described herein. The program instructions may control the operation of an operating system and/or one or more applications, for example. The memory or memories may also be configured to store data structures, metadata, identifier information/images, and/or information/data relating to other features/functions described herein.

Interface(s) 806 which, for example, may include wired interfaces and/or wireless interfaces. In at least one implementation, the interface(s) 806 may include functionality similar to at least a portion of functionality implemented by one or more computer system interfaces such as those described herein and/or generally known to one having ordinary skill in the art.

Device driver(s) 842. In at least one implementation, the device driver(s) 842 may include functionality similar to at least a portion of functionality implemented by one or more computer system driver devices such as those described herein and/or generally known to one having ordinary skill in the art.

One or more display(s) 835.

Messaging Server Component(s) 836, which, for example, may be configured or designed to provide various functions and operations relating to messaging activities and communications.

Network Server Component(s) 837, which, for example, may be configured or designed to provide various functions and operations relating to network server activities and communications.

User Account/Profile Manager component(s) 807.

Etc.

Figure 9:
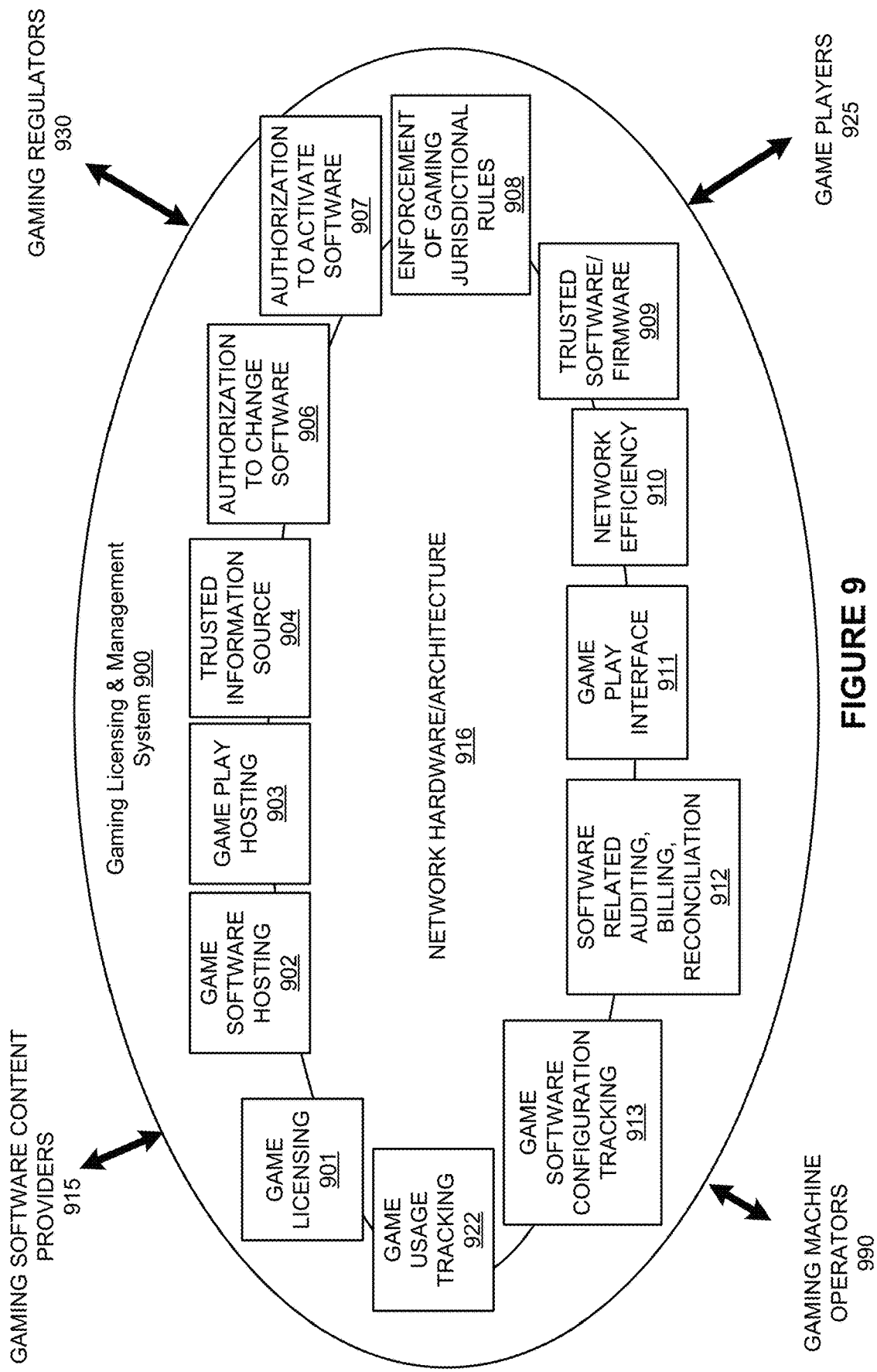
FIG. 9 shows a block diagram illustrating components of a gaming system 900 which may be used for implementing various aspects of example embodiments.

FIG. 9 shows a block diagram illustrating components of a gaming system 900 which may be used for implementing various aspects of example embodiments. In FIG. 9, the components of a gaming system 900 for providing game software licensing and downloads are described functionally. The described functions may be instantiated in hardware, firmware and/or software and executed on a suitable device. In the system 900, there may be many instances of the same function, such as multiple game play interfaces 911. Nevertheless, in FIG. 9, only one instance of each function is shown. The functions of the components may be combined. For example, a single device may comprise the game play interface 911 and include trusted memory devices or sources 909.

The gaming system 900 may receive inputs from different groups/entities and output various services and or information to these groups/entities. For example, game players 925 primarily input cash or indicia of credit into the system, make game selections that trigger software downloads, and receive entertainment in exchange for their inputs. game software content providers provide game software for the system and may receive compensation for the content they provide based on licensing agreements with the gaming machine operators. gaming machine operators select game software for distribution, distribute the game software on the gaming devices in the system 900, receive revenue for the use of their software and compensate the gaming machine operators. The gaming regulators 930 may provide rules and regulations that must be applied to the gaming system and may receive reports and other information confirming that rules are being obeyed.

In the following paragraphs, details of each component and some of the interactions between the components are described with respect to FIG. 9. The game software license host 901 may be a server connected to a number of remote gaming devices that provides licensing services to the remote gaming devices. For example, in other embodiments, the license host 901 may 1) receive token requests for tokens used to activate software executed on the remote gaming devices, 9) send tokens to the remote gaming devices, 3) track token usage and 4) grant and/or renew software licenses for software executed on the remote gaming devices. The token usage may be used in utility based licensing schemes, such as a pay-per-use scheme.

In another embodiment, a game usage-tracking host 922 may track the usage of game software on a plurality of devices in communication with the host. The game usage-tracking host 922 may be in communication with a plurality of game play hosts and gaming machines. From the game play hosts and gaming machines, the game usage tracking host 922 may receive updates of an amount that each game available for play on the devices may be played and on amount that may be wagered per game. This information may be stored in a database and used for billing according to methods described in a utility based licensing agreement.

The game software host 902 may provide game software downloads, such as downloads of game software or game firmware, to various devious in the game system 900. For example, when the software to generate the game is not available on the game play interface 911, the game software host 902 may download software to generate a selected game of chance played on the game play interface. Further, the game software host 902 may download new game content to a plurality of gaming machines via a request from a gaming machine operator.

In one embodiment, the game software host 902 may also be a game software configuration-tracking host 913. The function of the game software configuration-tracking host is to keep records of software configurations and/or hardware configurations for a plurality of devices in communication with the host (e.g., denominations, number of paylines, paytables, max/min wagers). Details of a game software host and a game software configuration host that may be used with example embodiments are described in U.S. Pat. No. 6,645,077, by Rowe, titled, "Gaming Terminal Data Repository and Information System," filed Dec. 91, 9000, which is incorporated herein in its entirety and for all purposes.

A game play host device 903 may be a host server connected to a plurality of remote clients that generates games of chance that are displayed on a plurality of remote game play interfaces 911. For example, the game play host device 903 may be a server that provides central determination for a bingo game play played on a plurality of connected game play interfaces 911. As another example, the game play host device 903 may generate games of chance, such as slot games or video card games, for display on a remote client. A game player using the remote client may be able to select from a number of games that are provided on the client by the host device 903. The game play host device 903 may receive game software management services, such as receiving downloads of new game software, from the game software host 902 and may receive game software licensing services, such as the granting or renewing of software licenses for software executed on the device 903, from the game license host 901.

In particular embodiments, the game play interfaces or other gaming devices in the gaming system 900 may be portable devices, such as electronic tokens, cell phones, smart cards, tablet PC's and PDA's. The portable devices may support wireless communications and thus, may be referred to as wireless mobile devices. The network hardware architecture 916 may be enabled to support communications between wireless mobile devices and other gaming devices in gaming system. In one embodiment, the wireless mobile devices may be used to play games of chance.

The gaming system 900 may use a number of trusted information sources. Trusted information sources 904 may be devices, such as servers, that provide information used to authenticate/activate other pieces of information. CRC values used to authenticate software, license tokens used to allow the use of software or product activation codes used to activate software are examples of trusted information that might be provided from a trusted information source 904. Trusted information sources may be a memory device, such as an EPROM, that includes trusted information used to authenticate other information. For example, a game play interface 911 may store a private encryption key in a trusted memory device that is used in a private key-public key encryption scheme to authenticate information from another gaming device.

When a trusted information source 904 is in communication with a remote device via a network, the remote device will employ a verification scheme to verify the identity of the trusted information source. For example, the trusted information source and the remote device may exchange information using public and private encryption keys to verify each other's identities. In another example of an embodiment, the remote device and the trusted information source may engage in methods using zero knowledge proofs to authenticate each of their respective identities. Details of zero knowledge proofs that may be used with example embodiments are described in US publication no. 9003/0203756, by Jackson, filed on Apr. 95, 9002 and titled, "Authentication in a Secure Computerized gaming system, which is incorporated herein in its entirety and for all purposes.

gaming devices storing trusted information might utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering may be detected.

The gaming system 900 of example embodiments may include devices 906 that provide authorization to download software from a first device to a second device and devices 907 that provide activation codes or information that allow downloaded software to be activated. The devices, 906 and 907, may be remote servers and may also be trusted information sources. One example of a method of providing product activation codes that may be used with example embodiments is describes in previously incorporated U.S. Pat. No. 6,264,561.

A device 906 that monitors a plurality of gaming devices to determine adherence of the devices to gaming jurisdictional rules 908 may be included in the system 900. In one embodiment, a gaming jurisdictional rule server may scan software and the configurations of the software on a number of gaming devices in communication with the gaming rule server to determine whether the software on the gaming devices is valid for use in the gaming jurisdiction where the gaming device is located. For example, the gaming rule server may request a digital signature, such as CRC's, of particular software components and compare them with an approved digital signature value stored on the gaming jurisdictional rule server.

Further, the gaming jurisdictional rule server may scan the remote gaming device to determine whether the software is configured in a manner that is acceptable to the gaming jurisdiction where the gaming device is located. For example, a maximum wager limit may vary from jurisdiction to jurisdiction and the rule enforcement server may scan a gaming device to determine its current software configuration and its location and then compare the configuration on the gaming device with approved parameters for its location.

A gaming jurisdiction may include rules that describe how game software may be downloaded and licensed. The gaming jurisdictional rule server may scan download transaction records and licensing records on a gaming device to determine whether the download and licensing was carried out in a manner that is acceptable to the gaming jurisdiction in which the gaming device is located. In general, the game jurisdictional rule server may be utilized to confirm compliance to any gaming rules passed by a gaming jurisdiction when the information needed to determine rule compliance is remotely accessible to the server.

Game software, firmware or hardware residing a particular gaming device may also be used to check for compliance with local gaming jurisdictional rules. In one embodiment, when a gaming device is installed in a particular gaming jurisdiction, a software program including jurisdiction rule information may be downloaded to a secure memory location on a gaming machine or the jurisdiction rule information may be downloaded as data and utilized by a program on the gaming machine. The software program and/or jurisdiction rule information may check the gaming device software and software configurations for compliance with local gaming jurisdictional rules. In another embodiment, the software program for ensuring compliance and jurisdictional information may be installed in the gaming machine prior to its shipping, such as at the factory where the gaming machine is manufactured.

The gaming devices in game system 900 may utilize trusted software and/or trusted firmware. Trusted firmware/software is trusted in the sense that is used with the assumption that it has not been tampered with. For instance, trusted software/firmware may be used to authenticate other game software or processes executing on a gaming device. As an example, trusted encryption programs and authentication programs may be stored on an EPROM on the gaming machine or encoded into a specialized encryption chip. As another example, trusted game software, e.g., game software approved for use on gaming devices by a local gaming jurisdiction may be required on gaming devices on the gaming machine.

In example embodiments, the devices may be connected by a network 916 with different types of hardware using different hardware architectures. game software can be quite large and frequent downloads can place a significant burden on a network, which may slow information transfer speeds on the network. For game-on-demand services that require frequent downloads of game software in a network, efficient downloading is essential for the service to viable. Thus, in example embodiments, network efficient devices 910 may be used to actively monitor and maintain network efficiency. For instance, software locators may be used to locate nearby locations of game software for peer-to-peer transfers of game software. In another example, network traffic may be monitored and downloads may be actively rerouted to maintain network efficiency.

One or more devices in example embodiments may provide game software and game licensing related auditing, billing and reconciliation reports to server 912. For example, a software licensing billing server may generate a bill for a gaming device operator based upon a usage of games over a time period on the gaming devices owned by the operator. In another example, a software auditing server may provide reports on game software downloads to various gaming devices in the gaming system 900 and current configurations of the game software on these gaming devices.

At particular time intervals, the software auditing server 912 may also request software configurations from a number of gaming devices in the gaming system. The server may then reconcile the software configuration on each gaming device. In one embodiment, the software auditing server 912 may store a record of software configurations on each gaming device at particular times and a record of software download transactions that have occurred on the device. By applying each of the recorded game software download transactions since a selected time to the software configuration recorded at the selected time, a software configuration is obtained. The software auditing server may compare the software configuration derived from applying these transactions on a gaming device with a current software configuration obtained from the gaming device. After the comparison, the software-auditing server may generate a reconciliation report that confirms that the download transaction records are consistent with the current software configuration on the device. The report may also identify any inconsistencies. In another embodiment, both the gaming device and the software auditing server may store a record of the download transactions that have occurred on the gaming device and the software auditing server may reconcile these records.

There are many possible interactions between the components described with respect to FIG. 9. Many of the interactions are coupled. For example, methods used for game licensing may affect methods used for game downloading and vice versa. For the purposes of explanation, details of a few possible interactions between the components of the system 900 relating to software licensing and software downloads have been described. The descriptions are selected to illustrate particular interactions in the game system 900. These descriptions are provided for the purposes of explanation only and are not intended to limit the scope of example embodiments described herein.

Predetermined RNG Outcome Batch Retrieval Functionality

According to different embodiments, RNG I/O component(s) (e.g., 1422, 1428, FIG. 14) may include Class 3-type RNG I/O component(s) and/or Class 2-type RNG I/O component(s). In the event of a wager-based triggering event (e.g., initiated via player HID), a series of calls/checks may be automatically performed by the EGM to access at least one local and/or remote RNG server/service, such as, for example, one or more of the following (or combinations thereof):

Local Casino Class 2 RNG System(s)/Service(s) (e.g., 124, FIG. 1);
Local Casino Class 3 RNG System(s)/Service(s) (e.g., 126, FIG. 1);
Remote Class 2 RNG System(s)/Service(s) (e.g., 194, FIG. 1);
Remote Class 3 RNG System(s)/Service(s) (e.g., 196, FIG. 1);

Etc.

In some embodiments, individual NPC spawning events may each trigger a respective predetermined RNG outcome retrieval event, and each retrieved predetermined RNG outcome value may be stored (e.g., in encrypted form) in EGM memory and associated with its respective, spawned NPC.

Alternatively, in at least some other embodiments, a HAWG-based EGM may be configured or designed to automatically and/or dynamically access or retrieve one or more "batches" or "pools" of predetermined RNG outcomes from one or more local and/or remote RNG server(s)/service(s), which, in turn, enables more intense gambling intervals to occur at the skill-based, wager-based game without "stressing" the system and/or without causing the occurrence of "lag" (e.g., delay and/or a drop in frames per second) in game play and/or wager-based gaming events.

Because the occurrence of lag is undesirable in wager-based gaming, it has heretofore been desirable to configure or design wager-based games in a manner which avoids or minimizes the introduction of lag in wager-based game play. For example, since communication latency is one factor which may significantly contribute to the introduction of lag in wager-based game play, it is generally desirable to configure or design wager-based games in a manner which avoids or minimizes the need for the wager-based game to remotely communicate with external systems/services to retrieve game event outcome data and/or wager event outcome data. Accordingly, conventional wisdom suggests that it may be preferable for the design of RNG wager-based games (e.g., such as video slot games, etc.) to include a local RNG Engine to provide localized access to wager event outcome data/results, so as to avoid the need for the wager-based game to remotely communicate with external systems/services to retrieve the wager event outcome data/results. Such traditional wager-based game design techniques have, in the past, proved to be sufficiently adequate with respect to minimizing the occurrence of lag in electronic wager-based games (such as, for example, video slot games, video poker games, etc.).

However, with the introduction of next-generation wager-based games such as, for example, the various skill-based, wager-based game types described herein, there is an increased risk of lag occurring during non-wager based gameplay and/or wager-based gameplay. Occurrences of such lag may be attributable to a number of different factors, including, for example, the "stressing" of local system resources, communication latency, etc. For example, during game play, multiple calls, checks, interactions, NPC spawning, and/or other activities may all occur within the same few milliseconds, causing the gaming system resources to be "stressed", and resulting in lag. Similarly, in wager-based games where multiple wager-based game events may occur within a relatively short time frame (e.g., substantially simultaneously, within several milliseconds, etc.) lag may occur as a result of the RNG Engine being unable to generate real-time RNG outcomes fast enough. Another factor which may also contribute to lag is communication latency, which, for example, may be caused by delays in communicating with remote devices/servers.

In order to minimize the occurrence of lag in skill-based, wager-based games, it is preferable to consider and develop new/novel wager-based game design techniques which are capable of supporting real-time play of such skill-based, wager-based games in a manner which does not result in the gaming system resources being overly "stressed". One such design technique, as discussed previously, is to configure or design a skill-based, wager-based game to automatically and/or dynamically access or retrieve, before the triggering of one or more future wager-based game events, one or more "batches" or "pools" of predetermined RNG outcomes from local and/or remote RNG server(s)/service(s). Such a technique enables more intense gambling intervals to occur at the skill-based, wager-based game without "stressing" the system and/or without causing the occurrence of "lag" (e.g., delay and/or a drop in frames per second) in game play and/or wager-based gaming events.

In at least one embodiment, a HAWG-based EGM may be configured or designed to automatically and/or dynamically access or retrieve one or more "batches" or "pools" of predetermined RNG outcomes from one or more local and/or remote RNG server(s)/service(s), which, in turn, enables more intense gambling intervals to occur at the skill-based, wager-based game without "stressing" the system and/or without causing the occurrence of "lag" (e.g., delay and/or a drop in frames per second) in game play and/or wager-based gaming events.

For example, in at least one embodiment, a skill-based, wager-based game (and/or EGM on which the HAWG game is hosted) may be configured or designed to automatically and/or dynamically retrieve or "grab" predetermined RNG outcomes (and/or other data) from remote RNG server(s)/service(s) (and/or other remote systems/services) prior to extreme HAWG gameplay intervals, which may then allow the system to handle all current and future operations (e.g., including during extreme HAWG gameplay intervals) while avoiding the possibility of lag interfering with real-time gameplay and/or real-time wager-based events. Further, in at least one embodiment, at least a portion of the retrieved data may be encrypted (e.g., during communication and/or while stored in memory) in a manner which conforms with desired or imposed security regulations/standards.

For example, referring to the example the Zombie shooter HAWG game described previously, the portions of gameplay which correspond to automated rail movement of the player's character may be identified as preferable times (e.g., of non-extreme game play) for automatically and/or dynamically initiating the retrieving of one or more "batches" or "pools" of predetermined RNG outcomes.

By way of illustration, in one example embodiment of a Zombie shooter HAWG game, it may be assumed that a specific game-level area may include a total of 20 newly spawned NPCs. The skill-based, wager-based game may cause the EGM to automatically and/or dynamically retrieve one or more "batches" or "pools" of predetermined RNG outcomes (e.g., totaling 20 predetermined RNG outcomes) from one or more local and/or remote RNG server(s)/service(s). According to different embodiments:

- At least one "batch retrieval" of predetermined RNG outcomes may be called before gameplay setup.
- At least one "batch retrieval" of predetermined RNG outcomes may be called after gameplay setup.
- At least one "batch retrieval" of predetermined RNG outcomes may be called before wager placement.
- At least one "batch retrieval" of predetermined RNG outcomes may be called after wager placement, yet before wager-based game event occurs.
- At least one "batch retrieval" of predetermined RNG outcomes may be called before the spawning of the NPCs.
- At least one "batch retrieval" of predetermined RNG outcomes may be called after the spawning of the NPCs, but before enabling the player to proceed with gameplay at the specific game-level area.

Etc.

In at least one embodiment, the 20 retrieved predetermined RNG outcomes may be stored in encrypted form in local EGM memory. According to different embodiments, each (or selected ones) of the retrieved predetermined RNG outcomes may be randomly assigned to (or randomly associated with) a respectively different NPC (thereby effecting double randomization). Alternatively, in at least some embodiments, each (or selected ones) of the retrieved predetermined RNG outcomes may be sequentially assigned to (or associated with) a respectively different NPC.

According to different embodiments, the "batch retrieval" of predetermined RNG outcomes may apply to both Class 2 type skill-based, wager-based games and/or Class 3 type skill-based, wager-based games.

In at least one embodiment, the RNG server(s)/service(s) may be configured or designed to record or log the predetermined RNG outcomes which are retrieved by each requesting entity. Such records may subsequently be used for auditing purposes (e.g., to ensure that the wager-based game event outcomes at the EGM match the predetermined RNG outcomes provided by the RNG server(s)/service(s)) and for detecting and preventing cheating/fraud.

Further, according to some embodiments, different techniques may be employed for handling "unused" predetermined RNG outcomes which may occur, for example, when a player stops playing (or stops participating in) a skill-based, wager-based game. For example, in one embodiment, when a player chooses to disengage from participating in the Zombie shooter HAWG game, any "unused" predetermined RNG outcomes (e.g., associated with NPCs which have not yet been destroyed) may be automatically and dynamically discarded/deleted.

In at least some embodiments, "unused" predetermined RNG outcomes may also occur during gameplay, such as, for example, when a player finishes a level of a Zombie shooter HAWG game without destroying all Zombies on that particular level. Accordingly, in at least some embodiments, the EGM may be configured or designed to periodically and automatically identify and delete selected "unused" predetermined RNG outcomes which are associated with "obsolete" wager-based triggering events (e.g., wager-based triggering events which no longer have any possibility of being initiated in the currently active gaming session). For example, if it is assumed that a player completes (or exits) a level of a Zombie shooter HAWG game, and leaves 3 spawned, non-destroyed Zombies on that level, the EGM may be configured or designed to automatically identify and discard the "unused" predetermined RNG outcomes which are associated with the 3 spawned, non-destroyed Zombies.

In at least some embodiments, it is preferable to treat the predetermined RNG outcomes as highly confidential data. Accordingly, appropriate security measures should preferably be employed with respect to the generation, transmission and storage of the predetermined RNG outcome data. Examples of such security measures may include, but are not limited to, one or more of the following (or combinations thereof):

Encryption of the predetermined RNG outcome data during transmission.

Encryption of the predetermined RNG outcome data in memory storage.

Assigning respective expiration time limits to each of the predetermined RNG outcomes. In at least one embodiment, if an expiration time limit of a given predetermined RNG outcome may be exceeded (e.g., time limit expired), that specific predetermined RNG outcome may automatically be discarded by the system and is prevented from being used to determine a wager-based game event outcome. Examples of different expiration time limits may range from about 30 seconds to 60 minutes. In one preferred embodiment, an expiration time limit may be set to about 3 minutes.

And/or imposition of other jurisdiction/regulatory security methods to prevent cheating (e.g., similar to those currently employed at video slot machines and/or other wager-based gaming machines).

In at least one embodiment, the relatively high level of security measures implemented with respect to the generation, acquisition and storage of predetermined RNG outcomes may provide an added benefit of enabling at least a portion of the predetermined RNG outcomes to be retrieved (e.g., individually and/or in batches) from one or more remote RNG server(s)/service(s) (e.g., Class 2 RNG System(s)/Service(s) 194 and/or Class 3 RNG System(s)/Service(s) 196, FIG. 1). This, in turn, may help facilitate and/or enable online wager-based gaming using pre-determined RNG outcomes.

Additionally, according to different embodiments, the various predetermined RNG outcome techniques described herein may also be utilized in larger, more well-known online games for enabling wager-based triggering event functionality, and for enabling wager-based events to occur concurrently during standard (e.g., at home/mobile, non-wager based) gameplay.

It is noted that many of the example embodiments described herein are focused on HAWG designs, as well as other popular video game designs. However, the predetermined RNG outcome batch retrieval techniques described herein may also be applied to other types of games and gaming platforms, including, for example, one or more of the following (or combinations thereof):

Currently existing wager-based games (e.g., implemented at casino EGMs) such as, for example:
Video slot games.
Other types of wager-based video games such as, poker, bingo, keno, pachinko, dice, cards, wheel games, etc.
Wager-based games implemented on mobile devices.
Wager-based games implemented via the Internet or other gaming networks.
MMO games implemented via the Internet or other gaming networks.
Video console games such as, for example XBOX™, PlayStation™, Nintendo™, etc.
Cloud-based gaming system(s)/service(s).
Other types of video-based games/gaming systems which utilize RNG engines and include functionality for communicating via a secure/encrypted networks.

For example, in at least one embodiment, an online video slot game (or other styled game) may be configured or designed to include predetermined RNG outcome batch retrieval functionality. A player may access the online video slot game via the Internet, and fund the game in a manner similar to that of standard wager-based play (e.g., as implemented at casino EGMs). Thereafter, the predetermined RNG outcome batch retrieval process(es) may be called.

By way of illustration, in at least one embodiment, a wager-based video slot game which may be configured or designed to include predetermined RNG outcome batch retrieval functionality may perform one or more of the following activities (or combinations thereof):

According to different embodiments, the frequency of occurrence of wager events in the video slot game may vary greatly. Based on jurisdiction/regulations, one or more predetermined RNG outcome batch retrieval process(es) may be automatically initiated. In one embodiment, implementation of a predetermined RNG outcome batch retrieval call may result in the retrieval of ten (10) predetermined RNG outcomes per batch. According to different embodiments:

- At least one "batch retrieval" of predetermined RNG outcomes may be called before gameplay setup.
- At least one "batch retrieval" of predetermined RNG outcomes may be called after gameplay setup.
- At least one "batch retrieval" of predetermined RNG outcomes may be called before wager placement.
- At least one "batch retrieval" of predetermined RNG outcomes may be called after wager placement, yet before wager-based game event occurs.
- At least one "batch retrieval" of predetermined RNG outcomes may be called before the spawning of the NPCs.
- At least one "batch retrieval" of predetermined RNG outcomes may be called after the spawning of the NPCs, but before enabling the player to proceed with gameplay at the specific game-level area.
- Etc.

In at least one embodiment, all (or a selected portion of) retrieved predetermined RNG outcomes may be stored in encrypted form in local memory.

According to different embodiments, each (or selected ones) of the retrieved predetermined RNG outcomes may be randomly assigned to (or randomly associated with) a respectively different NPC (thereby effecting double randomization).

Alternatively, in at least some embodiments, each (or selected ones) of the retrieved predetermined RNG outcomes may be sequentially assigned to (or associated with) a respectively different NPC.

In some embodiments, the wager-based video slot game may be hosted at video slot game EGM remotely located at a casino property. In other embodiments, the wager-based video slot game may be implemented at a local gaming device in the possession of the player (such as, for example, a mobile gaming device, or a video slot game app running on the player's smartphone). In at least some embodiments, the wager-based game events occurring in the video slot game are based on predetermined RNG outcomes which are securely retrieved from authenticated and trusted remote RNG server(s)/service(s). In yet other embodiments, the wager-based video slot game may be hosted at a virtual casino or cloud-based gaming system such as, for example, Remote/Internet-based gaming Service(s) system 140.

As discussed above, in at least some embodiments, the each of the retrieved predetermined RNG outcomes has associated therewith a respective expiration time limit (or expiration time value). In at least one embodiment, if an expiration time limit of a given predetermined RNG outcome may be exceeded (e.g., time limit expired), that specific predetermined RNG outcome may automatically be discarded by the system and may be prevented from being used in determining a wager-based game event outcomes.

By way of illustration, in one example scenario involving a player playing a wager-based video slot game which may be configured or designed to include predetermined RNG outcome batch retrieval functionality, it is initially assumed that the video slot game executes a call to retrieve an initial batch of ten (10) predetermined RNG outcomes. In this example scenario, it is further assumed that the player decides to initiate three (3) "spins", and then elects to temporarily stop (or pause) playing the video slot game without exiting or ending the game (e.g., in order to allow the player to have a short break). In this example scenario, only three (3) of the retrieved predetermined RNG outcomes would have been used, while the remaining seven (7) retrieved predetermined RNG outcomes would still be "unused". Continuing with this example scenario, it is assumed that the length of the player's break exceeds the expiration time limits associated with each of the seven (7) "unused" predetermined RNG outcomes. Accordingly, the gaming system may respond by automatically discarding or invalidating the seven (7) "unused" predetermined RNG outcomes upon detecting that their respective expiration time limits have been exceeded. Additionally, the gaming system may automatically retrieve a new batch of seven (7) pre-determined RNG outcomes (e.g., from a remote, authenticated RNG system/service) after detecting that the user has resumed play of the video slot game.

It will be appreciated that the predetermined RNG outcome batch retrieval technique(s) described herein provide numerous benefits and advantages which may be leveraged to expand existing wager-based gaming markets (including, for example, home, mobile, casino, and cloud based markets), and to open up opportunities for new markets to develop in the wager-based gaming space. Further, the predetermined RNG outcome batch retrieval technique(s) described herein may also be leveraged to enable players to continue engaging in their favorite gambling games anywhere/anytime, and/or to embark on new types of wager-based games anywhere/anytime.

For example, various benefits and/or advantages of the predetermined RNG outcome batch retrieval technique(s) described herein may include, but are not limited to, one or more of the following (or combinations thereof):

- Secure/encrypted wager-based interactions.
- Prevents/hampers cheating.
- Stored predetermined RNG outcomes allow for more graphically intense gambling intervals, which may translate to (and/or facilitate):
  - More "butts in seats" (e.g., particularly with respect to players participating from the comfort of their own home);
  - Increased coin-in;
  - Improved relationships between patron, game, and property;
  - Improved or increased player satisfaction.

Additionally, because the wager-based game events are based on predetermined RNG outcomes which may be securely retrieved from authenticated and trusted remote RNG server(s)/service(s), the predetermined RNG outcome batch retrieval technique(s) described herein enable a secure way for players to engage in wager-based gameplay from their homes and/or from other non-casino locations. For example, in at least one embodiment, using the predetermined RNG outcome batch retrieval technique(s) described herein, a player may engage in wager-based game play at his or her favorite casino property, then leave the casino property, and then continue or resume their gaming experience from a different physical location (e.g., from the player's home via online access). In at least some embodiments, the player (or player's mobile gaming device) may continue to be "in touch" with the casino property (e.g., in the "network" sense rather than the "physical" sense). This may also tie into "clicks to bricks" programs/offers which may allow patrons to acquire club points in the comfort of their homes with on-site voucher/redemption (e.g., from casino, to home, back to casino, to home). This "revolving process" is something the gambling industry has heretofore been lacking. However, by using the predetermined RNG outcome batch retrieval technique(s) described herein, the patron's home and personal network device(s) are now accessible for secure wager-based gameplay.

Similarly, the predetermined RNG outcome batch retrieval technique(s) described herein enable a secure way for players to engage in cloud-based, wager-based gameplay. This feature may be particularly desirable for players who do not care for the casino establishment environment. By utilizing a cloud-based system and/or virtual casino environment, players may engage in (similar) wager-based gameplay without the worries of having to go to a casino. In some embodiments, a virtual or cloud-based casino system may be implemented via Remote/Internet-based gaming Service(s) system 190 of FIG. 1. According to different embodiments, some or all of the systems and processes that coincide with wager-based gameplay may be implemented within this virtual environment. A patron (e.g., player), when gaming on a "cloud only" system, may initiate wager-based events (e.g., as described previously), and the wager-based game may communicate (e.g., via secured/encrypted network communications) to the Remote/Internet-based gaming Service(s) system 190, which in turn may communicate back to the patron's device(s). Outgoing and incoming communications may be transmitted at the same time and/or in irregular patterns. Communications such as these are known as "asynchronous communications."

In at least some embodiments, additional security mechanisms may be utilized with respect to retrieved predetermined RNG outcomes from remote RNG servers/services. For example, it is preferable to secure the retrieved RNG information from server to client, and vice versa. Security may be supported in multiple forms, such as, for example, MD5, hash, unique identifiers, etc. All of which may perform or be verified via cross-checking and/or reporting with a host, in order to validate and/or verify determine the authenticity of such secured information and/or in order to authenticate the identity of the remote RNG servers/services. Such security mechanisms may be used to help prevent fraudulent activities, such as, for example, activities performed by individuals attempting to "hack" and "inject" their own RNG outcomes into the wager-based game system in order to manipulate the system.

In at least one embodiment, each retrieved predetermined RNG outcome may be configured or designed to include one or more unique identifier(s) which may be used to for security validation and/or authentication purposes. In some embodiments, specific authentications of the retrieved predetermined RNG outcomes may be required to be performed, for example, during the verification process(es) of batch RNG retrieval and/or before using any one of the predetermined RNG outcomes to determine wager-based game event outcomes. "Hacked" RNG outcomes which have been injected into the gaming system will not pass the security checks from the authentication system. For example, even though the RNG outcome itself may be in a "correct" format for the system internals, the "signature" will not match. In at least some embodiments, the unique identifier(s) associated with each of the predetermined RNG outcomes may be securely encrypted using an encryption algorithm, and the gaming device (which is hosting the wager-based game) may include automated functionality for authenticating the encrypted unique identifier associated with a given predetermined RNG outcome before using that predetermined RNG outcome for determining a wager-based game event outcome. In the event that tampering evidence is detected, the system may have cross-checks and/or calls that may immediately notify the proper personnel in order to seek appropriate measures.

Additional Benefits/Features/Embodiments

Different embodiments of the skill-based, wager-based gaming techniques described herein may be adapted and implemented in a variety of environments. For example, the skill-based, wager-based gaming techniques described herein are particularly well suited for deployment in any business establishments that house wager-based gaming devices (e.g., class 3 and/or class 2). Additionally, the skill-based, wager-based gaming techniques described herein may appeal to younger gamblers/gamers who enjoy playing arcade-style video games, middle aged gamblers/gamers who may have played some video games, and possibly even veteran gamblers who may be bored with existing wager-based video gaming technology.

The skill-based, wager-based gaming techniques described herein provide the ability for patrons of casinos and other gaming establishments to experience new and exciting ways of engaging in wager-based video game play with minimized learning curve and intimidation factors. Additionally, using the skill-based, wager-based gaming techniques described herein, casinos and other gaming establishments hosting such skill-based, wager-based gaming devices may increase their revenue by ensuring that the number of wager-based gaming event(s) occurring in a skill-based, wager-based game (e.g., during specified time period) meet minimum specified threshold criteria.

One of the benefits of the skill-based, wager-based gaming techniques described herein is that it provides the ability for traditional video-type wager-based games (such as those deployed at Casino establishments) to be quickly and easily converted to hybrid-type arcade/wager-based games in a manner which is already compliant with existing rules and regulations governing wager-based gaming, and/or in a manner which may avoid or significantly reduce requirements for additional regulatory approval. For example, in some embodiments, the skill-based, wager-based gaming system may include functionality for providing a new display method and interaction thereof for currently approved wager-based games and/or wager-based gaming machines such as, for example, video-style wager-based games/gaming machines which have already been approved (and/or deployed) for player use in one or more gaming jurisdictions.

It may be appreciated that currently existing gaming technology and associated gaming regulations do not allow for "mega title" arcade-type games (e.g., Call Of Duty, Assassin's Creed, etc.) to be directly implemented within gambling gameplay. One reason for this is that any new wager-based game must first obtain various gaming regulatory approvals before being allowed to be deployed in designated gaming jurisdictions. However, if one were to desire to implement a "Call Of Duty" (COD) skill-based, wager-based game, companies and developers (among other legal and regulatory bodies) may collaborate to create such product (e.g., supply source files and asset libraries, etc.) which may be assembled to conform to desired design/gameplay specifications (such as one or more of those described herein).

In at least some embodiments, it is not possible to simply install and run COD (or other "mega title" arcade-type games) on an existing gaming machine, and have it perform as a skill-based, wager-based game described herein. Some elements of gameplay may need to be altered in order to achieve and/or provide various skill-based, wager-based game (HAWG) functionalities. In some embodiments, the initial process to get a skill-based, wager-based game "on the floor" (e.g., deployed on a casino gaming floor) may take some time (e.g., 4-8 months, including, for example, an amount of time to build the skill-based, wager-based game). However, this timeframe may be significantly shorter than the timeframes typically required for getting traditional wager-based gaming machines deployed "on the floor". One reason for this is that the skill-based, wager-based game technology described herein provides the capability of seamless integration with pre-licensed products, such as, for example, IGT's Ghostbusters Video Slots. For example, in one embodiment, in a relatively short time period, a gaming machine manufacturer/distributor (such as IGT, Bally's, Aristocrat, etc.) could develop a skill-based, wager-based game version that capitalizes on the popularity of an existing licensed game-theme by providing a newer HAWG-type "gamer" version which incorporates a version of the existing licensed game-theme.

With respect to skill-based, wager-based gameplay, in at least some embodiments, HAWG may not require "points" to reach or obtain game levels. Rather, in some embodiments, HAWG allows freedom of play by allowing a player simply "continue on" by purely playing the game. This design allows for player defined gameplay progression.

In at least some embodiments, HAWG may provide a novel slot machine gaming/player interface which does not require the use of "new backend systems". For example, take IGT's "Big Buck Hunter" slot game, which has already obtained regulatory approval in many existing gaming jurisdictions. Using HAWG technology, IGT could build, or have built, a new themed game "Zombies" which could conform to HAWG design, load "Zombies" into the "Big Buck Hunter" EGM memory, and substitute the display of "Zombies" in place of the "Buck" characters (e.g., traditionally displayed in the Big Buck Hunter game). Upon doing so, certification labs such as GLI may have no issues in the approval process for the "Zombies" skill-based, wager-based game, since the functionality and mathematical algorithms driving both the Zombies skill-based, wager-based game and the Big Buck Hunter game have already been reviewed and approved.

In at least some embodiments, HAWG provides a conjoined and seamless entity wherein the act of wagering is based (at least partially) on the players physical ability to press a button and/or pull a trigger while "holding" a device (e.g., HID) and visually understanding the relationship/nature of the style/theme of game in which they are involved and the process(es) thereof needed to play said game.

For example, a standard slot machine may require a player to
  put money in machine;
  select wager;
  initiate wager (via HID);
  be informed of results; and
  repeat wager initiation if desired.
For some HAWG embodiments, the process may involve similar steps, plus one or more additional step(s) involving the player operating a HID in order to interact with (e.g., shoot, grab, touch, avoid, etc.) virtual objects displayed on EGM display screen.

In one embodiment, the only "skills" required are human motor skills (e.g., "fine motor skills") such as hand/eye coordination, to perform various arcade-type game activities such as, for example: point or navigate a reticle onto a NPC (e.g., zombie/alien), pull/press trigger/button, etc. In at least some embodiments, there are no "skillful requirements" needed for participating in a skill-based, wager-based game. Further, in various embodiments, no skill is needed or required for participating in the wager-based game event portion of the skill-based, wager-based game. In fact, in at least some embodiments, it is preferable the wager-based game event portion be implemented as a RNG-based game of chance. In this way, HAWG may be designed to be simple and fun without separation of entertainment and gambling.

Other benefits/features/advantages of the various skill-based, wager-based game embodiments described herein may include, but are not limited to, one or more of the following (or combinations thereof):

In some embodiments, the skill-based, wager-based game may be configured or designed to include functionality for enabling a player to specify a total maximum amount to be wagered during play of the skill-based, wager-based game. This allows the player more control over how much the player is willing to risk losing during play of the skill-based, wager-based game.

In some embodiments, the skill-based, wager-based gaming machine may distinguish between credits attributable to coin in, and credits attributable to wager-based game event payouts. For example, in some embodiments, the gaming machine may be configured or designed to maintain separate credit balances for: (i) credits funded by coin-in/ticket-in, and (ii) credits accumulated from wager-based game event payouts. In at least some embodiments, this helps facilitate the player's awareness of his or her total overall wager-based game event payouts during play of the skill-based, wager-based game. For example, in one embodiment, a player may deposit an initial amount of money (e.g., $10) into the gaming machine, and engage in skill-based, wager-based game play until the initial $10 is used up. In one embodiment, during play of the skill-based, wager-based game, any winnings/payouts awarded to the player (e.g., from wager-based game event outcomes) deposited and maintained in a separate "winnings" account (e.g., similar to the way physical coin winnings are dropped into the bottom cavity of a mechanical slot machine). At the end of the skill-based, wager-based game play (e.g., once the initial $10 is used up), the player may review the total value of the "winnings" account to determine how he/she did (e.g., is the player "up" overall, or "down" overall). In some embodiments, the player may optionally elect to have all (or a specified amount or percentage) of his/her "winnings" re-invested into the skill-based, wager-based game to fund additional wager-based game event(s).

In some HAWG embodiments, the outcome of a wager-based game event may be configured or designed to be dependent on HAWG's game state. In some embodiments, the design of gameplay may allow for additional events for both wager initiation and RNG outcome. For example, referring to the previously described Zombie shooter example, a player shoots a zombie in the head (headshot—which kills the zombie). The shot may be fired and upon the instant the zombie death animation begins, a wager triggering event is called which "spins" the slot reels. The slot reels may continue to spin until the zombie's epic death animation is complete, once so, another event is called which is the "RNG determination outcome" event. The outcome is then presented to the player through the backend system and displayed using HAWG's graphical user interface. One reason for the two events corresponding with a NPC destruction and the ending of a death animation is that it causes the wagered outcome event to dependent on HAWG's gamestate and may require two events to happen in order for a wagering outcome to be displayed.

In some embodiments, skill-based, wager-based games may be configured or designed in a manner which allows for a unique credit display setup wherein, while the player is interacting within a specific level, a clearly defined display of gameplay earnings is shown to the player and once said level is complete, and/or player dies, and/or player no longer has credits, and/or player decides to discontinue play, the interactive game portion is "exited" and a "fun" animated display of tallied earnings as well as possible achievements are shown. This could be as simple as showing animated slot reels quickly spin through the collected earnings (e.g., via display of a fast free spin bonus wherein the reels have minimal or no anticipation). The nature of this configuration enables HAWG to provide for different types of experiential opportunities such as, for example, one or more of the following (or combinations thereof):

- Corresponding with previous embodiments wherein toggle-able HUD elements provide a more in depth gaming experience.
- Being the "end level points tally" seen in most popular games (even though earnings have already been individually displayed during gameplay) where the player "has a moment" to take it some or all in.
- Assuming a player decides to discontinue play before the level ending tally screen, their earnings are still theirs and allow for them to simply collect & leave the gaming machine.

In at least some embodiments, HAWG games may be developed using regulatory (e.g., GLI) approved third party engines such as, for example (Unreal, Unity) accompanied by a complex series of blueprints and code which, when compiled, creates a packaged executable ready for storage on a gaming machine, system, and/or device.

It will be appreciated that, via the use of specifically configured computer hardware and software, the problems which are solved and/or overcome by the various skill-based, wager-based game techniques described herein are necessarily rooted in computer technology in order to overcome problems specifically arising in the realm of computer networks. For example, as described previously, most of wager-based games currently deployed at electronic gaming machines in casino establishments are configured or designed to primarily offer monetary-type payouts for wager-based game event outcomes. Additionally, such monetary-type payouts are typically unrelated to, and have no effect or influence on, the gameplay portion of the wager-based game being executed at the electronic gaming machine. Such problems and limitations specifically arise in the realm of electronic computing devices and computer networks, and the solutions to these problems and limitations (e.g., as described herein) are necessarily rooted in computer technology.

The present application herein incorporates by reference, in its entirety and for all purposes, U.S. Provisional Application Ser. No. 62/091,451, titled "HYBRID ARCADE-TYPE, WAGER-BASED GAMING TECHNIQUES", naming Washington et al. as inventors, and filed 12 Dec. 2014.

The present application herein incorporates by reference, in its entirety and for all purposes, U.S. Provisional Application Ser. No. 62/127,821, titled "RPG AND SPORTS THEMED HYBRID ARCADE-TYPE, WAGER-BASED GAMING TECHNIQUES", naming Washington et al. as inventors, and filed 3 Mar. 2015.

The present application herein incorporates by reference, in its entirety and for all purposes, U.S. patent application Ser. No. 14/831,823 titled "FIRST PERSON SHOOTER, RPG AND SPORTS THEMED HYBRID ARCADE-TYPE, WAGER-BASED GAMING TECHNIQUES" by Washington et al., filed on 20 Aug. 2015.

The present application herein incorporates by reference, in its entirety and for all purposes, U.S. patent application Ser. No. 14/865,538 titled "HYBRID ARCADE-TYPE, WAGER-BASED GAMING TECHNIQUES AND PREDETERMINED RNG OUTCOME BATCH RETRIEVAL TECHNIQUES" by Washington et al., filed on 25 Sep. 2015.

Although several example embodiments of one or more aspects and/or features have been described in detail herein with reference to the accompanying drawings, it is to be understood that aspects and/or features are not limited to these precise embodiments, and that various changes and modifications may be effected therein by one skilled in the art without departing from the scope of spirit of the invention(s) as defined, for example, in the appended claims.

It is claimed:

1. A computer implemented system employed in a computer network, the computer network including a electronic, wager-based gaming device, the electronic gaming device including a display and a input device, the computer network further including at least one random number generator engine, the system comprising:

at least one processor; at least one non-transient memory; and the at least one processor being operable to execute a plurality of instructions stored in the at least one non-transient memory to:

display, at the display, a game graphical user interface representing a virtual game world of a skill and wager-based game, the game graphical user interface including a skill-based game graphical user interface portion configured to enable the player to engage in skill-based game play activities relating to the skill and wager-based game via interaction with the skill-based game graphical user interface portion, the game graphical user interface further including a wager-based game graphical user interface portion configured to display content relating to wager-based gaming activities associated with the skill and wager-based game;

receive a set of game-play input generated from the player's interactions with the skill-based game graphical user interface portion;

detect an occurrence of a wager-based triggering event in the virtual game world;

automatically initiate, in response to the occurrence of the wager-based triggering event, a wager-based game event at the wager-based game graphical user interface portion;

enable the player to concurrently engage in a portion of skill-based game play activities of the skill and wager-based game via interaction with the skill-based game graphical user interface portion during execution of the wager-based game event;

predetermine a wager-based game event outcome representing an outcome of the wager-based game event before the initiation of the wager-based game event;

predetermine, before the initiation of the wager-based game event, if any monetary payout is to be distributed to the player based on the predetermined wager-based game event outcome;

87 predetermine, before the initiation of the wager-based game event, if any non-monetary payout is to be distributed to the player based on the predetermined wager-based game event outcome, the non-monetary payout including at least one in-game resource or attribute relating to a skill-based game portion of the virtual game world;

display a representation of the predetermined wager-based game event outcome at the wager-based game graphical user interface portion while the player is engaged in the portion of skill-based game play activities via interaction with the skill-based game graphical user interface portion;

if it is predetermined that a monetary payout is to be distributed to the player, automatically distribute the monetary payout; and if it is predetermined that a non-monetary payout is to be distributed or awarded to the player, automatically distribute the non-monetary payout by modifying the at least one in-game resource or attribute relating to the skill-based game portion of the virtual game world.

2. The computer implemented gaming system of claim 1 being further operable to cause the at least one processor to execute additional instructions to:

automatically fund a amount wagered on the wager-based game event using funds from an account balance associated with the player.

3. The computer implemented gaming system of claim 1 being further operable to cause the at least one processor to execute additional instructions to:

predetermine the wager-based game event outcome using the at least one random number generator engine;

create a link or association between the wager-based game event outcome and the wager-based triggering event; and reveal, after execution of the wager-based game event, the wager-based game event outcome.

4. The computer implemented gaming system of claim 1 wherein the electronic gaming device includes a bill or ticket acceptor, the system being further operable to cause the at least one processor to execute additional instructions to establish the account balance using at least a portion of cash or credit received via the bill or ticket acceptor.

5. The computer implemented gaming system of claim 1 wherein the predetermined wager-based game event outcome results in distribution of the monetary payout and the non-monetary payout.

6. The computer implemented gaming system of claim 1 being further operable to cause the at least one processor to execute additional instructions to:

analyze the predetermined wager-based game event outcome to determine whether or not to automatically modify an availability of at least one resource or attribute relating to the skill-based game portion of the virtual game world;

if the wager-based game event outcome satisfies a set of conditions, automatically modify the availability of the at least one resource or attribute relating to the skill-based game portion of the virtual game world; and if the wager-based game event outcome does not satisfy the set of criteria, prevent modification of the at least one resource or attribute relating to the skill-based game portion of the virtual game world in response to the wager-based game event outcome.

7. The computer implemented gaming system of claim 1: wherein the wager-based game event corresponds to a wager-based game of chance event; and

88 wherein the wager-based game event outcome is determined using the at least one random number generator engine.

8. A computer implemented system employed in a computer network, the computer network including a electronic, wager-based gaming device, the electronic gaming device including a display and a input device, the computer network further including at least one random number generator engine, the system comprising:

at least one processor;

at least one non-transient memory; and the at least one processor being operable to execute a plurality of instructions stored in the at least one non-transient memory to:

display, at the display, a game graphical user interface representing a virtual game world of a skill and wager-based game, the game graphical user interface including a skill-based game graphical user interface portion configured to enable the player to engage in skill-based game play activities relating to the skill and wager-based game via interaction with the skill-based game graphical user interface portion, the game graphical user interface further including a wager-based game graphical user interface portion configured to display content relating to wager-based gaming activities associated with the skill and wager-based game;

receive a set of game-play input generated from the player's interactions with the skill-based game graphical user interface portion;

detect an occurrence of a wager-based triggering event in the virtual game world;

automatically initiate, in response to the occurrence of the wager-based triggering event, a wager-based game event at the wager-based game graphical user interface portion;

enable the player to concurrently engage in a portion of skill-based game play activities of the skill and wager-based game via interaction with the skill-based game graphical user interface portion during execution of the wager-based game event;

display a representation of the wager-based game event at the wager-based game graphical user interface portion;

identify a wager-based event outcome representing an outcome of the wager-based game event;

determine the wager-based game event outcome of the wager-based game event before the initiation of the wager-based game event outcome;

determine, before the initiation of the wager-based game event, if any monetary payout is to be distributed to the player based on the predetermined wager-based game event outcome of the wager-based game event;

if it is determined that a monetary payout is to be distributed to the player, automatically distribute the monetary payout;

determine, before the initiation of the wager-based game event, if any non-monetary payout is to be distributed to the player based on the predetermined wager-based game event outcome, wherein the non-monetary payout includes at least one in-game resource or attribute relating to a skill-based game portion of the virtual game world; and if it is determined that a non-monetary payout is to be distributed or awarded to the player, automatically distribute the non-monetary payout by modifying the at least one in-game resource or attribute relating to the skill-based game portion of the virtual game world.

9. The computer implemented gaming system of claim 8 being further operable to cause the at least one processor to execute additional instructions to:

automatically fund a amount wagered on the wager-based game event using funds from an account balance associated with the player.

10. The computer implemented gaming system of claim 8 being further operable to cause the at least one processor to execute additional instructions to:

determine the wager-based game event outcome using the at least one random number generator engine;

create a link or association between the wager-based game event outcome and the wager-based triggering event; and reveal, after execution of the wager-based game event, the wager-based game event outcome.

11. The computer implemented gaming system of claim 8 wherein the electronic gaming device includes a bill or ticket acceptor, the system being further operable to cause the at least one processor to execute additional instructions to establish the account balance using at least a portion of cash or credit received via the bill or ticket acceptor.

12. The computer implemented gaming system of claim 8 being further operable to cause the at least one processor to execute additional instructions to:

concurrently display a representation of the execution of the wager-based game event at the first wager-based game graphical user interface portion while the player is engaged in the portion of skill-based game play activities.

13. The computer implemented gaming system of claim 8 wherein the outcome of the wager-based game event results in distribution of the monetary payout and the non-monetary payout.

14. The computer implemented gaming system of claim 8 being further operable to cause the at least one processor to execute additional instructions to:

analyze the wager-based game event outcome to determine whether or not to automatically modify an availability of at least one resource or attribute relating to the skill-based game portion of the virtual game world;

if the wager-based game event outcome satisfies a set of conditions, automatically modify the availability of the at least one resource or attribute relating to the skill-based game portion of the virtual game world; and if the wager-based game event outcome does not satisfy the set of criteria, prevent modification of the at least one resource or attribute relating to the skill-based game portion of the virtual game world in response to the wager-based game event outcome.

15. The computer implemented gaming system of claim 8:

wherein the wager-based game event corresponds to a wager-based game of chance event; and wherein the wager-based game event outcome is determined using the at least one random number generator engine.

16. A non-transitory computer usable medium for use in a computer network, the computer network including a electronic, wager-based gaming device including a display and a input device, the computer usable medium having computer readable code embodied therein, the computer readable code comprising computer code for causing at least one processor to execute instructions stored in at least one memory to:

display, at the display, a game graphical user interface representing a virtual game world of a skill and wager-based game, the game graphical user interface including a skill-based game graphical user interface portion configured to enable the player to engage in skill-based game play activities relating to the skill and wager-based game via interaction with the skill-based game graphical user interface portion, the game graphical user interface further including a wager-based game graphical user interface portion configured to display content relating to wager-based gaming activities associated with the skill and wager-based game;

receive a set of game-play input generated from the player's interactions with the skill-based game graphical user interface portion;

detect an occurrence of a wager-based triggering event in the virtual game world;

automatically initiate, in response to the occurrence of the wager-based triggering event, a wager-based game event at the wager-based game graphical user interface portion;

enable the player to concurrently engage in a portion of skill-based game play activities of the skill and wager-based game via interaction with the skill-based game graphical user interface portion during execution of the wager-based game event;

predetermine a wager-based game event outcome representing an outcome of the wager-based game event before the initiation of the wager-based game event;

predetermine, before the initiation of the wager-based game event, if any monetary payout is to be distributed to the player based on the predetermined wager-based game event;

predetermine, before the initiation of the wager-based game event, if any non-monetary payout is to be distributed to the player based on the predetermined wager-based game event outcome, the non-monetary payout including at least one in-game resource or attribute relating to a skill-based game portion of the virtual game world;

display a representation of the wager-based game event outcome at the wager-based game graphical user interface portion while the player is engaged in the portion of skill-based game play activities via interaction with the skill-based game graphical user interface portion;

if it is predetermined that a monetary payout is to be distributed to the first player, automatically distribute the monetary payout; and if it is predetermined that a non-monetary payout is to be distributed or awarded to the player, automatically distribute the non-monetary payout by modifying the at least one in-game resource or attribute relating to the skill-based game portion of the virtual game world.

\* \* \* \* \*